US010184794B2

(12) United States Patent
Ishikawa et al.

(10) Patent No.: US 10,184,794 B2
(45) Date of Patent: Jan. 22, 2019

(54) LASER MARKER

(71) Applicant: MAKITA CORPORATION, Anjo-shi, Aichi (JP)

(72) Inventors: Goshi Ishikawa, Anjo (JP); Yuki Kawai, Anjo (JP); Kazuki Oguchi, Anjo (JP); Shinji Hirabayashi, Anjo (JP); Shinsuke Okuda, Anjo (JP)

(73) Assignee: MAKITA CORPORATION, Anjo-shi (JP)

(*) Notice: Subject to any disclaimer, the term of this patent is extended or adjusted under 35 U.S.C. 154(b) by 178 days.

(21) Appl. No.: 15/194,048

(22) Filed: Jun. 27, 2016

(65) Prior Publication Data

US 2017/0003129 A1 Jan. 5, 2017

(30) Foreign Application Priority Data

Jul. 1, 2015 (JP) .................................. 2015-132696
Apr. 8, 2016 (JP) .................................. 2016-078335

(51) Int. Cl.
*G01C 15/00* (2006.01)

(52) U.S. Cl.
CPC .................................. *G01C 15/004* (2013.01)

(58) Field of Classification Search
CPC ..... G01C 15/00; G01C 15/002; G01C 15/004
USPC .................................... 33/290, 291, DIG. 21
See application file for complete search history.

(56) References Cited

U.S. PATENT DOCUMENTS

| 5,287,365 | A | * | 2/1994 | Nielsen | G01C 15/004 356/138 |
|---|---|---|---|---|---|
| 5,552,886 | A | * | 9/1996 | Kitajima | G01C 15/004 33/291 |
| 6,046,800 | A | * | 4/2000 | Ohtomo | G01C 15/002 356/139.07 |
| 6,119,355 | A | * | 9/2000 | Raby | G01C 1/02 33/1 PT |
| 6,915,583 | B2 | | 7/2005 | El-Katcha et al. | |
| 7,099,000 | B2 | * | 8/2006 | Connolly | G01C 15/002 33/285 |
| 7,536,796 | B2 | * | 5/2009 | Tamamura | G01C 15/02 33/291 |
| 2002/0005944 | A1 | * | 1/2002 | Pratt | G01C 15/002 356/152.1 |
| 2003/0145474 | A1 | * | 8/2003 | Tacklind | G01C 15/004 33/290 |
| 2003/0167647 | A1 | * | 9/2003 | Raab | B23Q 35/04 33/503 |
| 2004/0025358 | A1 | * | 2/2004 | Jan | G01C 15/12 33/286 |
| 2005/0172503 | A1 | * | 8/2005 | Kumagai | G01C 15/002 33/290 |
| 2006/0037203 | A1 | * | 2/2006 | Long | B25H 1/0057 33/286 |
| 2007/0044332 | A1 | * | 3/2007 | Yung | G01C 15/002 33/286 |

(Continued)

*Primary Examiner* — Christopher W Fulton
(74) *Attorney, Agent, or Firm* — Oliff PLC

(57) ABSTRACT

A laser marker in one aspect of embodiments of the present disclosure comprises a laser light generator, a main body, and a pack attachment portion. The pack attachment portion is configured such that a battery pack, which is chargeable and dischargeable and supplies electric power to the laser light generator, is slidably attached to an outer surface of the main body.

29 Claims, 31 Drawing Sheets

(56) References Cited

U.S. PATENT DOCUMENTS

| | | | |
|---|---|---|---|
| 2007/0130785 A1* | 6/2007 | Bublitz | G01C 15/004 33/290 |
| 2007/0227017 A1* | 10/2007 | Milligan | G01C 15/004 33/228 |
| 2008/0078091 A1* | 4/2008 | McCracken | G01C 15/004 33/291 |
| 2008/0094606 A1* | 4/2008 | Schwarz | G01C 15/00 356/4.01 |
| 2009/0187373 A1* | 7/2009 | Atwell | B25J 9/1692 702/152 |
| 2011/0197389 A1* | 8/2011 | Ota | B25F 5/00 15/339 |
| 2012/0048587 A1* | 3/2012 | Umemura | B25F 5/02 173/217 |
| 2012/0321912 A1* | 12/2012 | Hachisuka | H01M 2/1022 429/7 |
| 2013/0167386 A1* | 7/2013 | Peng | G01C 15/004 33/290 |
| 2014/0123508 A1* | 5/2014 | Graesser | G01C 15/00 33/228 |
| 2014/0173921 A1* | 6/2014 | Gros | G01C 15/00 33/228 |
| 2014/0202011 A1* | 7/2014 | Munroe | G01B 11/26 33/228 |
| 2014/0361740 A1* | 12/2014 | Suzuki | H02J 7/0027 320/108 |
| 2015/0052765 A1* | 2/2015 | Kumagai | G01C 15/002 33/290 |
| 2015/0249237 A1* | 9/2015 | Naito | H01M 2/1055 429/7 |
| 2015/0263592 A1* | 9/2015 | Kawakami | H02K 9/06 310/50 |
| 2015/0268347 A1* | 9/2015 | Grasser | G01S 17/66 250/203.2 |
| 2017/0307370 A1* | 10/2017 | Tanaka | G01C 1/02 |

* cited by examiner

LASER MARKER

CROSS-REFERENCE TO RELATED APPLICATIONS

This application claims the benefit of Japanese Patent Application No. 2015-132696 filed Jul. 1, 2015 in the Japan Patent Office and Japanese Patent Application No. 2016-078335 filed Apr. 8, 2016 in the Japan Patent Office, the disclosures of which are incorporated herein by reference.

BACKGROUND

The present disclosure relates to a laser marker (a laser level).

As a laser marker for use in civil engineering works, construction works, and so on, the one including a dry cell as a power supply is known. Such a laser marker generates laser lights by being supplied with electric power from the dry cell, and projects laser light reference lines onto a target object.

In a case where the dry cell, which is a non-rechargeable battery (a primary battery), is used as a power supply, when the dry cell is discharged to a certain level with the use of the laser marker, the dry cell needs to be replaced by a new one. Repetition of such replacement leads to increase in the number of discarded dry cells, and waste of resources might be thereby fostered.

To cope with this, as disclosed in U.S. Pat. No. 6,915,583 for example, a laser marker including a battery pack used as a rechargeable battery (a secondary battery), which is chargeable and dischargeable, is suggested instead of the dry cell. Such a chargeable and dischargeable battery pack can be reused by being charged, even when the battery pack is discharged with the user of the laser marker and becomes unable to supply electric power. That is, by using the chargeable and dischargeable battery pack as a power supply, waste of resources can be reduced compared to the case in which a non-rechargeable battery (dry cell) is used, because the battery pack can be reused by being charged.

In the above-described laser marker, as an attachment and detachment style of the battery pack, a style is adopted in which the battery pack is attached and detached by moving the battery pack in a direction perpendicular to an outer surface of the laser marker (hereinafter referred to as a push-in style).

SUMMARY

When the "push-in style" is adopted as an attachment and detachment style of the battery pack, a region occupied by the battery pack within the laser marker becomes larger, and a region in which respective elements housed inside (e.g., a laser light generator) are arranged becomes relatively smaller. Thus, a degree of freedom of arrangement of the respective elements within the laser marker may be decreased.

In one aspect of the present disclosure, it is preferable to provide a laser marker that enables reduction of waste of resources and in which a degree of freedom of arrangement of respective elements housed inside is unlikely to be decreased.

A laser marker in one aspect of the present disclosure comprises a laser light generator, a main body, and a pack attachment portion.

The laser light generator is configured to generate at least one laser light. The main body accommodates therein the laser light generator. The main body comprises an outer surface and at least one laser light passing portion that allows passage of the at least one laser light from an inside to an outside of the main body.

The pack attachment portion is configured such that a battery pack, which is chargeable and dischargeable, is slidably attached to the outer surface of the main body. The battery pack is configured to supply electric power to the laser light generator.

With such a style in which the battery pack is attached and detached by sliding it on the outer surface of the main body, the battery pack can be arranged in a region away from the center position of the main body, compared to a style in which a battery pack is attached and detached by moving it in a direction perpendicular to the outer surface of the main body (a push-in style).

This makes it possible to reduce influence of the region in which the battery pack is arranged on the region in which the laser light generator is arranged within the main body. That is, the region occupied by the battery pack within the laser marker can be inhibited from being larger, and a degree of freedom of arrangement of respective elements within the laser marker can be inhibited from being decreased.

Moreover, the laser marker has the configuration in which the chargeable and dischargeable battery pack can be attached to the pack attachment portion. Thus, waste of resources can be reduced compared to a case in which a non-rechargeable battery (e.g., dry cell) is used, because the battery pack can be used repeatedly by being charged.

Accordingly, with the thus-configured laser marker, a laser marker can be provided that enables reduction of waste of resources and in which a degree of freedom of arrangement of the respective elements housed inside is unlikely to be decreased.

Furthermore, when the thus-configured laser marker is manufactured through change of design of existing laser markers, the battery pack can be attached without significantly changing the region in which the respective elements housed inside (e.g., the laser light generator) are arranged.

Next, in the above-described laser marker, the pack attachment portion may comprise at least one slide rail provided on the outer surface of the main body. The at least one slide rail may be configured such that the battery pack is attached to the pack attachment portion by sliding the battery pack along the at least one slide rail.

With the pack attachment portion including such an at least one slide rail, the battery pack can be slidably attached to the outer surface of the main body.

Next, in the above-described laser marker, the at least one slide rail may comprise a pair of parallel slide rails.

With the pair of parallel slide rails, the battery pack can be slidably attached to the outer surface of the main body.

Next, in the above-described laser marker, the main body may have a columnar shape extending in an axial direction about a central axis extending in a vertical direction.

With the thus-shaped main body, the at least one laser light can be projected over a wide range when the at least one laser light passing portion is arranged on an upper portion of the main body.

Next, in the above-described laser marker, the outer surface comprises a side face extending in the axial direction, and the pack attachment portion may be provided on the side face.

With such a style in which the battery pack is attached and detached by sliding it on the outer surface of the main body, the battery pack can be arranged in a region away from the center position of the main body, compared to a style in which a battery pack is attached and detached by moving it in a direction perpendicular to the outer surface of the main body (a push-in style). Thus, the region occupied by the battery pack within the laser marker can be inhibited from being larger, and a degree of freedom of arrangement of the respective elements within the laser marker can be inhibited from being decreased.

Next, in the above-described laser marker, the battery pack may have a shape in which a maximum vertical dimension is smaller than a maximum horizontal dimension in a state where the battery pack is attached to the pack attachment portion.

In the thus-shaped battery pack, the maximum vertical dimension (height dimension) in the state where the battery pack is attached to the pack attachment portion can be reduced compared to a battery pack having a shape in which the maximum vertical dimension is larger than the maximum horizontal dimension.

Thus, the laser marker as a whole can be inhibited from being large in vertical dimension (height dimension), and a risk that the laser marker might turn over with an increase in the height dimension can be reduced.

Next, in the above-described laser marker, the pack attachment portion may be configured such that the battery pack is attached to the pack attachment portion in such a manner as to be slidable parallel to a horizontal direction.

With the thus-configured pack attachment portion, a direction of movement of the battery pack while it is attached and detached is horizontal, and a vertical movement does not occur. In such a case, while the battery pack is being attached and detached, it is possible to inhibit the battery pack from interfering with regions upper and lower than the pack attachment portion on the outer surface of the main body, and thus, occurrence of damage due to such interference can be inhibited.

In particular, in a configuration in which the at least one laser light passing portion is arranged in the region upper or lower than the pack attachment portion, the at least one laser light passing portion can be inhibited from being damaged, and thus, the at least one laser light can be projected onto a target object properly.

Furthermore, a configuration may be adopted in which, in the state where the battery pack is attached to the pack attachment portion, the maximum vertical dimension of the battery pack is smaller than the maximum horizontal dimension of the battery pack, and in which, in the pack attachment portion, a sliding direction of the battery pack is parallel to a horizontal direction. By adopting such a configuration, the maximum vertical dimension of the battery pack in the state where it is attached to the pack attachment portion can be made smaller, to thereby inhibit the height dimension of the laser marker from being larger.

Next, in the above-described laser marker, the main body may comprise a base unit and a rotating unit.

The base unit is configured to come in contact with a place in which the laser marker is placed. The rotating unit is secured on an upper side of the base unit in such a manner as to be rotatable about a central axis extending in a vertical direction.

With such a configuration in which the main body comprises the base unit and the rotating unit, a direction of projection of the at least one laser light can be easily adjusted through rotation of the rotating unit.

Next, in the above-described laser marker in which the main body comprises the base unit and the rotating unit, the pack attachment portion may be provided either on the base unit or on the rotating unit.

That is, when a configuration in which the pack attachment portion is provided on the rotating unit is adopted, it becomes unnecessary to arrange a current path extending from the battery pack to the laser light generator so as to extend through both of the base unit and the rotating unit. Thus, the current path does not need to be provided in a region in which change of a relative position occurs by rotation, and the current path can be thereby inhibited from being complicated.

Alternatively, when a configuration in which the pack attachment portion is provided on the base unit is adopted, the battery pack having a relatively large weight among the elements of the laser marker is arranged in a lower position. Thus, the center of gravity of the laser marker becomes lower, and the risk that the laser marker might turn over is thereby reduced.

The laser light generator may be configured such that the entirety thereof is housed in the rotating unit, or such that a part of the laser light generator is housed in the rotating unit and the rest is housed in the base unit.

Next, in the above-described laser marker in which the pack attachment portion is provided on the side face of the base unit, the main body may comprise at least one signal receiving portion configured to receive at least one wireless command signal transmitted from outside the main body, and the pack attachment portion may comprise a lowermost portion positioned higher than an uppermost portion of the at least one signal receiving portion.

This can inhibit the at least one external wireless command signal from being blocked by the battery pack, and the command signal can thereby be received properly by the at least one signal receiving portion.

Examples of the command signal include a command signal including command information about, for example, an emission state of the at least one laser light (laser brightness, a direction of emission, etc.). Further, examples of the command signal include a signal for use in infrared communication, a signal for use in Bluetooth (registered trademark) communication, and so on.

Next, the above-described laser marker may have a configuration in which the laser light generator comprises a laser light emitter and an emission controller, the laser marker comprises a first region and a second region, and at least part of the emission controller is arranged in the second region.

The laser light emitter is configured to emit the at least one laser light. The emission controller is configured to control an emission state of the at least one laser light in the laser light emitter.

The first region is a region including the pack attachment portion, assuming that the laser marker is divided by a virtual plane that is parallel to a sliding direction of the battery pack and that includes a central axis of the main body extending in a vertical direction. The second region is a region not including the pack attachment portion, assuming that the laser marker is divided by the virtual plane.

Since the first region includes the pack attachment portion, the battery pack is to be arranged in the first region. The battery pack is an element having a relatively large weight among the elements of the laser marker, and is to be arranged in the first region.

With such a configuration in which the at least part of the emission controller is arranged in the region different from the region in which the pack attachment portion (the battery pack) is arranged, the center of gravity of the laser marker can be brought closer to the central axis, compared to a case in which the pack attachment portion (the battery pack) and the entirety of the emission controller are arranged in the same region.

This can inhibit the center of gravity of the laser marker from being deviated to a battery pack side, and the risk that the laser marker might turn over is thereby reduced.

In addition to a configuration in which the emission controller is provided as a single element, a configuration may be adopted in which the emission controller is provided as a plurality of separate elements. When the emission controller is provided as a single element, at least part of the emission controller can be arranged in the second region by arranging the emission controller extending over the first region and the second region. Alternatively, when the emission controller is provided as the plurality of separate elements, at least part of the emission controller can be arranged in the second region by arranging at least some of the plurality of elements in the second region.

Furthermore, the above-described laser marker may have a configuration in which the entirety of the emission controller, not part of the emission controller, is arranged in the second region. With such a configuration, it is possible to inhibit the center of gravity of the laser marker from being deviated to the battery pack side, and the risk that the laser marker might turn over can thereby be reduced even when the battery pack having a larger weight is used.

Next, the above-described laser marker may further comprise an external power supply coupling portion to be coupled to an external power supply that supplies electric power to the laser light generator.

With the thus-configured external power supply coupling portion, the laser marker can receive electric power from the external power supply, other than from the battery pack. This enables the laser marker to emit the at least one laser light by being supplied with electric power from the external power supply, even when the battery pack is in "a state in which a remaining energy is 0" or in "a failed state".

Next, in the above-described laser marker including the external power supply coupling portion, the external power supply may be configured to output an output voltage of 4.5-5.5 V, and the external power supply coupling portion may be configured to adapt to the output voltage.

The external power supply configured to output the output voltage of such a range is widely distributed as a general-purpose article, and is easily available. This enables the laser marker to emit the at least one laser light by being supplied with electric power from the external power supply, even when the battery pack unexpectedly gets into "a state in which a remaining energy is 0" or in "a failed state".

Next, the above-described laser marker including the external power supply coupling portion may further comprise a pack voltage converter and an external voltage converter. The pack voltage converter is configured to convert a voltage received from the battery pack into, a voltage suitable for the laser light generator. The external voltage converter is configured to convert a voltage received from the external power supply via the external power supply coupling portion into the voltage suitable for the laser light generator.

With such a configuration in which voltage conversion is performed by the pack voltage converter and the external voltage converter provided to the laser marker, laser illumination can be performed using electric power from a wide variety of battery packs and a wide variety of external power supplies.

Next, in the above-described laser marker, the at least one laser light may comprise a green laser light.

The laser light generator generating the green laser light consumes larger electric power than that consumed by a conventionally prevailing laser light generator (a laser element) generating a red laser light. Thus, the power supply is discharged in a shorter period of time than in the case of the conventional laser light generator.

To cope with this, the chargeable and dischargeable battery pack is used as a power supply, and waste of resources can thereby be further reduced compared to the case in which a non-rechargeable battery (dry cell) is used.

Meanwhile, the weight of the battery pack becomes larger with an increase in the rating capacity. In the above-described laser marker, as the weight of the battery pack attached to the pack attachment portion becomes larger, the center of gravity of the laser marker is deviated to the battery pack side. Thus, the laser marker might turn over depending on conditions of the place in which it is placed (e.g., inclination).

Thus, in the above-described laser marker, the main body may comprise a bottom portion, and the laser marker may further comprise a plurality of leg portions and a supplemental support. The plurality of leg portions are provided to the bottom portion of the main body and are configured to come in contact with a place in which the laser marker is placed. The supplemental support is provided extending from the main body.

The supplemental support comprises a ground contact portion at a leading end of the supplemental support. The ground contact portion is positioned such that a virtual line segment connecting at least part of the ground contact portion and the central axis to each other intersects the pack attachment portion, as viewed planarly from an upper side of a central axis of the main body extending in a vertical direction.

The ground contact portion is further positioned lower than the pack attachment portion, and is positioned so as to face a virtual ground, which is an extension of a ground in contact with the plurality of leg portions, leaving a gap between the ground contact portion and the virtual ground.

In the laser marker having the thus-configured supplemental support, even when the center of gravity is deviated to the battery pack side by the weight of the battery pack attached to the pack attachment portion to thereby cause the laser marker to be tilted, the supplemental support comes in contact with the ground and can support the laser marker before it turns over completely.

Thus, with such a supplemental support, the laser marker can be inhibited from turning over even when the battery pack having a large weight is attached thereto.

The virtual ground is an extension of a ground with which the plurality of leg portions come in contact when the laser marker is placed on the place for placement. Each of the plurality of leg portions may be capable of expansion and contraction. In such a case, the virtual ground may be defined on the basis of the ground with which the plurality of leg portions set shortest are in contact.

Next, in the above-described laser marker including the plurality of leg portions and the supplemental support, the supplemental support may be provided lower than the pack attachment portion.

The thus-configured supplemental support makes it possible to shorten a length dimension thereof (in other words, a dimension from the ground contact portion to the end coupled to the main body), compared to a configuration in which at least part of the supplemental support is arranged also in a region upper than the pack attachment portion.

Thus, material costs of the supplemental support can be reduced, to thereby inhibit increase in manufacturing costs of the laser marker.

Furthermore, since the thus-configured supplemental support is not arranged in a region that is level with the pack attachment portion or in the region upper than the pack attachment portion, interference with the battery pack is unlikely to occur during attachment and detachment of the battery pack.

Next, in the above-described laser marker including the plurality of leg portions and the supplemental support, the supplemental support may be attached to the main body via at least one coupling portion in at least either one of a pivotally movable manner or a slidingly movable manner. When the supplemental support is fixed in a specified support position within a movable range of the supplemental support, the ground contact portion may be positioned such that the virtual line segment intersects the pack attachment portion, and the ground contact portion may be positioned so as to face the virtual ground, leaving the gap between the ground contact portion and the virtual ground, in a region lower than the pack attachment portion.

With the thus-configured supplemental support, the laser marker can be switched between a state in which the supplemental support is fixed in the support position and a state in which the supplemental support is not fixed in the support position depending on a use state of the laser marker. For example, while the laser marker is being used, the supplemental support may be fixed in the support position, and while the laser marker is not being used (being carried or stored), the supplemental support may be fixed to a position different from the support position (e.g., a position for carriage and a position for storage). Alternatively, the supplemental support may be allowed to be freely movable while the laser marker is not being used.

Next, in the above-described laser marker including the movable supplemental support, the supplemental support may comprise a handle configured to be held by a user of the laser marker.

With the supplemental support including the handle as described above, the necessity to separately provide a supplemental support and a handle is eliminated, and an increase in the number of components constituting the laser marker can thereby be inhibited.

Next, in the above-described laser marker including the movable supplemental support, the supplemental support may be configured such that the ground contact portion is movable to a region higher than an uppermost end of the main body and such that the ground contact portion and the handle are configured as a same member.

By adopting such a configuration in which the ground contact portion and the handle are configured as the same member, the supplemental support can be inhibited from being larger, compared to a case in which the ground contact portion and the handle are separately provided in different regions in the supplemental support.

Next, in the above-described laser marker including the movable supplemental support, the at least one coupling portion comprises a pair of coupling portions, and the supplemental support may be attached to a side face of the main body via the pair of coupling portions and may be configured to be pivotally movable about the pair of coupling portions.

The supplemental support comprises a pair of extending portions. Each of the pair of extending portions extends from corresponding one of the pair of coupling portions to the ground contact portion. Positions of the pair of coupling portions in the main body as viewed planarly from the upper side of the central axis of the main body extending in a vertical direction are set so that, when the supplemental support is fixed in the support position, the ground contact portion and the pair of extending portions surround at least a region in which the pack attachment portion is provided on the side face of the main body.

Since such a laser marker has the configuration in which the supplemental support is attached to the side face of the main body via the pair of coupling portions, the laser marker can be lifted more stably by means of the supplemental support even when the laser marker is heavy, compared to a configuration in which the supplemental support is attached via one coupling portion. This enables the user to carry the laser marker in a stable state by holding the handle of the supplemental support, even when the laser marker has a large weight.

Further, since the laser marker has the configuration in which the positions of the pair of coupling portions in the main body are set as described above and in which the supplemental support is pivotally moved to allow the ground contact portion to be moved to the region lower than the pack attachment portion, the ground contact portion can be easily positioned so as to satisfy given conditions. The given conditions are to position the ground contact portion such that the virtual line segment intersects the pack attachment portion, and to position the ground contact portion so as to face the virtual ground, leaving the gap therebetween, in the region lower than the pack attachment portion. With the ground contact portion of the supplemental support being in such a position, the laser marker can be inhibited from turning over.

Next, in the above-described laser marker including the supplemental support pivotally moved about the pair of coupling portions, the pair of extending portions comprise a first extending portion and a second extending portion. The first extending portion may be made of a soft material that is elastically deformable, and the second extending portion may be made of a hard material that is harder than the soft material and that is not elastically deformed.

The first extending portion is positioned such that a movement locus of the first extending portion during pivotal movement of the supplemental support overlaps a region in which the battery pack is moved during attachment and detachment of the battery pack, and the second extending portion is positioned such that a movement locus of the second extending portion during pivotal movement of the supplemental support does not overlap the region in which the battery pack is moved during attachment and detachment of the battery pack.

In such a laser marker, the first extending portion is elastically deformable, and thus, even when the first extending portion and the battery pack interfere with each other during attachment and detachment of the battery pack, attachment and detachment of the battery pack can be continued due to the elastic deformation of the first extending portion.

Next, in the above-described laser marker including the movable supplemental support, the at least one coupling portion may comprise one coupling portion, and the supplemental support may be attached to a side face of the main body via the one coupling portion and may be configured to be pivotally movable about the one coupling portion. The supplemental support comprises an extending portion extending from the one coupling portion to the ground contact portion. A position of the one coupling portion in the main body is set so that a region in which the ground contact portion and the extending portion are moved during pivotal movement of the supplemental support does not overlap a region in which the battery pack is moved during attachment to and detachment from the pack attachment portion.

Since such a laser marker has the configuration in which the supplemental support is attached to the side face of the main body via the one coupling portion, the region in which the ground contact portion and the extending portion are moved during pivotal movement of the supplemental support is smaller than in the configuration in which the supplemental support is attached via two coupling portions. Thus, a degree of freedom of positioning the coupling portion is increased when determining the position of the coupling portion in the main body so that the region in which the ground contact portion and the extending portion are moved does not overlap the region in which the battery pack is moved.

Next, in the above-described laser marker including the movable supplemental support, the outer surface comprises a side face extending in an axial direction about a central axis extending in a vertical direction, and the supplemental support may be attached to the side face of the main body via the pair of coupling portions and may be configured to be slidingly movable. The ground contact portion is provided lower than the pair of coupling portions in the supplemental support. The handle is provided higher than the pair of coupling portions in the supplemental support.

With the above-described supplemental support, the laser marker can have a configuration in which overturning is inhibited by the ground contact portion, and in which easy carriage is facilitated by the handle. Since the supplemental support is slidingly movable and has the ground contact portion and the handle provided in the different regions, movement of the supplemental support (e.g., movement from the support position to another position) can be easily performed.

Next, in the above-described laser marker including the at least one coupling portion and the handle, the at least one coupling portion may be provided higher than the center of gravity of the laser marker in the main body.

In the thus-configured laser marker, when the user lifts the laser marker by holding the handle, the center of gravity is positioned lower than the at least one coupling portion, and thus, the laser marker excluding the supplemental support becomes stable. This makes it possible, when the user lifts the laser marker by holding the handle, to inhibit the main body from pivotally or slidingly moving to turn over upside down. Thus, the laser marker can be carried around in a stable state.

Next, in the above-described laser marker including the supplemental support, the ground contact portion of the supplemental support may comprise a surface made of an elastic material.

With the thus-configured supplemental support, when the laser marker is tilted and the ground contact portion comes in contact with the ground, the surface of the ground contact portion made of the elastic material fulfills an antiskid function, to thereby make the laser marker more unlikely to turn over. Additionally, in the configuration in which the ground contact portion and the handle are provided as the same member, it is possible to inhibit the handle from slipping out of the hand to cause the laser marker to fall when the user carries the laser marker by holding the handle, because the handle (in other words, the ground contact portion) comprises the surface made of the elastic material.

BRIEF DESCRIPTION OF THE DRAWINGS

Exemplary embodiments will be described below by way of example with reference to the accompanying drawings, in which.

DETAILED DESCRIPTION OF THE PREFERRED EMBODIMENTS

1. First Embodiment

1-1. Overall Structure

Figure 1:
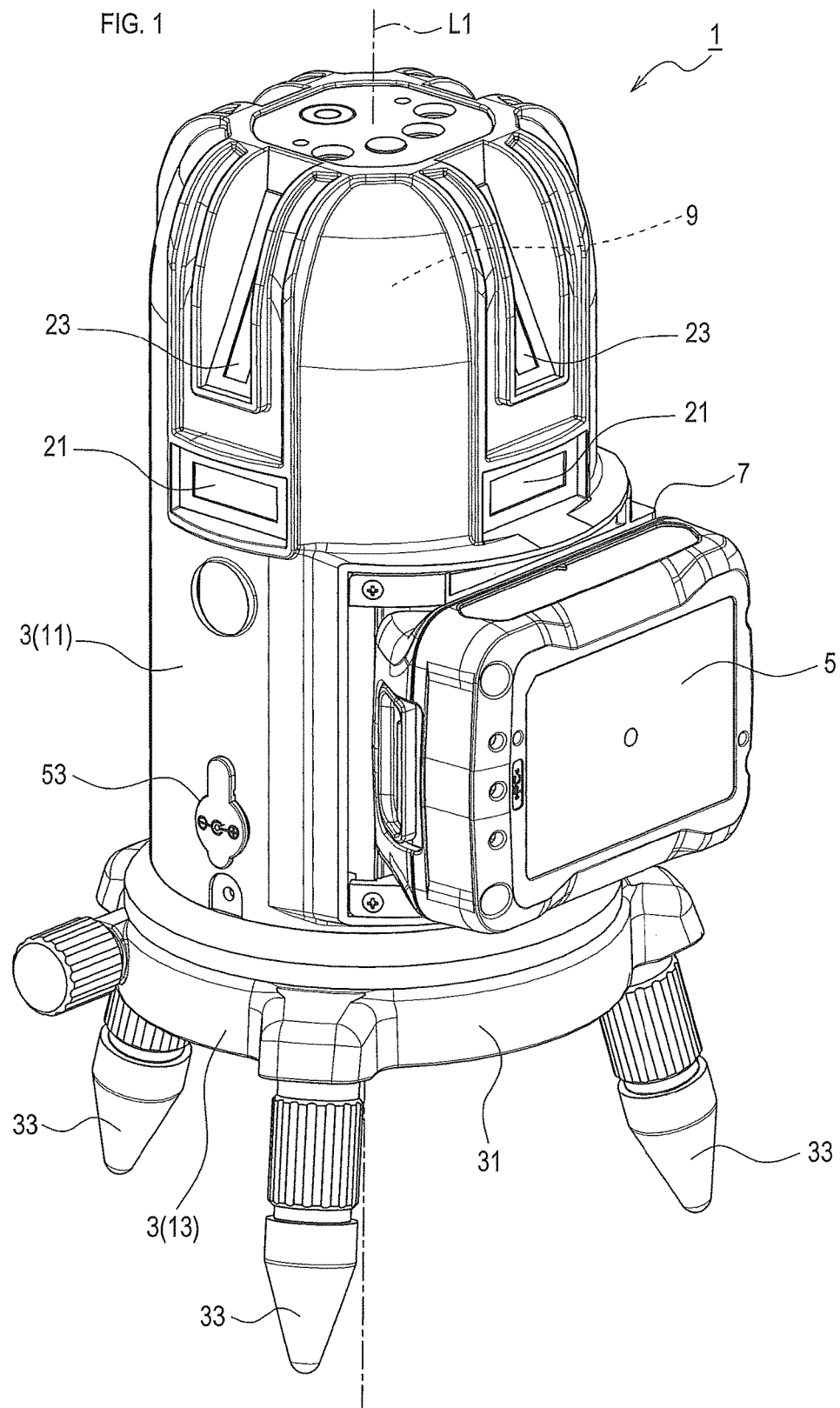
FIG. 1 is a perspective view showing an external appearance of a laser marker with a battery pack attached thereto.

A laser marker 1 of the present embodiment is for use in civil engineering works, construction works, and so on, and is configured to project laser light reference lines onto a target object.

As shown in FIGS. 1-6, the laser marker 1 comprises a main body 3, a battery pack 5, a pack attachment portion 7, and a laser light generator 9. In the explanation below, in the laser marker 1, a side provided with the pack attachment portion 7 is regarded as a rear side. For example, in the laser marker 1 shown in FIG. 3, a deeper side in the drawing is a front side, a front side in the drawing is a rear side, a left side in the drawing is a left side, and a right side in the drawing is a right side.

Figure 3:
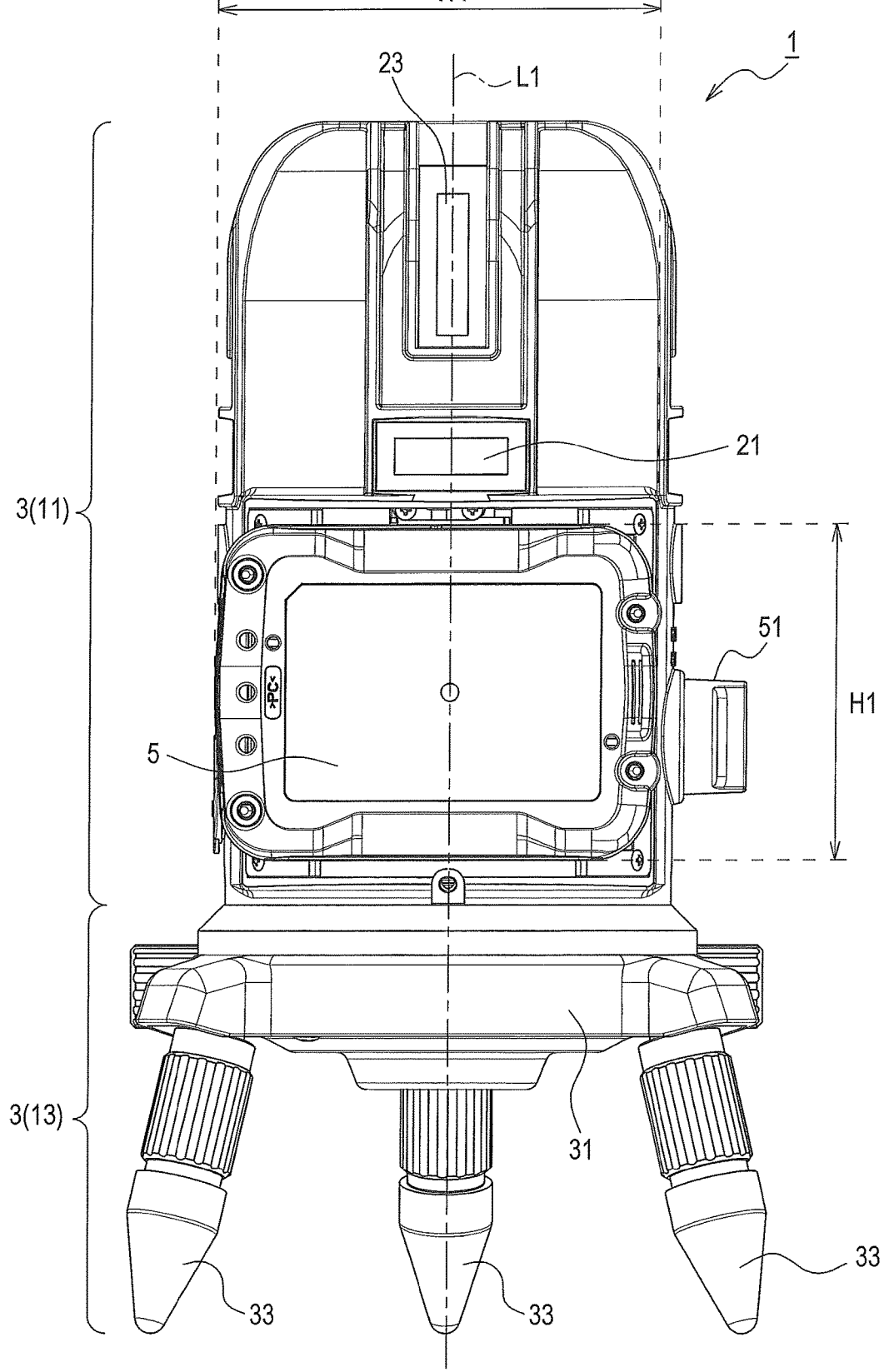
FIG. 3 is an appearance diagram showing an external appearance of a rear side of the laser marker, on which side the battery pack is attached.

As shown in FIG. 3, etc., the main body 3 comprises a base unit 13 that comes in contact with a place in which the laser marker 1 is placed, and a rotating unit 11 that is secured on an upper side of the base unit 13 in such a manner as to be rotatable about a central axis L1 extending in a vertical direction.

The rotating unit 11 has an approximately circular cylindrical shape extending about the central axis L1 in an axial direction, and a peripheral portion at an upper end of the rotating unit 11 is formed into a curved shape (rounded shape). The rotating unit 11 accommodates therein the laser light generator 9 that generates laser lights (see FIG. 4). As shown in FIG. 1, etc., the rotating unit 11 comprises horizontal laser light passing portions 21 and vertical laser light passing portions 23, which allow passage therethrough of laser lights from the inside to the outside.

The horizontal laser light passing portions 21 are configured to allow passage, from the inside to the outside of the main body 3, of horizontal laser lights indicating horizontal reference lines, among laser lights emitted from the laser light generator 9. The horizontal laser light passing portions 21 provided to the rotating unit 11 are four in number. Specifically, each of the horizontal laser light passing portions 21 is provided in a corresponding region, which is a quadrisection in a circumferential direction about the central axis L1.

The vertical laser light passing portions 23 are configured to allow passage, from the inside to the outside of the main body 3, of vertical laser lights indicating vertical reference lines, among laser lights emitted from the laser light generator 9. The vertical laser light passing portions 23 provided to the rotating unit 11 are four in number. Specifically, each of the vertical laser light passing portions 23 is provided in a corresponding region, which is a quadrisection in a circumferential direction about the central axis L1.

The base unit 13 comprises a plate portion 31 and leg portions 33.

The plate portion 31 is an approximately disk-plate-shaped member that rotatably supports the rotating unit 11. The leg portions 33 are provided so as to support the plate portion 31, and are three in number.

Figure 2:
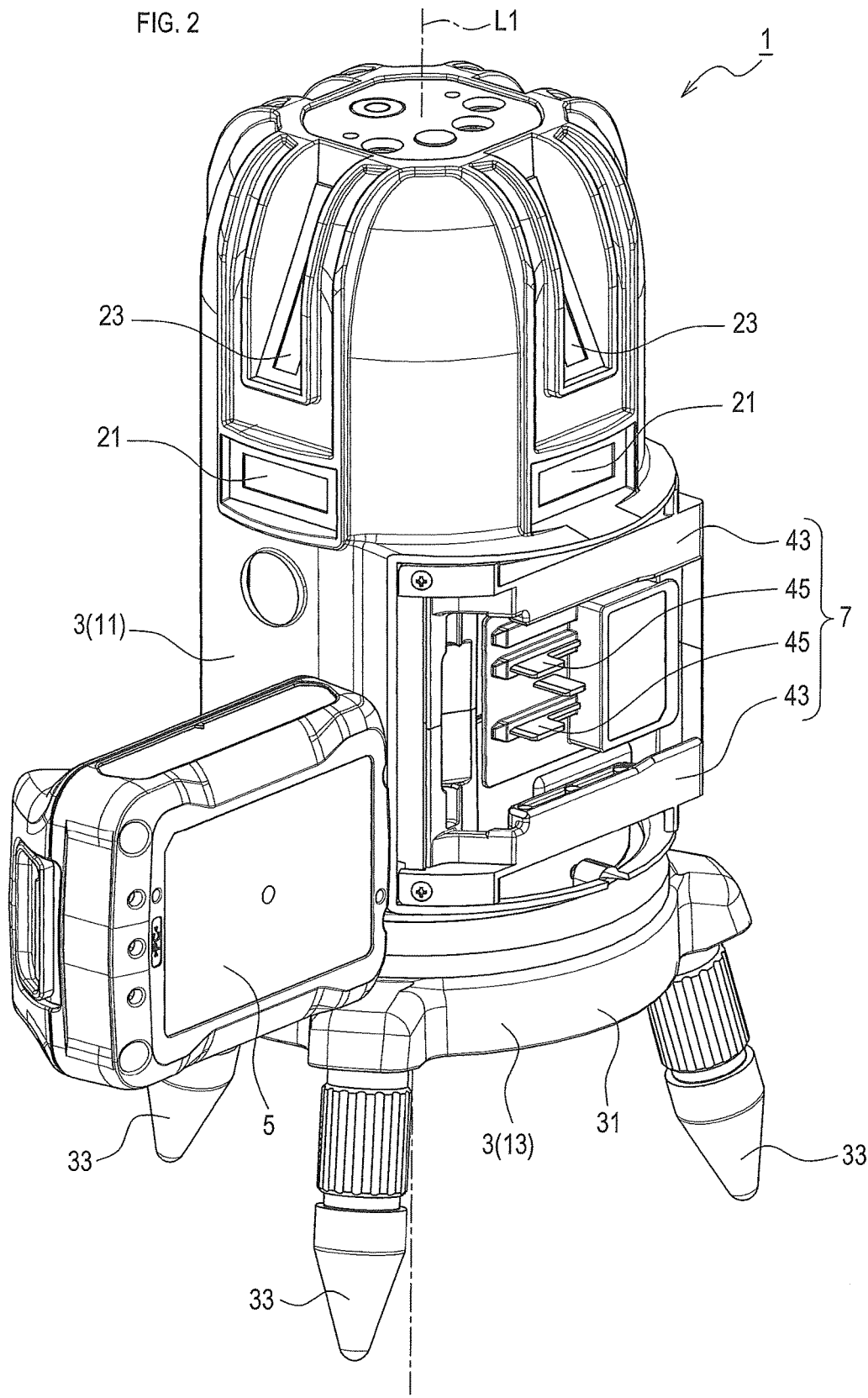
FIG. 2 is a perspective view showing an external appearance of the laser marker with the battery pack detached therefrom.

As shown in FIG. 2, the battery pack 5 is attachable to and detachable from the pack attachment portion 7. The battery pack 5 is chargeable and dischargeable, and contains a rechargeable battery cell (not shown) that generates a specific direct-current voltage. The battery pack 5 comprises electrode terminals (not shown) electrically coupled to the rechargeable battery cell. The battery pack 5 is configured to output a discharge current externally from the rechargeable battery cell and to input a charging current externally to the rechargeable battery cell, when the battery pack 5 is electrically coupled externally (respectively to the pack attachment portion 7, etc., and a not-shown charger) via the electrode terminals (not shown).

The pack attachment portion 7 is provided on the rear side of the rotating unit 11 of the main body 3. The pack attachment portion 7 comprises two slide rails 43 provided parallel to the rear side of the rotating unit 11 (in other words, parallel to a tangential direction of a virtual circle centered about the central axis L1). That is, the pack attachment portion 7 is configured such that the battery pack 5 is attached thereto and detached therefrom by sliding the battery pack 5 along the slide rails 43.

Further, the pack attachment portion 7 comprises two electrode terminals 45. The electrode terminals 45 are electrically coupleable to the laser light generator 9 via an electrical cable (not shown), an operation switch 51, etc., provided within the rotating unit 11. The electrode terminals 45 are configured to be coupled to the electrode terminals (not shown) of the battery pack 5 when the battery pack 5 is attached to the pack attachment portion 7.

In short, when attached to the pack attachment portion 7, the battery pack 5 can supply electric power to the laser light generator 9 via the electrode terminals 45.

Figure 4:
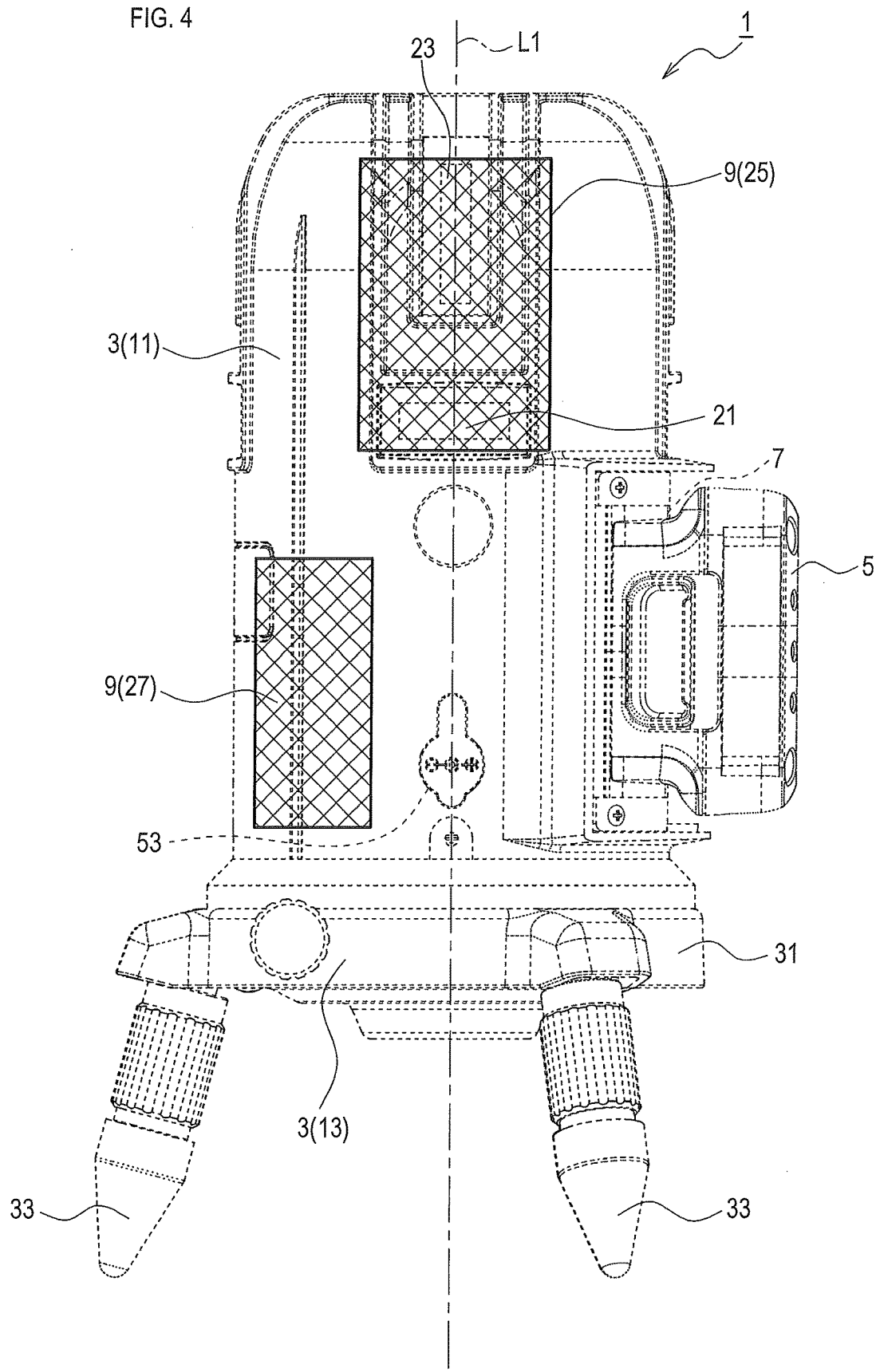
FIG. 4 is an explanatory diagram showing regions in which a laser light generator (a laser light emitter and an emission controller) is provided within the laser marker.

As shown in FIG. 4, the laser light generator 9 comprises a laser light emitter 25 that emits laser lights, and an emission controller 27 that controls an emission state of laser lights in the laser light emitter 25.

The laser light emitter 25 comprises a laser light source (not shown) that generates laser lights by being supplied with electric power, and a laser light converter (not shown) having a lens, etc., that converts the laser lights emitted from the laser light source into linear lights. The laser light emitter 25 emits, as the linear lights, horizontal laser lights indicating horizontal reference lines and vertical laser lights indicating vertical reference lines. The laser light emitter 25 is configured to emit four horizontal laser lights and four vertical laser lights corresponding to positions where the four horizontal laser light passing portions 21 and the four vertical laser light passing portions 23 are respectively provided. The laser light emitter 25 emits green laser lights.

The laser light emitter 25 is supported in a swingable manner so as to be able to maintain its vertical position by means of a mechanical gimbal system. The laser light emitter 25 is set to either a fixed state or a swingable state by means of a stopper (not shown) operated linked with operation of the operation switch 51. Specifically, when the operation switch 51 is turned ON by a user, the laser light emitter 25 is set to a swingable state, and when the operation switch 51 is turned OFF by the user, the laser light emitter 25 is set to a fixed state.

The emission controller 27 receives power supply from the battery pack 5 or an external power supply, and controls an emission state of laser lights (laser brightness, a direction of emission, etc.) in the laser light emitter 25 in accordance with a command by the user. The emission controller 27 may include a microcomputer, for example. The user can set a command regarding an emission state of laser lights (laser brightness, a direction of emission, etc.) by operating a not-shown command switch.

The laser marker 1 further comprises the operation switch 51 (see FIGS. 3 and 6) and an external power supply coupling portion 53 (see FIG. 1).

The operation switch 51 is provided on a side face of the rotating unit 11 of the main body 3, and is turned ON and OFF through operation by the user. The external power supply coupling portion 53 is provided on the side face of the rotating unit 11 of the main body 3, and is electrically coupleable to an external power supply (an AC adapter 71, a DC adapter, or the like, see FIG. 7).

An electrical configuration related to the laser light generator 9, the battery pack 5, the operation switch 51, and the external power supply coupling portion 53 will be described later.

The laser marker 1 further comprises an adjustment weight 57 (see FIGS. 5 and 6) that adjusts a position of the center of gravity of the laser marker 1 to inhibit it from turning over due to the weight of the battery pack 5. A region in which the adjustment weight 57 is arranged will be described later.

1-2. Electrical Configuration

An electrical configuration of the laser marker 1 will be explained below with reference to FIG. 7.

Figure 7:
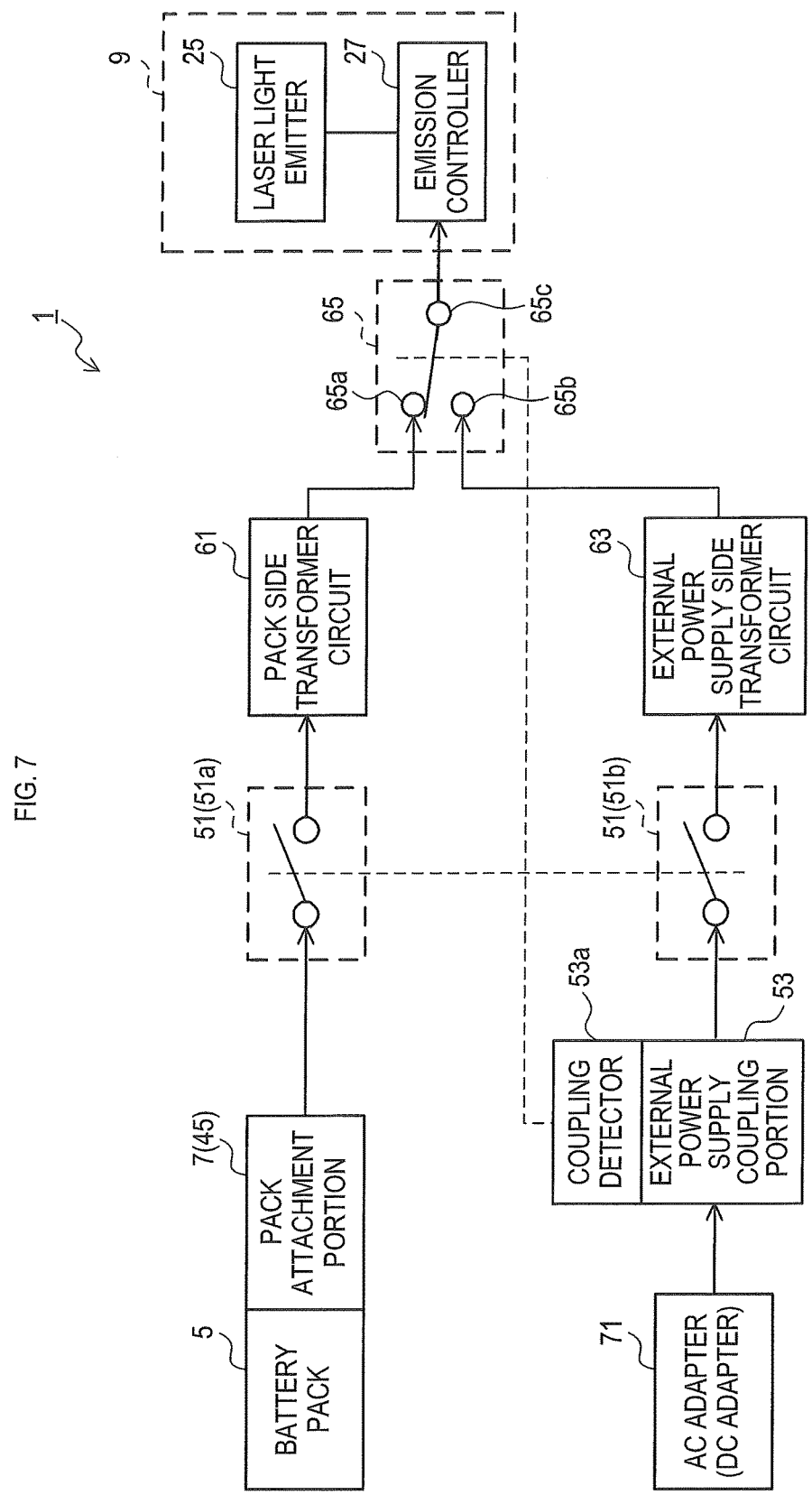
FIG. 7 is a block diagram showing an electrical configuration of the laser marker.

FIG. 7 is a block diagram showing the electrical configuration of the laser marker 1.

In addition to the battery pack 5, the pack attachment portion 7, the laser light generator 9, the operation switch 51, and the external power supply coupling portion 53, which are described above, the laser marker 1 comprises a pack side transformer circuit 61, an external power supply side transformer circuit 63, and a selector switch 65.

The operation switch 51 comprises a pack side switch portion 51a and an external power supply side switch portion 51b, and is configured such that a state (ON or OFF) of each switch portion can be changed over through operation by the user.

As shown in FIG. 7, the pack attachment portion 7 (specifically, the electrode terminals 45) is electrically coupleable to the laser light generator 9 via the operation switch 51 (specifically, the pack side switch portion 51a), the pack side transformer circuit 61, and the selector switch 65. The pack side transformer circuit 61 is a circuit that converts (lowers) an output voltage (e.g., 12.0 V) of the battery pack 5 attached to the pack attachment portion 7 into a voltage (e.g., 7.0 V) suitable for driving the laser light generator 9.

The external power supply coupling portion 53 is electrically coupleable to the laser light generator 9 via the operation switch 51 (specifically, the external power supply side switch portion 51b), the external power supply side transformer circuit 63, and the selector switch 65. The external power supply side transformer circuit 63 is a circuit that converts (raises) an output voltage (e.g., 5.0 V) of the AC adapter 71 coupled to the external power supply coupling portion 53 into a voltage (e.g., 7.0 V) suitable for driving the laser light generator 9.

The external power supply coupling portion 53 comprises a coupling detector 53a that detects whether an external power supply (e.g., the AC adapter 71) is coupled to the external power supply coupling portion 53. A detection result at the coupling detector 53a is used for setting a switching state of the selector switch 65. Specifically, when coupling of the external power supply is not detected at the coupling detector 53a, the selector switch 65 is set to a state in which a contact 65a and a contact 65c are connected to each other, to thereby couple the pack side transformer circuit 61 and the laser light generator 9 to each other. In contrast, when coupling of the external power supply is detected at the coupling detector 53a, the selector switch 65 is set to a state in which a contact 65b and the contact 65c are connected to each other, to thereby couple the external power supply side transformer circuit 63 and the laser light generator 9 to each other.

In the thus-configured laser marker 1, when the operation switch 51 (the pack side switch portion 51a and the external power supply side switch portion 51b) is ON and the external power supply (the AC adapter 71) is not coupled to the external power supply coupling portion 53, electric power is supplied to the laser light generator 9 from the battery pack 5.

When the operation switch 51 is ON and the external power supply (the AC adapter 71) is coupled to the external power supply coupling portion 53, electric power is supplied to the laser light generator 9 from the external power supply (the AC adapter 71).

When the operation switch 51 is OFF, power supply to the laser light generator 9 is not performed regardless of whether the external power supply (the AC adapter 71) is coupled to the external power supply coupling portion 53.

1-3. Battery Pack and Pack Attachment Portion

As shown in FIG. 3, the battery pack 5 has a shape in which a maximum vertical dimension H1 is smaller than a maximum horizontal dimension W1 (H1<W1) in a state where the battery pack 5 is attached to the pack attachment portion 7.

In the thus-shaped battery pack 5, the maximum vertical dimension H1 (height dimension H1) in the state where the battery pack 5 is attached to the pack attachment portion 7 can be reduced compared to a battery pack having a shape in which the maximum vertical dimension H1 is larger than the maximum horizontal dimension W1 (H1>W1) in the state where the battery pack 5 is attached to the pack attachment portion 7.

Thus, the laser marker 1 as a whole can be inhibited from being large in vertical dimension (height dimension), and a risk that the laser marker 1 might turn over with an increase in the height dimension can be reduced.

As described above, the pack attachment portion 7 is configured such that the two slide rails 43 are provided parallel to the rear side of the rotating unit 11 (in other words, parallel to the tangential direction of the virtual circle centered about the central axis L1). Here, a direction parallel to the rear side of the rotating unit 11 includes both a horizontal direction and a vertical direction. In the present embodiment, the slide rails 43 are provided parallel to the horizontal direction.

With the thus-configured slide rails 43, a direction of movement of the battery pack 5 while being attached and detached is horizontal, and a vertical movement does not occur. In such a case, while the battery pack 5 is being attached and detached, it is possible to inhibit the battery pack 5 from interfering with regions upper and lower than the pack attachment portion 7 on an outer surface of the main body 3, and thus, occurrence of damage due to such interference can be inhibited.

In particular, the laser marker 1 of the present embodiment is configured such that the horizontal laser light passing portions 21 and the vertical laser light passing portions 23 are arranged in the region upper than the pack attachment portion 7. Thus, if the direction of movement of the battery pack 5 while being attached and detached is vertical, the horizontal laser light passing portions 21 and the vertical laser light passing portions 23 might be scratched due to interference with the battery pack 5. However, in the present disclosure, the direction of movement of the battery pack 5 while being attached and detached is horizontal, and the horizontal laser light passing portions 21 and the vertical laser light passing portions 23 can be inhibited from being scratched due to interference with the battery pack 5. Thus, laser lights can be projected onto a target object properly.

Furthermore, in the laser marker 1 of the present embodiment, the battery pack 5 has a shape in which the maximum vertical dimension H1 is smaller than the maximum horizontal dimension W1 in the state where the battery pack 5 is attached to the pack attachment portion 7, and in the pack attachment portion 7, the slide rails 43 are provided parallel to the horizontal direction. The thus-configured laser marker 1 allows a spacing dimension between the two slide rails 43 to be smaller, to thereby inhibit the height dimension of the laser marker 1 from being larger.

1-4. Laser Light Generator

As described above, the laser light generator 9 comprises the laser light emitter 25 and the emission controller 27.

Here, an explanation will be given about a position in which the emission controller 27 is arranged within the laser marker 1.

Figure 6:
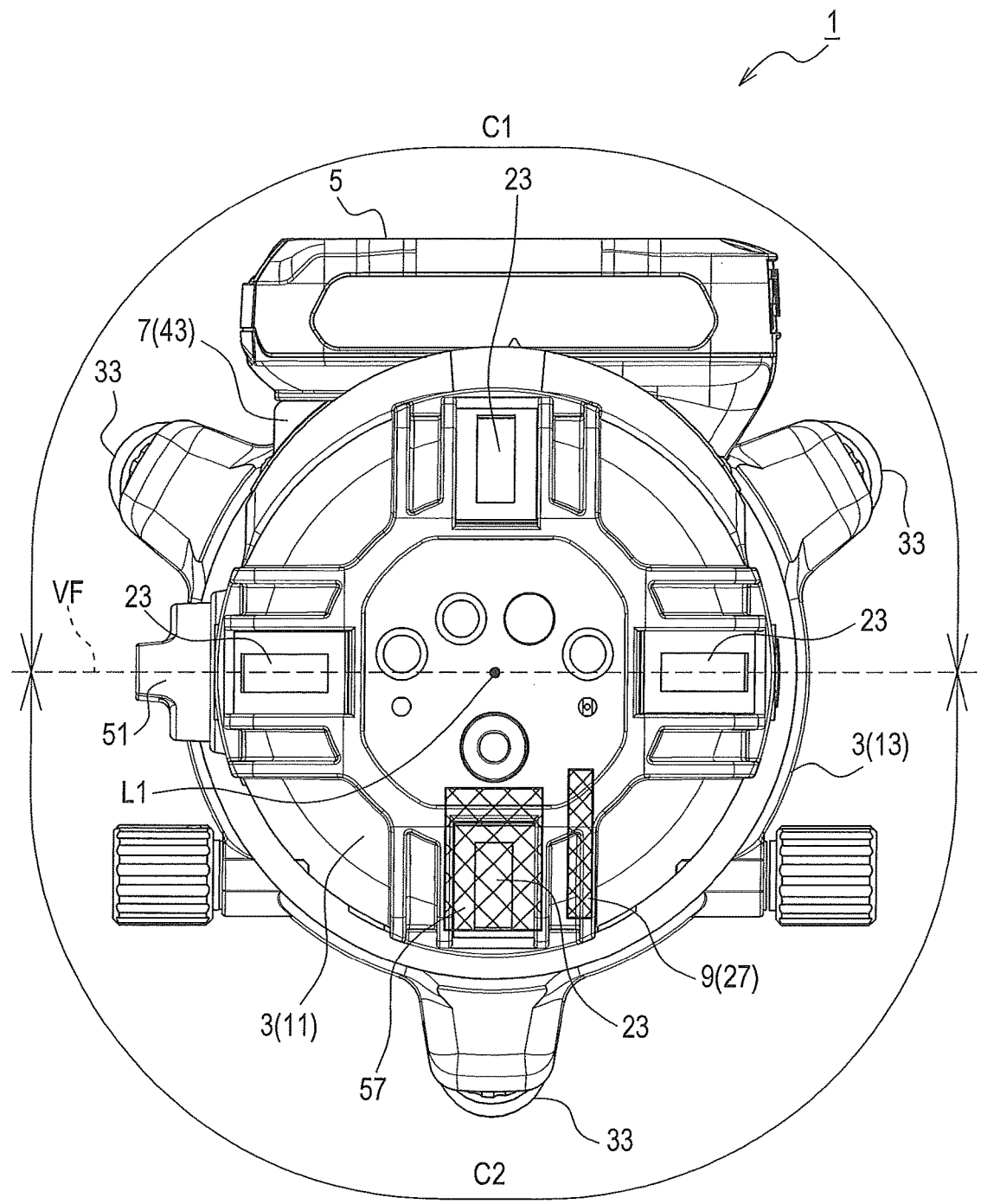
FIG. 6 is an explanatory diagram showing an external appearance of an upper side of the laser marker and a position in which the battery pack (a pack attachment portion) is provided.

As shown in FIG. 6, in a case where a virtual plane VF is imagined that is parallel to the slide rails 43 in the pack attachment portion 7 and that includes the central axis L1, the laser marker 1 is divided by the virtual plane VF into a first region C1 including the pack attachment portion 7 and a second region C2 not including the pack attachment portion 7.

The emission controller 27 is arranged in the second region C2.

Since the first region C1 includes the pack attachment portion 7, the battery pack 5 is to be arranged in the first region C1. The battery pack 5 is an element having a relatively large weight among elements of the laser marker 1, and is to be arranged in the first region C1.

That is, the emission controller 27 is arranged not in the first region C1, where the pack attachment portion 7 (the battery pack 5) is arranged, but in the second region C2, which is different from the first region C1.

With the above-described configuration in which the pack attachment portion 7 (the battery pack 5) and the emission controller 27 are arranged in the regions different from each other, the center of gravity of the laser marker 1 can be brought closer to the central axis L1, compared to a case in which the pack attachment portion 7 (the battery pack 5) and the emission controller 27 are arranged in the same region.

This can inhibit the center of gravity of the laser marker 1 from being deviated to a battery pack side, and the risk that the laser marker 1 might turn over is thereby reduced.

Figure 5:
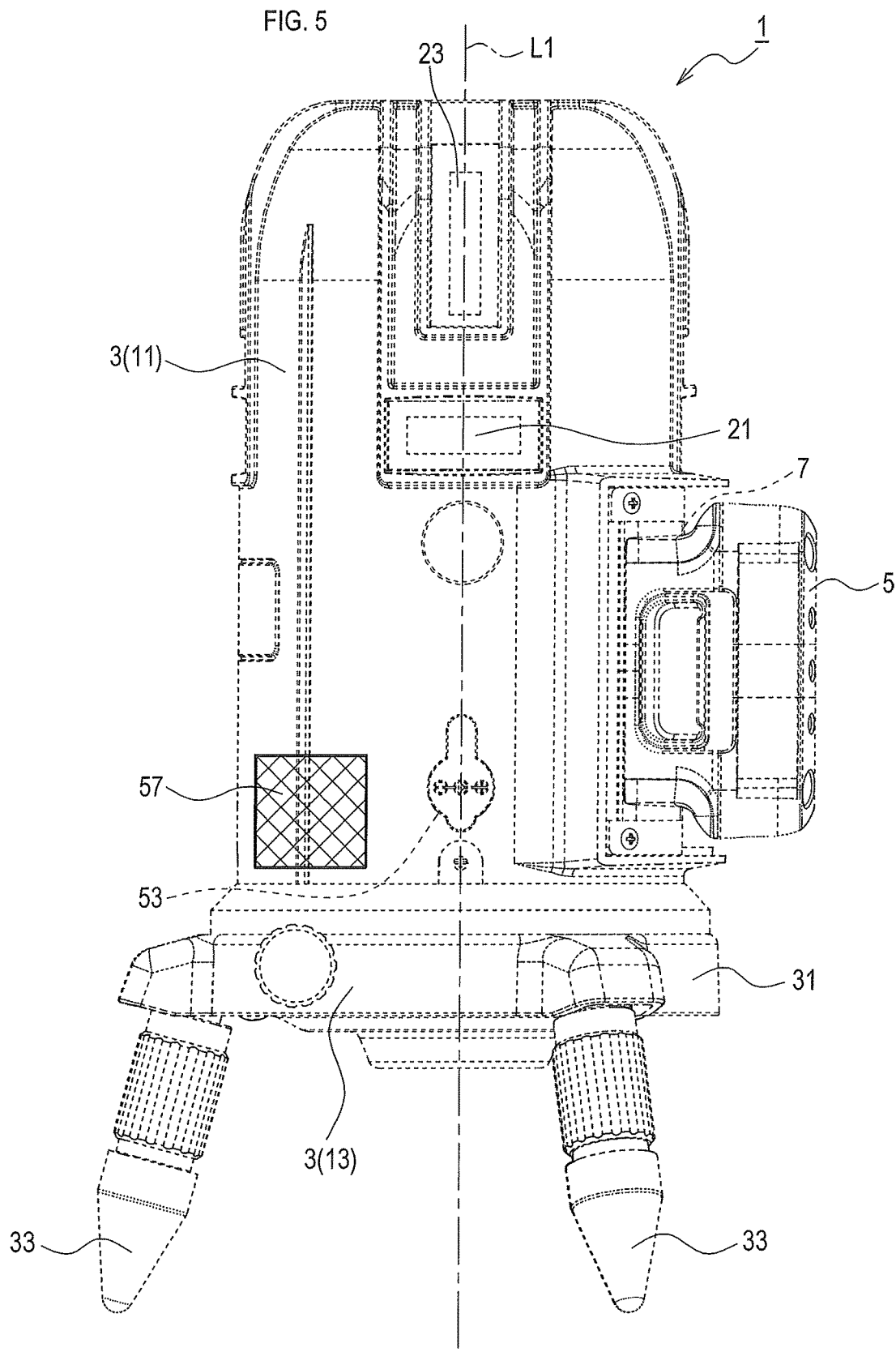
FIG. 5 is an explanatory diagram showing a region in which an adjustment weight is provided within the laser marker.

As shown in FIGS. 5 and 6, the second region C2 has the adjustment weight 57 arranged therein that adjusts the position of the center of gravity of the laser marker 1. The adjustment weight 57 is provided to the laser marker 1 when the center of gravity is deviated to the battery pack side in spite of presence of the other elements in the laser marker 1 and the laser marker 1 might turn over.

The weight and the position of the adjustment weight 57 is adjusted (set) such that, when the laser marker 1 is viewed planarly as shown in FIG. 6, the center of gravity of the laser marker 1 is within a triangular region having vertexes on the three leg portions 33 (specifically, portions contacting the ground). In the present embodiment, the adjustment weight 57 is arranged in the second region C2 so that at least part of the adjustment weight 57 intersects a plane passing through the central axis L1 and perpendicular to the virtual plane VF. In a vertical direction (height direction), as shown in FIG. 5, the adjustment weight 57 is arranged such that a lower end thereof is located lower than a lower end of the battery pack 5.

1-5. External Power Supply Receiving Portion

As described above, the laser marker 1 comprises the external power supply coupling portion 53 on the side face of the rotating unit 11 of the main body 3. The external power supply coupling portion 53 is electrically coupleable to the external power supply (the AC adapter 71).

With the thus-configured external power supply coupling portion 53, the laser marker 1 can receive electric power from the external power supply, other than from the battery pack 5. This enables the laser marker 1 to emit laser lights by being supplied with electric power from the external power supply, even when the battery pack 5 is in "a state in which a remaining energy is 0" or in "a failed state".

The AC adapter 71 is an external power supply having an output voltage of 4.5-5.5 V. That is, the external power supply coupling portion 53 is configured to be coupled to an external power supply having an output voltage of 4.5-5.5 V. The external power supply (the AC adapter 71) having an output voltage of such a range is widely distributed as a general-purpose article, and is easily available.

This enables the laser marker 1 to emit laser lights by being supplied with electric power from the external power supply (the AC adapter 71), even when the battery pack 5 unexpectedly gets into "a state in which a remaining energy is 0" or in "a failed state".

1-6. Effects

As explained above, in the laser marker 1 of the present embodiment, the pack attachment portion 7 is provided on a side face of the main body 3, and the pack attachment portion 7 comprises the two slide rails 43 provided parallel to the rear side of the rotating unit 11 (in other words, parallel to the tangential direction of the virtual circle centered about the central axis L1). That is, the pack attachment portion 7 is configured such that the battery pack 5 is attached thereto and detached therefrom by sliding the battery pack 5 along the slide rails 43.

With such a style in which the battery pack 5 is attached and detached by sliding it parallel to the side face of the main body 3, the battery pack 5 can be arranged in a region away from the center position of the main body 3 (the central axis L1), compared to a style in which a battery pack is attached and detached by moving it in a direction perpendicular to the outer surface of the main body 3 (a push-in style).

This makes it possible to reduce influence of the region in which the battery pack 5 is arranged on the region in which the laser light generator 9 is arranged within the main body 3. That is, the region occupied by the battery pack 5 within the laser marker 1 can be inhibited from being larger, and a degree of freedom of arrangement of the respective elements within the laser marker 1 can be inhibited from being decreased.

Moreover, the laser marker 1 has the configuration in which the chargeable and dischargeable battery pack 5 can be attached to the pack attachment portion 7. Thus, waste of resources can be reduced compared to a case in which a non-rechargeable battery (e.g., dry cell) is used, because the battery pack 5 can be used repeatedly by being charged.

Accordingly, with the laser marker 1, a laser marker can be provided that enables reduction of waste of resources and in which a degree of freedom of arrangement of the respective elements housed inside is unlikely to be decreased.

Furthermore, when the laser marker 1 is manufactured through change of design of existing laser markers, the battery pack 5 can be attached without significantly changing the region in which the respective elements housed inside (e.g., the laser light generator) are arranged.

Next, as described above, the battery pack 5 has a shape in which the maximum vertical dimension H1 is smaller than the maximum horizontal dimension W1 (H1<W1) in the state where the battery pack 5 is attached to the pack attachment portion 7. With such a configuration, the laser marker 1 as a whole can be inhibited from being large in vertical dimension (height dimension), and a risk that the laser marker 1 might turn over with the increase in the height dimension can be reduced.

Next, as described above, the pack attachment portion 7 is configured such that the two slide rails 43 are provided parallel to the rear side of the rotating unit 11 (in other words, parallel to the tangential direction of the virtual circle centered about the central axis L1) and also provided parallel to the horizontal direction.

With the thus-configured slide rails 43, the direction of movement of the battery pack 5 while being attached and detached is horizontal, and a vertical movement does not occur. In such a case, while the battery pack 5 is being attached and detached, it is possible to inhibit the battery pack 5 from interfering with regions upper and lower than the pack attachment portion 7 on the outer surface of the main body 3, and thus, occurrence of damage due to such interference can be inhibited.

Next, in the laser marker 1, the main body 3 comprises the base unit 13 and the rotating unit 11, and the pack attachment portion 7 is provided on the side face of the rotating unit 11.

With such a configuration in which the main body 3 comprises the base unit 13 and the rotating unit 11, directions of projection of laser lights can be easily adjusted through rotation of the rotating unit 11.

On the other hand, by adopting the configuration in which the pack attachment portion 7 is provided on the side face of the rotating unit 11, it becomes unnecessary to arrange a current path extending from the battery pack 5 to the laser light generator 9 so as to extend through both of the base unit 13 and the rotating unit 11. Thus, the current path does not have to be provided in a region in which change of a relative position occurs by rotation, and the current path can be thereby inhibited from being complicated.

Next, in the laser marker 1, the emission controller 27 is arranged not in the first region C1, where the pack attachment portion 7 (the battery pack 5) is arranged, but in the second region C2, which is different from the first region C1.

With the above-described configuration in which the pack attachment portion 7 (the battery pack 5) and the emission controller 27 are arranged in the regions different from each other, the center of gravity of the laser marker 1 can be brought closer to the central axis L1, compared to the case in which the pack attachment portion 7 (the battery pack 5) and the emission controller 27 are arranged in the same region.

This can inhibit the center of gravity of the laser marker 1 from being deviated to the battery pack side, and the risk that the laser marker 1 might turn over is thereby reduced.

Next, the laser marker 1 comprises the external power supply coupling portion 53 to be coupled to the external power supply (the AC adapter 71) that supplies electric power to the laser light generator 9. Thus, the laser marker 1 can receive electric power from the external power supply (the AC adapter 71), other than from the battery pack 5.

Accordingly, the laser marker 1 can emit laser lights by being supplied with electric power from the external power supply, even when the battery pack 5 is in "a state in which a remaining energy is 0" or in "a failed state".

In addition, the AC adapter 71 is an external power supply having an output voltage of 4.5-5.5 V. The external power supply having an output voltage of such a range is widely distributed as a general-purpose article, and is easily available.

Thus, the laser marker 1 can emit laser lights by being supplied with electric power from the external power supply (the AC adapter 71), even when the battery pack 5 unexpectedly gets into "a state in which a remaining energy is 0" or in "a failed state".

Next, the laser marker 1 comprises the pack side transformer circuit 61 and the external power supply side transformer circuit 63.

With the pack side transformer circuit 61 and the external power supply side transformer circuit 63, which respectively convert (transform) output voltages of the battery pack 5 and the external power supply (the AC adapter 71) into a voltage suitable for driving the laser light generator 9, laser illumination can be performed using electric power from a large variety of battery packs and a wide variety of external power supplies.

Next, in the laser marker 1, the laser light generator 9 is configured to generate green laser lights as laser lights.

The laser light generator 9 generating green laser lights consumes larger electric power than that consumed by a conventionally prevailing laser light generator (a laser element) generating red laser lights. Thus, the power supply is discharged in a shorter period of time than in the conventional one.

To cope with this, in the laser marker 1, the chargeable and dischargeable battery pack 5 is used as a power supply, and thus, waste of resources can be further reduced compared to the case in which a non-rechargeable battery (dry cell) is used.

In the present embodiment, the laser marker 1 corresponds to one example of a laser marker of the present disclosure, the laser light generator 9 corresponds to one example of a laser light generator of the present disclosure, the main body 3 corresponds to one example of a main body of the present disclosure, the battery pack 5 corresponds to one example of a battery pack of the present disclosure, the pack attachment portion 7 corresponds to one example of a pack attachment portion of the present disclosure, and the slide rails 43 correspond to one example of slide rails of the present disclosure.

The base unit 13 corresponds to one example of a base unit of the present disclosure, the rotating unit 11 corresponds to one example of a rotating unit of the present disclosure, the laser light emitter 25 corresponds to one example of a laser light emitter of the present disclosure, the emission controller 27 corresponds to one example of an emission controller of the present disclosure, the first region C1 corresponds to one example of a first region of the present disclosure, and the second region C2 corresponds to one example of a second region of the present disclosure.

The external power supply coupling portion 53 corresponds to one example of an external power supply coupling portion of the present disclosure, the AC adapter 71 corresponds to one example of an external power supply of the present disclosure, the pack side transformer circuit 61 corresponds to one example of a pack voltage converter of the present disclosure, and the external power supply side transformer circuit 63 corresponds to one example of an external voltage converter of the present disclosure.

2. Second Embodiment

2-1. Overall Structure

Next, as a second embodiment, a second laser marker 101 having a configuration in which a pack attachment portion is provided to a base unit of a main body.

Figure 8:
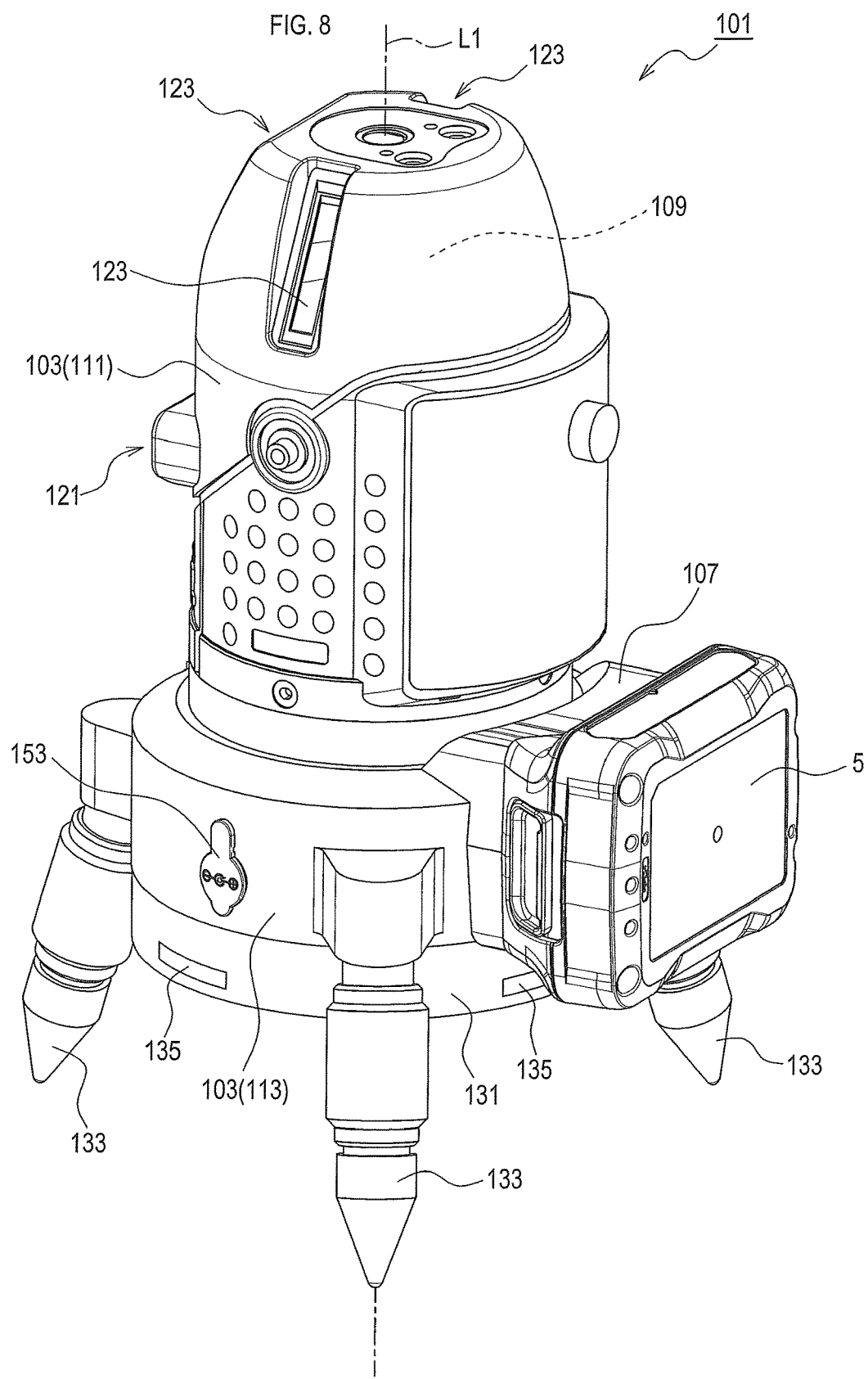
FIG. 8 is a perspective view showing an external appearance of a second laser marker with the battery pack attached thereto.
Figure 9:
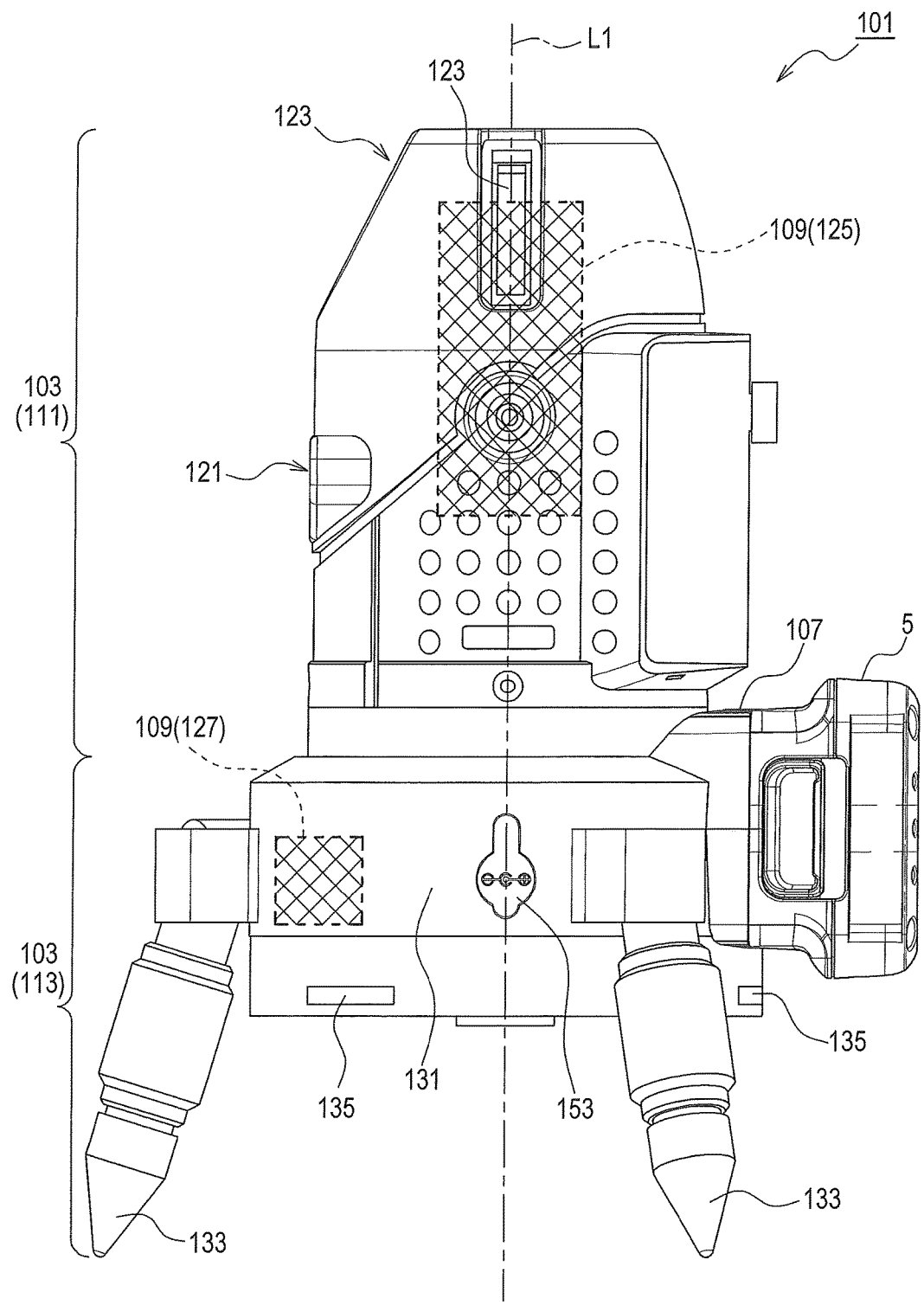
FIG. 9 is a side view showing an external appearance of the second laser marker with the battery pack attached thereto.
Figure 10:
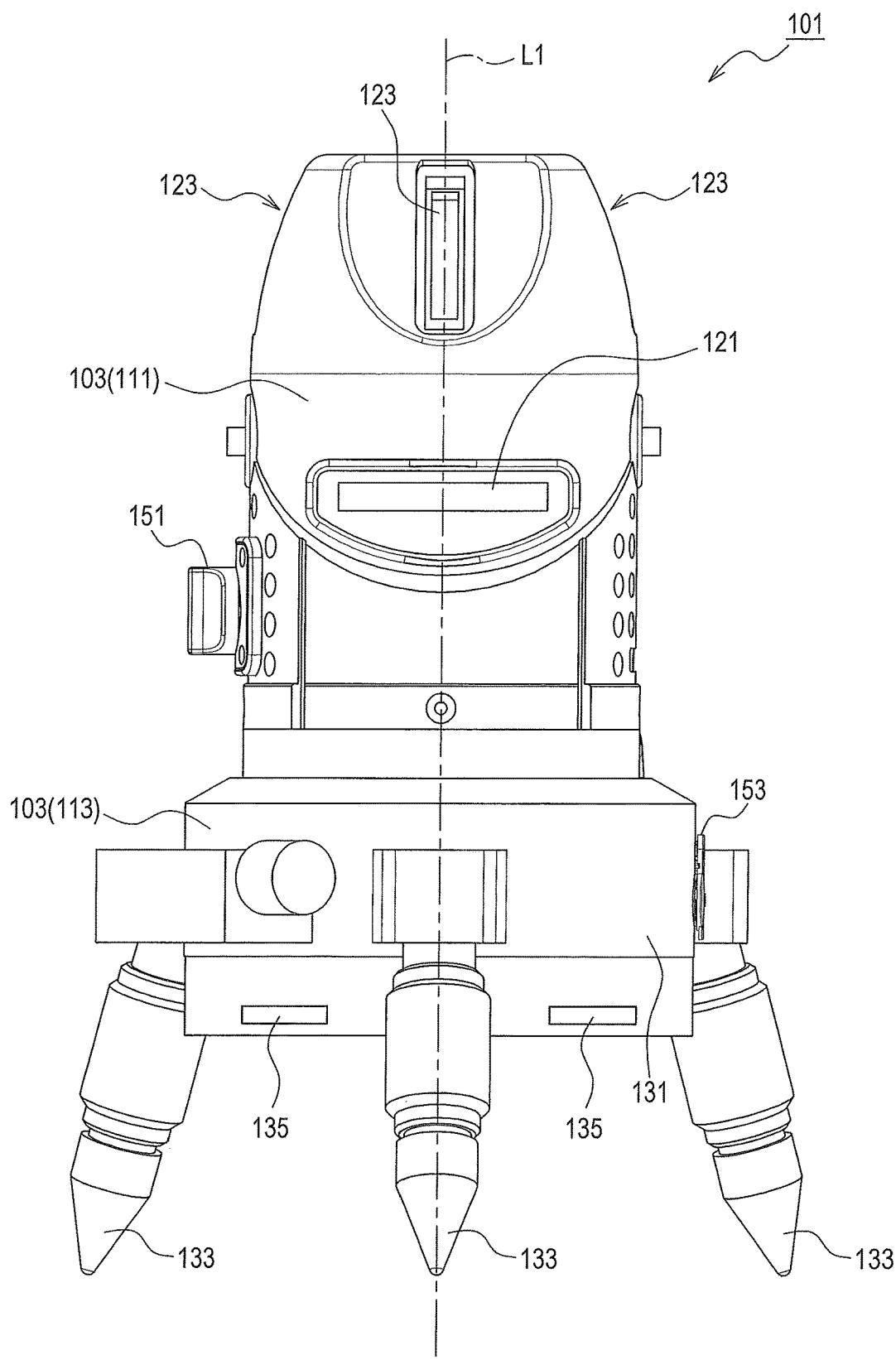
FIG. 10 is a front view showing an external appearance of the second laser marker.
Figure 11:
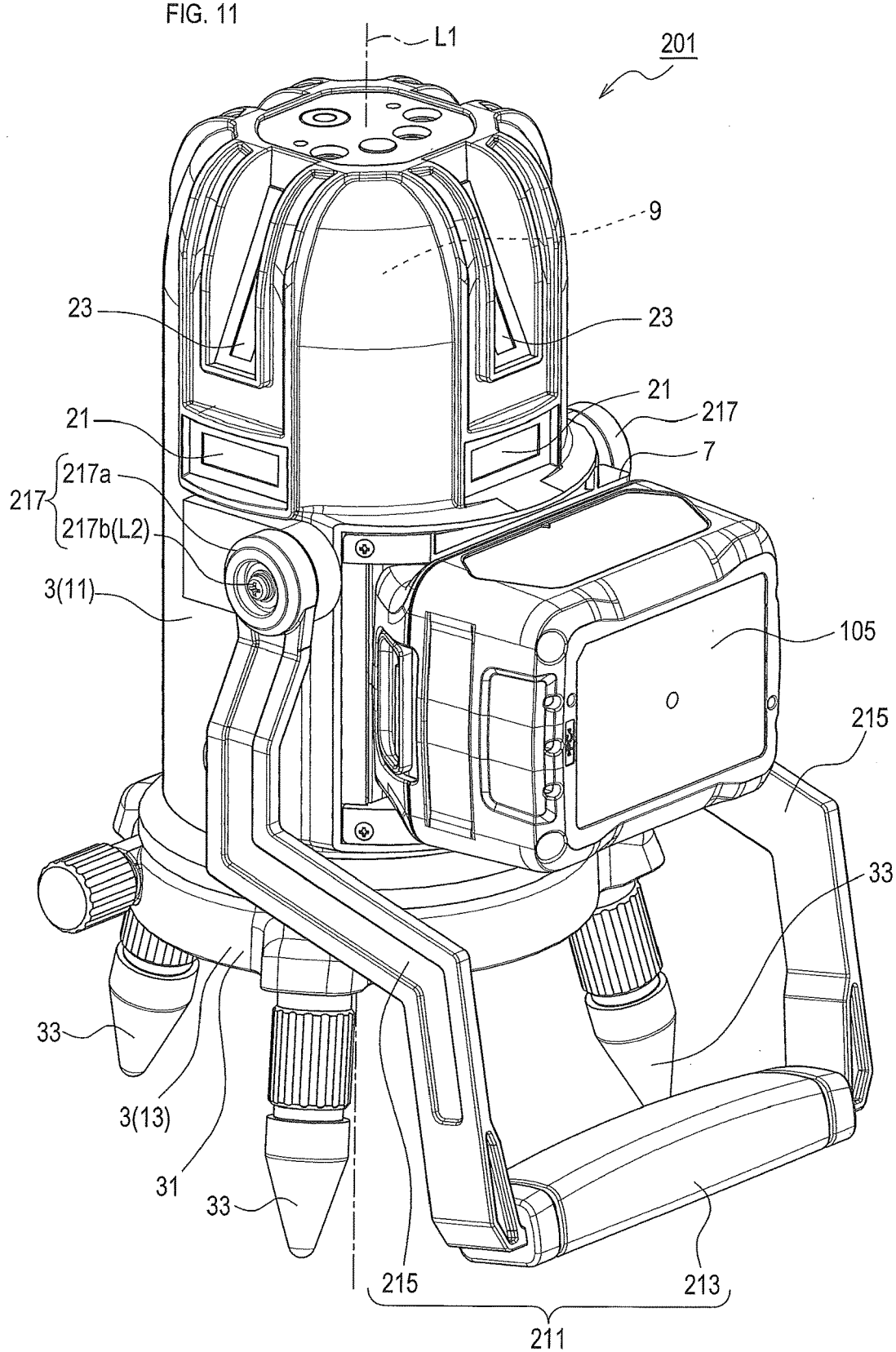
FIG. 11 is a perspective view showing an external appearance of a third laser marker with a supplemental support positioned in a support position.

As shown in FIGS. 8-10, the second laser marker 101 comprises a second main body 103, the battery pack 5, a second pack attachment portion 107, and a second laser light generator 109. In the explanation below, in the second laser marker 101, a side provided with the second pack attachment portion 107 is regarded as a rear side. For example, in the second laser marker 101 shown in FIG. 9, a left side in the drawing is a front side, a right side in the drawing is a rear side, a front side in the drawing is a left side, and a deeper side in the drawing is a right side.

As shown in FIG. 9, the second main body 103 comprises a second base unit 113 that comes in contact with a place in which the second laser marker 101 is placed, and a second rotating unit 111 that is secured on an upper side of the second base unit 113 in such a manner as to be rotatable about a central axis L1 extending in a vertical direction.

The second rotating unit 111 has an approximately circular cylindrical shape extending about the central axis L1 in an axial direction, and a peripheral portion at an upper end of the second rotating unit 111 is formed into a shape including a curved shape (rounded shape) and a linear shape. The second rotating unit 111 accommodates therein a second laser light emitter 125, which is a part of the second laser light generator 109 that generates laser lights. As shown in FIGS. 8-10, the second rotating unit 111 comprises a second horizontal laser light passing portion 121 and second vertical laser light passing portions 123, which allow passage therethrough of laser lights from the inside to the outside.

The second horizontal laser light passing portion 121 is configured to allow passage, from the inside to the outside of the second main body 103, of horizontal laser lights indicating horizontal reference lines, among laser lights emitted from the second laser light generator 109. The second horizontal laser light passing portion 121 provided to the second rotating unit 111 is one in number. Specifically, the second horizontal laser light passing portion 121 is provided on the front side (the left side in FIG. 9 and a front side of FIG. 10) of the second main body 103.

The second vertical laser light passing portions 123 are configured to allow passage, from the inside to the outside of the second main body 103, of vertical laser lights indicating vertical reference lines, among laser lights emitted from the second laser light generator 109. The second vertical laser light passing portions 123 provided to the second rotating unit 111 are three in number. Specifically, the second vertical laser light passing portions 123 are provided on three portions, i.e., the front side (the left side in FIG. 9 and the front side of FIG. 10), the right side (the left side in FIG. 10), and the left side (the right side in FIG. 10) of the second main body 103.

The second base unit 113 comprises a second plate portion 131 and second leg portions 133.

The second plate portion 131 is an approximately disk-plate-shaped member that rotatably supports the second rotating unit 111. The second leg portions 133 are provided so as to support the second plate portion 131, and are three in number.

The explanation of the battery pack 5 is omitted here because it has a configuration similar to that of the first embodiment.

The second pack attachment portion 107 is provided on the rear side of the second base unit 113 of the second main body 103. The second pack attachment portion 107 comprises two slide rails (not shown) provided parallel to the rear side of the second base unit 113 (in other words, parallel to the tangential direction of the virtual circle centered about the central axis L1). These slide rails have a configuration similar to the slide rails 43 of the first embodiment. That is, the second pack attachment portion 107 is configured such that the battery pack 5 is attached thereto and detached therefrom by sliding the battery pack 5 along the slide rails.

Further, the second pack attachment portion 107 comprises two electrode terminals (not shown). These electrode terminals have a configuration similar to the electrode terminals 45 of the first embodiment. That is, these terminals are electrically coupleable to the second laser light generator 109 via an electrical cable (not shown), a second operation switch 151, etc., provided within the second main body 103 (the second rotating unit 111 and the second base unit 113). These electrode terminals are configured to be coupled to the electrode terminals (not shown) of the battery pack 5 when the battery pack 5 is attached to the second pack attachment portion 107.

In short, when attached to the second pack attachment portion 107, the battery pack 5 can supply electric power to the second laser light generator 109 via the electrode terminals.

As shown in FIG. 9, the second laser light generator 109 comprises the second laser light emitter 125 that emits laser lights, and a second emission controller 127 that controls an emission state of laser lights at the second laser light emitter 125.

The second laser light emitter 125 comprises a laser light source (not shown) that generates laser lights by being supplied with electric power, and a laser light converter (not shown) having a lens, etc., that converts the laser lights emitted from the laser light source into linear lights. The second laser light emitter 125 emits, as the linear lights, a horizontal laser light indicating a horizontal reference line and vertical laser lights indicating vertical reference lines. The second laser light emitter 125 is configured to emit one horizontal laser light and three vertical laser lights corresponding to positions where the second horizontal laser light passing portion 121 and the three second vertical laser light passing portions 123 are respectively provided. The second laser light emitter 125 emits green laser lights.

The second laser light emitter 125 is supported in a swingable manner so as to be able to maintain its vertical position by means of a mechanical gimbal system. The second laser light emitter 125 is set to either a fixed state or a swingable state by means of a stopper (not shown) operated linked with operation of the second operation switch 151. Specifically, when the second operation switch 151 is turned ON by a user, the second laser light emitter 125 is set to a swingable state, and when the second operation switch 151 is turned OFF by the user, the second laser light emitter 125 is set to a fixed state.

The second emission controller 127 receives power supply from the battery pack 5, and controls an emission state of laser lights (laser brightness, a direction of emission, etc.) at the second laser light emitter 125 in accordance with a command by the user. The user can set a command regarding an emission state of laser lights (laser brightness, a direction of emission, etc.) by operating a not-shown command switch.

The second laser marker 101 further comprises the second operation switch 151 (see FIG. 10) and a second external power supply coupling portion 153.

The second operation switch 151 is provided on a side face of the second rotating unit 111 of the second main body 103, and is turned ON and OFF through operation by the user. The second external power supply coupling portion 153 is provided on a side face of the second base unit 113 of the second main body 103, and is electrically coupleable to an external power supply (an AC adapter or the like, not shown).

An explanation of an electrical configuration related to the second laser light generator 109, the battery pack 5, the second operation switch 151, and the second external power supply coupling portion 153 is omitted here because it is similar to the electrical configuration related to the laser light generator 9, the battery pack 5, the operation switch 51, and the external power supply coupling portion 53 of the first embodiment.

The second laser marker 101 further comprises an adjustment weight (not shown) that adjusts a position of the center of gravity of the second laser marker 101 to inhibit it from turning over due to the weight of the battery pack 5.

The second laser marker 101 comprises signal receiving portions 135, provided to the second base unit 113 of the second main body 103, which receive external wireless command signals. The signal receiving portions 135 are provided on a side face of the second plate portion 131 of the second base unit 113, and are three in number. Specifically, each of the signal receiving portions 135 is provided in a corresponding region, which is one of three regions formed by dividing the side face of the second plate portion 131 with the three second leg portions 133.

Examples of the command signals received by the signal receiving portions 135 include command signals including command information about, for example, an emission state of laser lights (laser brightness, a direction of emission, switchover among lighting-off, lighting-on, and blinking, switchover between omnidirectional emission and non-omnidirectional emission, etc.). Further, examples of the command signals received by the signal receiving portions 135 include signals for use in infrared communication, signals for use in Bluetooth (registered trademark) communication, and so on. This enables the user to select or switch an emission state of laser lights even at a position away from the second laser marker 101 by using a remote controller that outputs wireless command signals.

In the second laser marker 101, the second pack attachment portion 107 is configured such that a lowermost part thereof is positioned higher than an uppermost part of the signal receiving portions 135. Additionally, the second pack attachment portion 107 is configured such that a lowermost part of the battery pack 5 when attached thereto is positioned higher than the uppermost part of the signal receiving portions 135. This can inhibit external wireless command signals from being blocked by the battery pack 5, and the command signals can thereby be received properly by the signal receiving portions 135.

2-2. Effects

As explained above, in the second laser marker 101 of the second embodiment, the second main body 103 comprises the second base unit 113 and the second rotating unit 111, and the second pack attachment portion 107 is provided on the side face of the second base unit 113.

The second base unit 113 comes in contact with a place in which the second laser marker 101 is placed. The second rotating unit 111 accommodates therein the second laser light emitter 125 of the second laser light generator 109, and comprises the second horizontal laser light passing portion 121 and the second vertical laser light passing portions 123. The second rotating unit 111 is secured on the upper side of the second base unit 113 in such a manner as to be rotatable about the central axis L1 extending in a vertical direction.

With such a configuration in which the second main body 103 comprises the second base unit 113 and the second rotating unit 111, directions of projection of laser lights can be easily adjusted through rotation of the second rotating unit 111.

Further, with the configuration in which the second pack attachment portion 107 is provided on the side face of the second base unit 113, the battery pack 5 having a relatively large weight among elements of the second laser marker 101 is arranged in a lower position. Thus, the center of gravity of the second laser marker 101 becomes lower, and the risk that the second laser marker 101 might turn over is thereby reduced.

Next, in the second laser marker 101, the second pack attachment portion 107 is configured such that the lowermost part thereof is positioned higher than the uppermost part of the signal receiving portions 135. Additionally, the second pack attachment portion 107 is configured such that the lowermost part of the battery pack 5 when attached thereto is positioned higher than the uppermost part of the signal receiving portions 135.

With the thus-configured second laser marker 101, it is possible to inhibit external wireless command signals from being blocked by the battery pack 5, and the command signals can thereby be received properly by the signal receiving portions 135.

The second laser marker 101 corresponds to one example of a laser marker of the present disclosure, the second laser light generator 109 corresponds to one example of a laser light generator of the present disclosure, the second main body 103 corresponds to one example of a main body of the present disclosure, and the second pack attachment portion 107 corresponds to one example of a pack attachment portion of the present disclosure.

The second base unit 113 corresponds to one example of a base unit of the present disclosure, the second rotating unit 111 corresponds to one example of a rotating unit of the present disclosure, the second laser light emitter 125 corresponds to one example of a laser light emitter of the present disclosure, and the second emission controller 127 corresponds to one example of an emission controller of the present disclosure.

The second external power supply coupling portion 153 corresponds to one example of an external power supply coupling portion of the present disclosure, and the signal receiving portions 135 correspond to one example of signal receiving portions of the present disclosure.

3. Third Embodiment

3-1. Overall Structure

Next, as a third embodiment, a third laser marker 201 will be explained that comprises a supplemental support to inhibit overturning of the third laser marker 201.

The third laser marker 201 has a configuration in which a supplemental support 211 is attached to the above-described laser marker 1 of the first embodiment. The third laser marker 201 comprises a large-sized battery pack 105 having a larger rating capacity than that of the battery pack 5 of the first embodiment. Thus, in the explanation below, differences of the third laser marker 201 from the laser marker 1 will be mainly explained. Elements in the third embodiment similar to those in the first embodiment are assigned with the same reference numerals as in the first embodiment, and are not explained here.

As shown in FIGS. 11-14, the third laser marker 201 comprises the supplemental support 211.

The large-sized battery pack 105 has a larger rating capacity than that of the battery pack 5 of the first embodiment. Thus, the large-sized battery pack 105 is larger in volume and in weight than the battery pack 5.

The supplemental support 211 is a member having a roughly U shape with angular corners, and comprises a ground contact portion 213 and two extending portions 215. The ground contact portion 213 is a member corresponding to a bottom of the U shape, and the two extending portions 215 are members corresponding to two sides of the U shape. In the supplemental support 211, two ends on an opening side of the U shape (in other words, ends of the two extending portions 215 on an opposite side from the ground contact portion 213) are attached to the main body 3 in a pivotally movable manner via the coupling portions 217.

The ground contact portion 213 has an elongated shape coupling the other ends of the two extending portions 215 to each other, and its length dimension is sized to enable the user to hold it with his hand. The ground contact portion 213 comprises an inner member as a framework (not shown) and a covering member enclosing the inner member. The inner member is made of a hard resin material (e.g., ABS resin), and is rigid enough to bear the weight of the third laser marker 201. The covering member is made of an elastic material (e.g., rubber, low-resilience urethane, and low-resilience sponge), whereby impact of collision with the ground, etc., can be absorbed and an antiskid function can be fulfilled when the covering member comes in contact with the ground. In other words, a surface of the ground contact portion 213 is made of the elastic material.

The two extending portions 215 are provided so as to extend from the two coupling portions 217 to the ground contact portion 213. The two extending portions 215 are made of a hard resin material (e.g., ABS resin), and are rigid enough to bear the weight of the third laser marker 201.

The two coupling portions 217 each comprise an annular portion 217a and a male screw 217b. The coupling portions 217 are each configured such that the male screw 217b is secured to the main body 3 by inserting the male screw 217b through a hole in the annular portion 217a. In this way, the two coupling portions 217 couple the supplemental support 211 to the main body 3 in a pivotally movable manner.

A pivotal axis L2 (see FIG. 13) of the supplemental support 211 defined by the two coupling portions 217 is set in a horizontal direction and in a direction parallel to the slide rails 43 (see FIG. 2) of the pack attachment portion 7. Positions of the two coupling portions 217 (in other words, positions where not-shown female screws, into which the male screws 217b are secured, are provided) in the main body 3 as viewed planarly from an upper side of the central axis L1 are set so that, when the supplemental support 211 is fixed in a position shown in FIG. 12 (hereinafter referred to as a support position), the ground contact portion 213 and the two extending portions 215 surround at least a region in which the pack attachment portion 7 is provided on the side face of the main body 3 (see FIG. 13).

Figure 12:
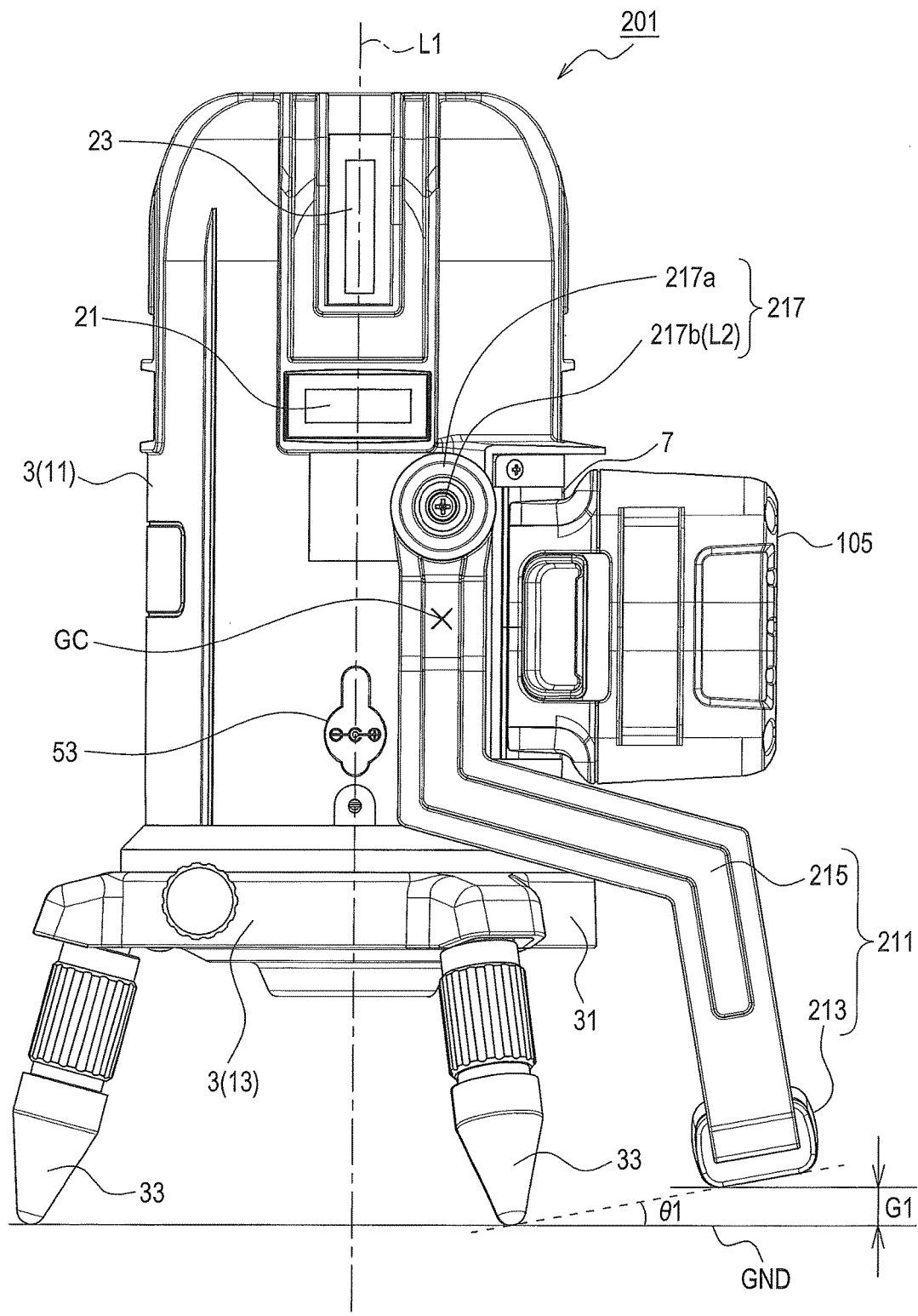
FIG. 12 is a side view showing an external appearance of the third laser marker with the supplemental support positioned in the support position.
Figure 13:
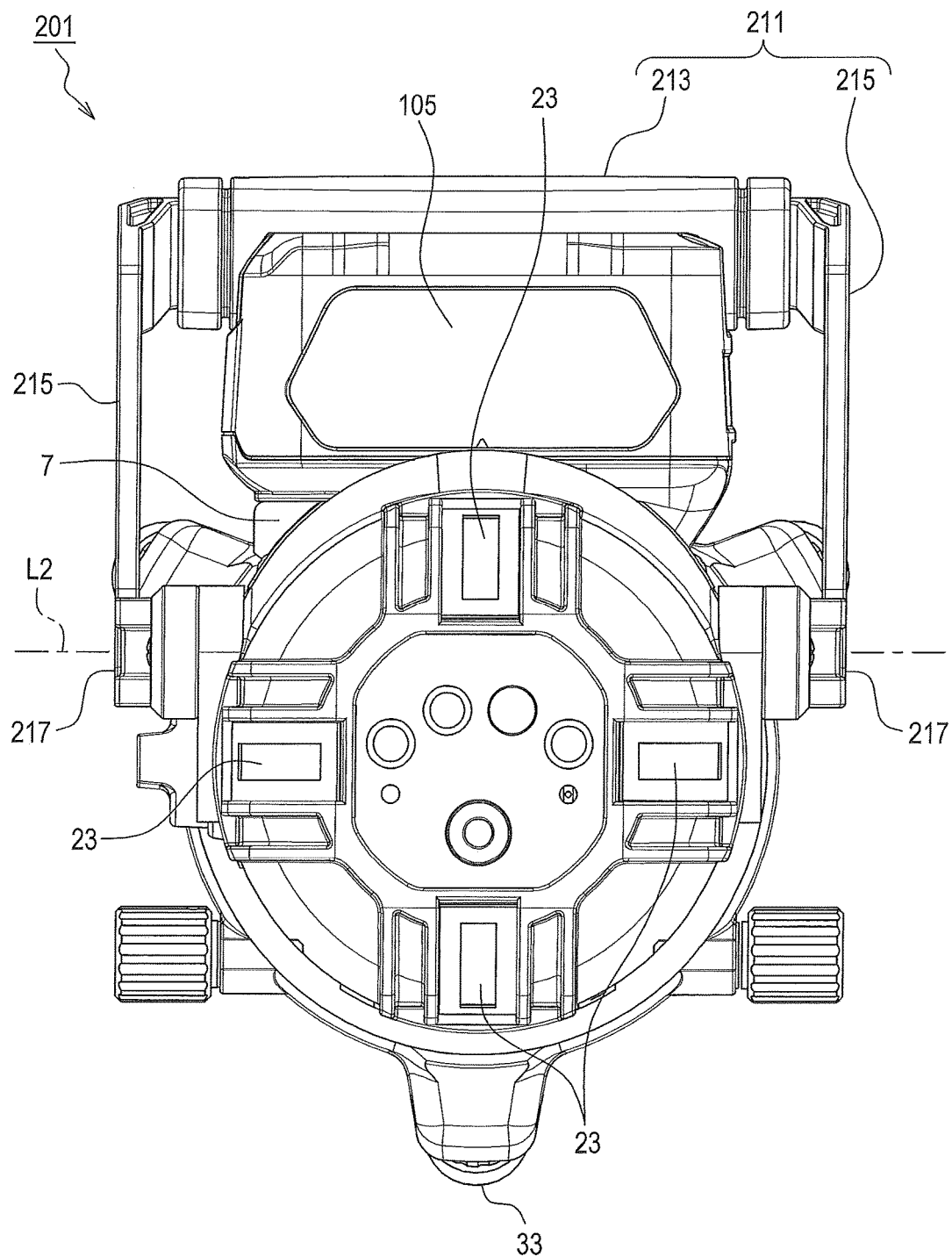
FIG. 13 is a plan view showing an external appearance of the third laser marker with the supplemental support positioned in the support position.

Positions where the two coupling portions 217 are provided in the main body 3 are determined such that, when viewed planarly from the upper side of the central axis L1 of the main body 3, the pivotal axis L2 is positioned in a region closer to the pack attachment portion 7 than to the central axis L1 in the main body 3 (see FIG. 13). Further, positions where the two coupling portions 217 are provided in the main body 3 are determined such that, when viewed from the side, the pivotal axis L2 is positioned higher than the center of gravity GC of the third laser marker 201 in the main body 3 (see FIG. 12).

Figure 14:
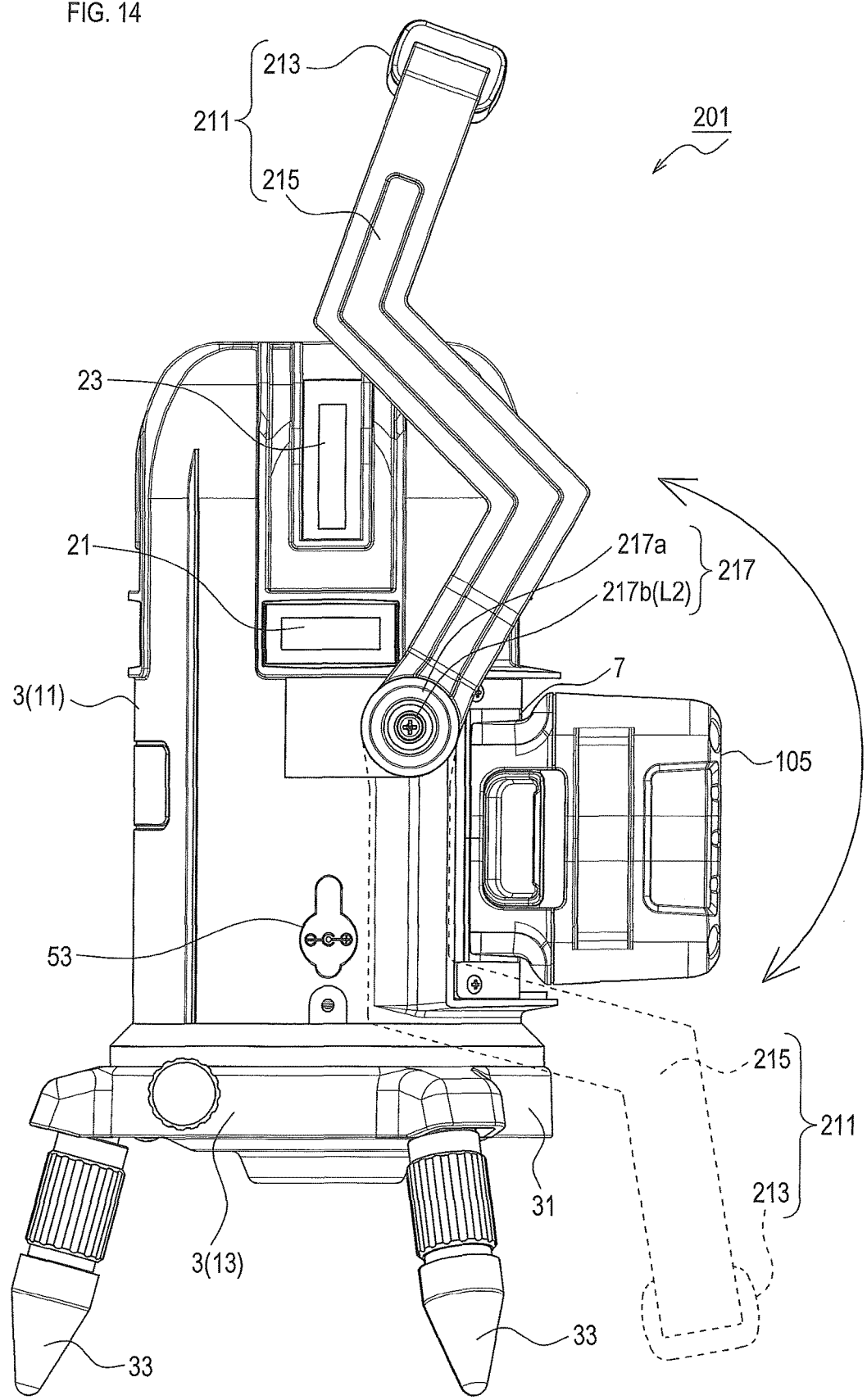
FIG. 14 is a side view showing an external appearance of the third laser marker with a ground contact portion of the supplemental support positioned higher than a main body.

As shown in FIG. 14, the supplemental support 211 is configured such that pivotal movement thereof about the coupling portions 217 (the pivotal axis L2) enables the ground contact portion 213 to move within a range at least from a lowermost position in the drawing (a position shown with dotted lines, corresponding to the support position) to a specified position (not shown) on the front side of the main body 3 via an uppermost position in the drawing (a position shown with solid lines).

The supplemental support 211 is configured to be fixed provisionally (positioned) at least in the support position within the pivotally movable range by means of a positioning portion (not shown) provided in advance. The positioning portion may comprise, for example, a rounded convex portion and a concave portion that can be fitted with the convex portion. One of the convex portion and the concave portion is provided to the supplemental support 211 and the other is provided to the main body 3 at a specified position circumferential about the pivotal axis L2 in a region in which the supplemental support 211 (specifically, the annular portion 217*a*) and the main body 3 are in contact with (face) each other. Pivotal movement of the supplemental support 211 with respect to the main body 3 is restricted by the mutual fitting between the convex portion and the concave portion, to thereby enable the supplemental support 211 to be fixed provisionally (positioned) in the support position. The convex portion may have a fixed form in which a projection dimension is constant, or may have a variable form in which the projection dimension is varied by means of a spring, etc.

When the supplemental support 211 is positioned (fixed provisionally) in the support position, the ground contact portion 213 is positioned lower than the pack attachment portion 7, and is positioned so as to face a ground GND, which is in contact with the three leg portions 33, leaving a gap G1 therebetween (see FIG. 12).

The three leg portions 33 are provided to a bottom of the main body 3 (the plate portion 31) for contact with a place in which the third laser marker 201 is placed, and are independently variable in length dimension (capable of expansion and contraction). In this way, even when the place in which the third laser marker 201 is placed is inclined or has a level difference, a position of the third laser marker 201 can be adjusted so that the central axis L1 becomes vertical by adjusting the length dimension of each of the three leg portions 33. FIG. 12 shows the third laser marker 201 in a state in which each of the three leg portions 33 is shortest.

As shown in FIG. 12, in the third embodiment, the supplemental support 211 is configured such that an auxiliary angle θ1 between the ground GND (virtual ground) in a case where the three leg portions 33 are shortest and a ground plane in a case where the third laser marker 201 is tilted (i.e., a virtual plane in contact with a tip of the leg portion 33 located on the right side in FIG. 12 and an edge of the supplemental support 211) is within a specified range (e.g., a range of 10-20 degrees). The third laser marker 201 has a function of notifying the user that the third laser marker 201 is tilted by controlling the laser output to a blinking state when a tilt angle of the third laser marker 201 becomes a specified notification angle θth (e.g., 2-3 degrees) or greater.

That is, in the third laser marker 201, the shapes of the ground contact portion 213 and the extending portions 215 of the supplemental support 211 are determined so that the auxiliary angle θ1 is greater than the notification angle θth. In this way, when the third laser marker 201 is in a state of being supported by the supplemental support 211, the third laser marker 201 will control the laser output to a blinking state without fail, whereby the user can be reliably notified that the third laser marker 201 is in a tilted state.

Further in the third embodiment, the shapes of the ground contact portion 213 and the extending portions 215 of the supplemental support 211 are determined so that the gap G1 with respect to the ground GND (virtual ground) in the case where the three leg portions 33 are shortest is sized to allow the user's hand to pass under the ground contact portion 213.

Figure 15:
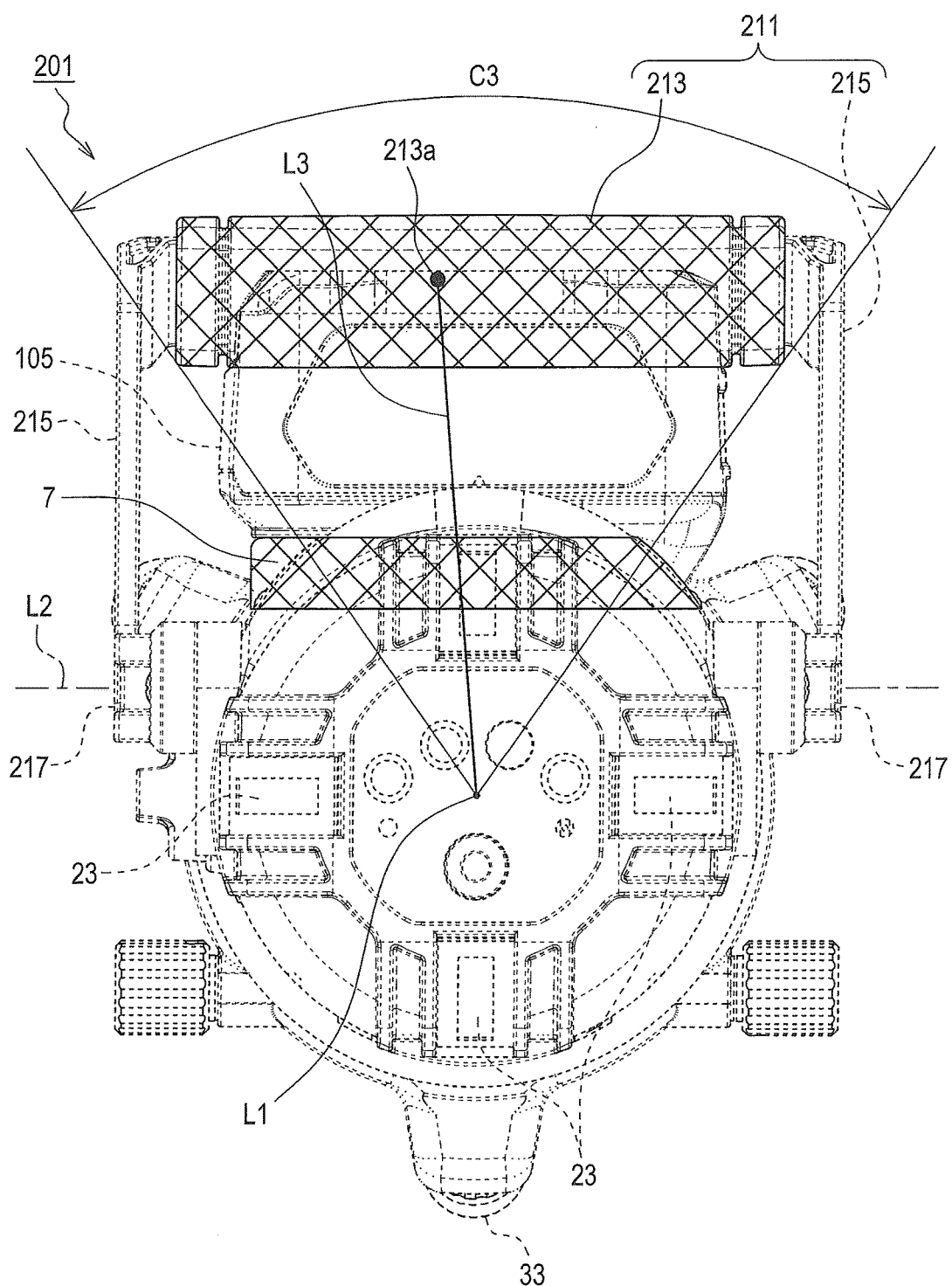
FIG. 15 is an explanatory diagram showing that, when the supplemental support of the third laser marker is positioned in the support position, a virtual line segment connecting part of the ground contact portion and a central axis of the main body to each other intersects a pack attachment portion as viewed planarly from an upper side of the central axis.

Next, as shown in FIG. 15, the supplemental support 211 has a configuration in which, when the supplemental support 211 is positioned (fixed provisionally) in the support position, the ground contact portion 213 is positioned such that a virtual line segment L3 connecting at least part of the ground contact portion 213 and the central axis L1 to each other intersects the pack attachment portion 7, as viewed planarly from the tipper side of the central axis L1 of the main body 3. In FIG. 15, a region in which the ground contact portion 213 is arranged and a region in which the pack attachment portion 7 is provided are each shown in a shaded pattern. In FIG. 15, a line segment connecting a point 213*a* in the ground contact portion 213 and the central axis L1 to each other is depicted as one example of the virtual line segment L3. The virtual line segment L3 is a virtual line segment that intersects at least part of the ground contact portion 213 and that is supposed to be in any position within a range C3 shown in FIG. 15. As shown in FIG. 15, in the third laser marker 201, the supplemental support 211 is configured such that the virtual line segment L3 definitely intersects the region in which the pack attachment portion 7 is provided.

That is, when fixed provisionally in the support position within the pivotally movable range, the supplemental support 211, which is pivotally movable, has a configuration in which the ground contact portion 213 is positioned such that the virtual line segment L3 intersects the pack attachment portion 7 and in which the ground contact portion 213 is positioned so as to face the ground GND (virtual ground), leaving the gap G1 therebetween, in a region lower than the pack attachment portion 7.

Moreover, the supplemental support 211 has a configuration in which the ground contact portion 213 can be used as a handle for the user to hold when the ground contact portion 213 is positioned upper than the main body 3 within the pivotally movable range. That is, the third laser marker 201 can be carried by the user utilizing the ground contact portion 213 as the handle.

As described above, the ground contact portion 213 of the supplemental support 211 is configured to fulfil the function of inhibiting overturning when fixed in the support position, and to fulfil the function as the handle when positioned upper than the main body 3.

3-2. Effects

As explained above, in the third laser marker 201 of the third embodiment, the supplemental support 211 is attached to the main body 3 in a pivotally movable manner.

When fixed provisionally (positioned) in the specified support position within the movable range, the supplemental support 211 has a configuration in which the ground contact portion 213 is positioned such that the virtual line segment L3 intersects the pack attachment portion 7 and in which the ground contact portion 213 is positioned so as to face the ground GND (virtual ground), leaving the gap G1 therebetween, in the region lower than the pack attachment portion 7.

In the third laser marker 201 having the thus-configured supplemental support 211, even when the center of gravity is deviated toward the large-sized battery pack 105 by the weight of the large-sized battery pack 105 attached to the pack attachment portion 7 to thereby cause the third laser marker 201 to be tilted, the supplemental support 211 (specifically, the ground contact portion 213) comes in contact with the ground GND and can support the third laser marker 201 before it turns over completely.

Thus, with the supplemental support 211, the third laser marker 201 can be inhibited from turning over even when the large-sized battery pack 105 having a large weight is attached thereto.

Further, with the supplemental support 211, which is pivotally movable, the third laser marker 201 can be switched between a state in which the supplemental support 211 is fixed in the support position and a state in which the supplemental support 211 is not fixed in the support position depending on a use state of the third laser marker 201. For example, while being used, the third laser marker 201 can be inhibited from turning over by fixing the supplemental support 211 in the support position. Alternatively, while not being used (while being carried or stored), the third laser marker 201 can be used in a state suitable for carriage or storage by allowing the supplemental support 211 to be freely movable (pivotally movable) to a position different from the support position.

Next, in the third laser marker 201, the supplemental support 211 comprises the ground contact portion 213 that can be utilized as the handle for the user to hold. Such a configuration removes the necessity to separately provide a supplemental support (a member to inhibit overturning) and a handle (a member for the user to hold), to thereby make it possible to inhibit an increase in the number of components constituting the third laser marker 201.

In particular, in the supplemental support 211, the ground contact portion 213 can be moved higher than an upper end of the main body, and "the member to come in contact with the ground for inhibiting overturning" and "the handle (the member for the user to hold)" are configured as the same member (the ground contact portion 213). By adopting such a configuration, the supplemental support 211 can be inhibited from being larger, compared to a case in which "the member to come in contact with the ground for inhibiting overturning" and "the handle (the member for the user to hold)" are separately provided in different regions in the supplemental support 211.

Next, in the third laser marker 201, the supplemental support 211 is attached to the side face of the main body 3 via the two coupling portions 217 (the annular portion 217a and the male screw 217b), and is pivotally movable about the two coupling portions 217. The positions of the two coupling portions 217 in the main body 3 as viewed planarly from the upper side of the central axis L1 are set so that, when the supplemental support 211 is fixed in the support position, the ground contact portion 213 and the two extending portions 215 surround the region in which at least the pack attachment portion 7 is provided on the side face of the main body 3.

Since the third laser marker 201 has the configuration in which the supplemental support 211 is attached to the side face of the main body 3 via the two coupling portions 217, the third laser marker 201 can be lifted more stably by means of the supplemental support 211 even when the third laser marker 201 is heavy, compared to a configuration in which the supplemental support 211 is attached via one coupling portion. This enables the user to carry the third laser marker 201 in a stable state by holding the ground contact portion 213 (corresponding to the handle at this situation) of the supplemental support 211, even when the third laser marker 201 has a large weight.

Further, since the third laser marker 201 has the configuration in which the positions of the two coupling portions 217 in the main body 3 are set as described above and in which the supplemental support 211 is pivotally moved to allow the ground contact portion 213 to be moved in a region lower than the pack attachment portion 7, the ground contact portion 213 can be easily positioned so as to satisfy given conditions. The given conditions are to position the ground contact portion 213 such that the virtual line segment L3 intersects the pack attachment portion 7, and to position the ground contact portion 213 so as to face the ground GND (virtual ground), leaving the gap G1 therebetween, in the region lower than the pack attachment portion 7. With the ground contact portion 213 of the supplemental support 211 being in such a position, the third laser marker 201 can be inhibited from turning over.

Next, in the third laser marker 201, the coupling portions 217 (the pivotal axis L2) are provided higher than the center of gravity GC of the third laser marker 201 in the main body 3 (see FIG. 12).

In the thus-configured third laser marker 201, when the user lifts the third laser marker 201 by holding the ground contact portion 213 (corresponding to the handle), the center of gravity GC is positioned lower than the coupling portions 217, and thus, the third laser marker 201 excluding the supplemental support 211 becomes stable. This makes it possible, when the user lifts the third laser marker 201 by holding the ground contact portion 213, to inhibit the third laser marker 201 excluding the supplemental support 211 from pivotally moving to turn over upside down. Thus, the third laser marker 201 can be carried around in a stable state.

Next, in the third laser marker 201, the ground contact portion 213 of the supplemental support 211 has the surface made of the elastic material.

With the thus-configured supplemental support 211, when the third laser marker 201 is tilted and the ground contact portion 213 comes in contact with the ground GND, the portion made of the elastic material on the ground contact portion 213 fulfills an antiskid function, to thereby make the third laser marker 201 more unlikely to turn over. Additionally, in the case where the ground contact portion 213 is used as the handle, the elastic material on the surface of the ground contact portion 213 (in other words, the handle) makes it possible to inhibit the ground contact portion 213 from slipping out of the hand to cause the third laser marker 201 to fall, when the user carries the third laser marker 201 by holding the ground contact portion 213 (the handle).

The third laser marker 201 corresponds to one example of a laser marker of the present disclosure, the leg portions 33 correspond to one example of leg portions of the present disclosure, the supplemental support 211 corresponds to one example of a supplemental support of the present disclosure, the ground contact portion 213 corresponds to one example of "a ground contact portion and a handle provided as a same member" of the present disclosure, the extending portions 215 correspond to one example of extending portions of the present disclosure, and the coupling portions 217 correspond to one example of coupling portions of the present disclosure.

4. Fourth Embodiment 4-1. Overall Structure

Next, as a fourth embodiment, a fourth laser marker 301 will be explained that comprises a supplemental support to inhibit overturning of the fourth laser marker 301.

The fourth laser marker 301 has a configuration in which the supplemental support 211 in the above-described third laser marker 201 of the third embodiment is replaced by a second supplemental support 311. Thus, in the explanation below, differences of the fourth laser marker 301 from the third laser marker 201 will be mainly explained. Elements in the fourth embodiment similar to those in the third embodiment are assigned with the same reference numerals as in the third embodiment, and are not explained here.

As shown in FIGS. 16-19, the fourth laser marker 301 comprises the second supplemental support 311.

The second supplemental support 311 is a roughly L-shaped member, and comprises a ground contact portion 313 and an extending portion 315. In other words, the second supplemental support 311 has a configuration in which one of the two extending portions 215 of the supplemental support 211 is removed and the other of the extending portions 215 is replaced by the extending portion 315 having a thicker shape (see FIG. 17). The extending portion 315 has a high load capacity due to its thicker shape than that of the extending portions 215. Thus, the extending portion 315 can be used, despite being a single member, for supporting the fourth laser marker 301 to inhibit overturning thereof and for carrying the fourth laser marker 301.

In the second supplemental support 311, an end of the extending portion 315 is attached to the main body 3 in a pivotally movable manner via a coupling portion 317, which comprises an annular portion 317a and a male screw 317b (the pivotal axis L2). That is, the second supplemental support 311 is attached to the main body 3 in a pivotally movable manner via the single coupling portion 317.

Figure 19:
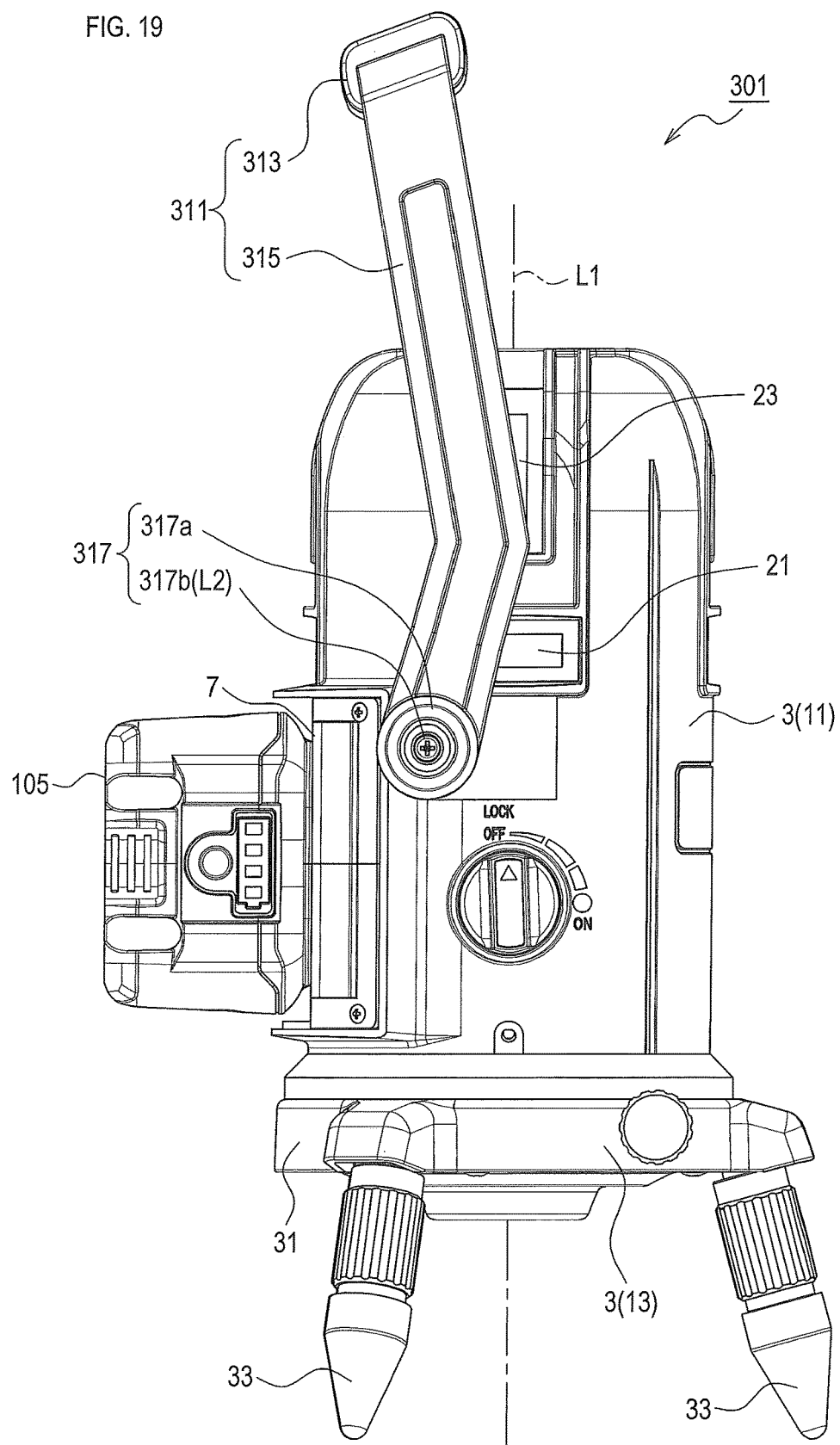
FIG. 19 is a side view showing an external appearance of the fourth laser marker with a ground contact portion of the supplemental support positioned higher than a main body.

The second supplemental support 311 is configured such that pivotal movement thereof about the coupling portion 317 (the pivotal axis L2) enables the ground contact portion 313 to move within a range at least from a lowermost position (shown in FIG. 18, hereinafter referred to as a support position) to a specified position (not shown) on the front side of the main body 3 via an uppermost position (shown in FIG. 19).

Similarly to the supplemental support 211, the second supplemental support 311 is configured to be fixed provisionally (positioned) at least in the support position within the pivotally movable range by means of the positioning portion (not shown) provided in advance.

Figure 17:
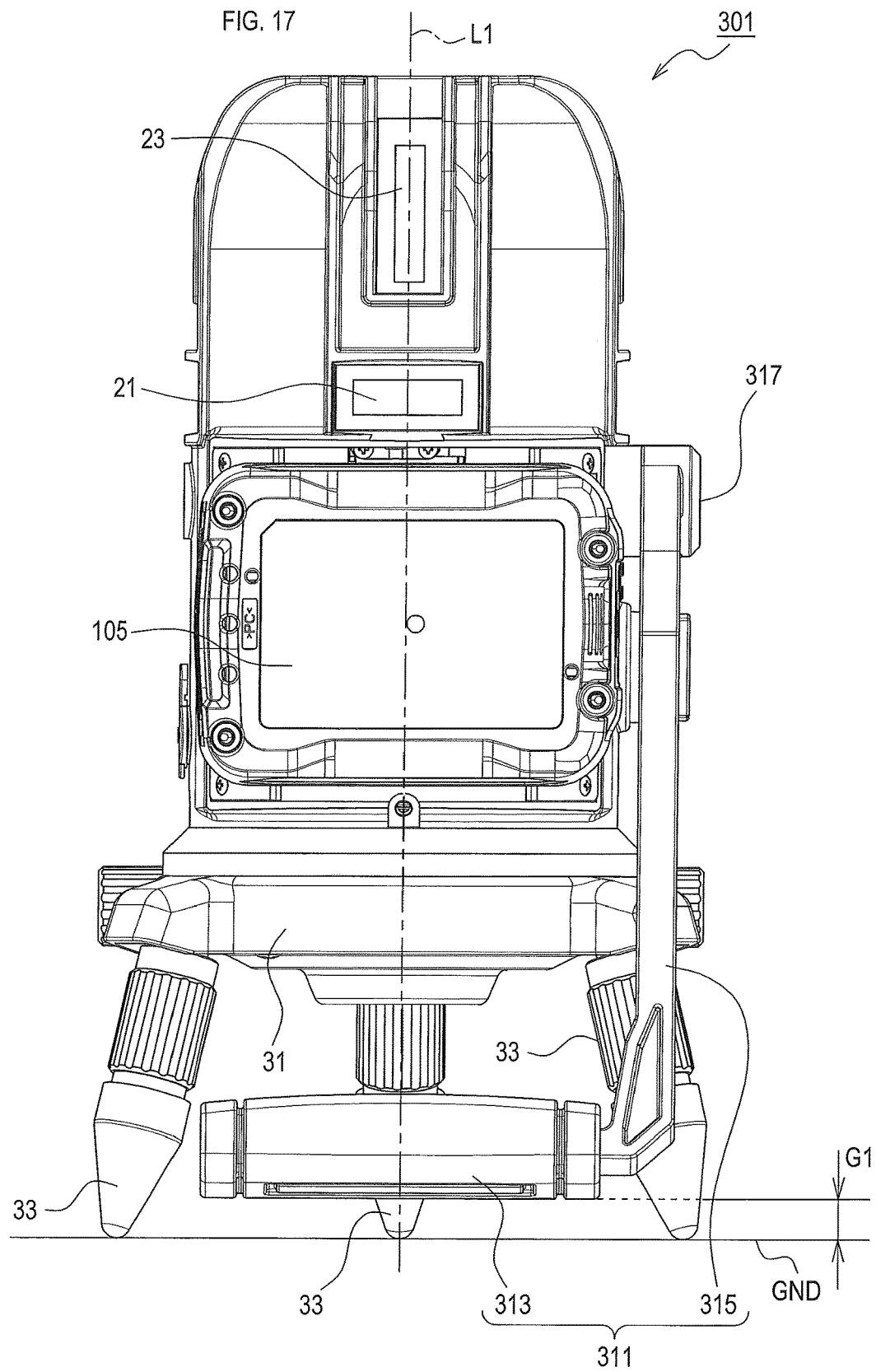
FIG. 17 is an appearance diagram showing a rear side external appearance of the fourth laser marker with the supplemental support positioned in the support position.
Figure 18:
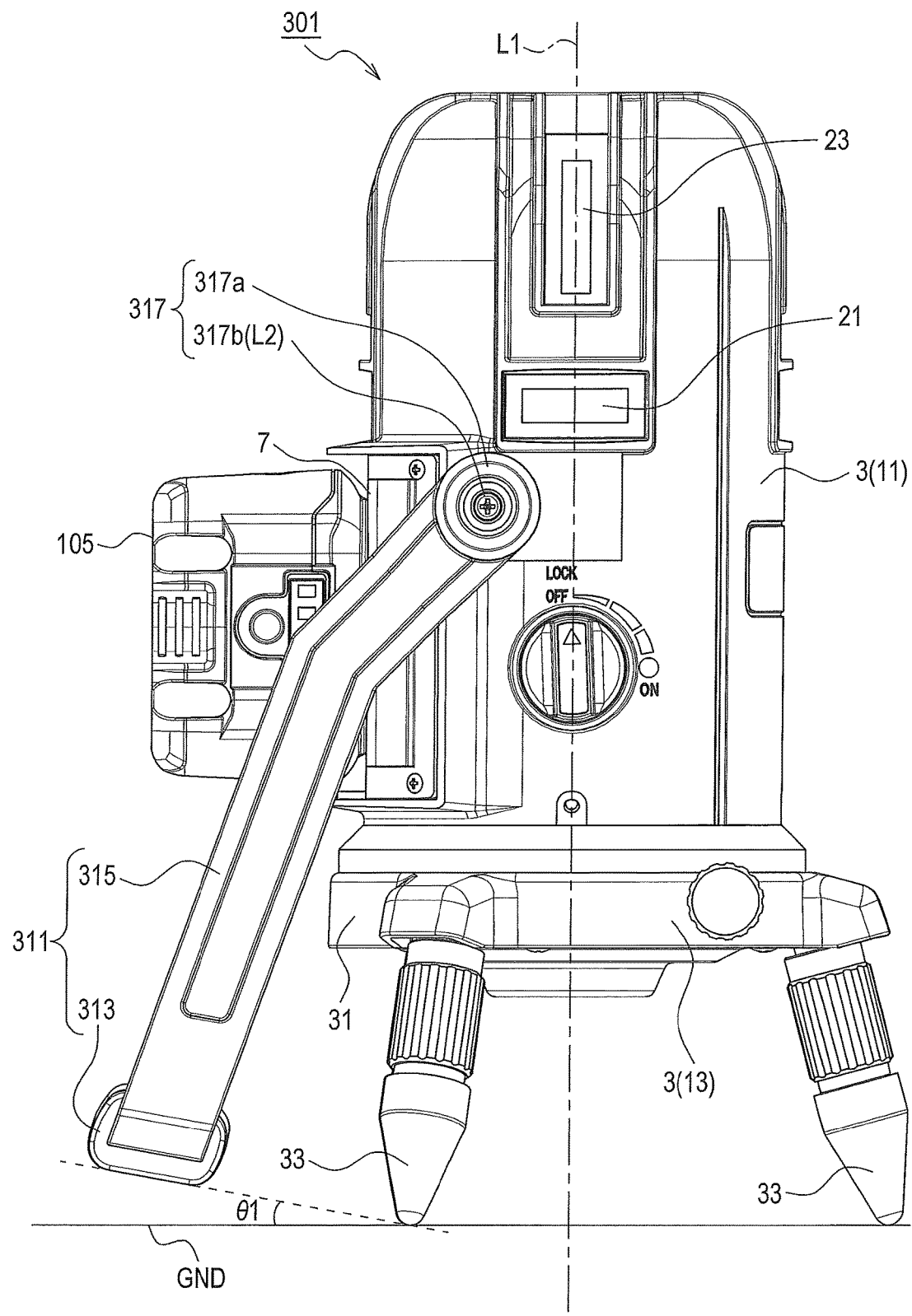
FIG. 18 is a side view showing an external appearance of the fourth laser marker with the supplemental support positioned in the support position.

When the second supplemental support 311 is positioned (fixed provisionally) in the support position, the ground contact portion 313 is positioned lower than the pack attachment portion 7, and is positioned so as to face the ground GND, which is in contact with the three leg portions 33, leaving the gap G1 therebetween (see FIG. 17).

Next, the second supplemental support 311 has a configuration in which, when the second supplemental support 311 is positioned (fixed provisionally) in the support position, the ground contact portion 313 is positioned such that the virtual line segment L3 connecting at least part of the ground contact portion 313 and the central axis L1 to each other intersects the pack attachment portion 7, as viewed planarly from the upper side of the central axis L1 of the main body 3. A drawing showing such a state is not appended hereto, but an arrangement state of the ground contact portion 313 of the second supplemental support 311, the pack attachment portion 7, the central axis L1, and the virtual line segment L3 is similar to that of the ground contact portion 213 of the supplemental support 211, the pack attachment portion 7, the central axis L1, and the virtual line segment L3 shown in FIG. 15.

That is, when fixed provisionally in the support position within the pivotally movable range, the second supplemental support 311, which is pivotally movable similarly to the supplemental support 211, has a configuration in which the ground contact portion 313 is positioned such that the virtual line segment L3 intersects the pack attachment portion 7 and in which the ground contact portion 313 is positioned so as to face the ground GND (virtual ground), leaving the gap G1 therebetween, in a region lower than the pack attachment portion 7.

Figure 16:
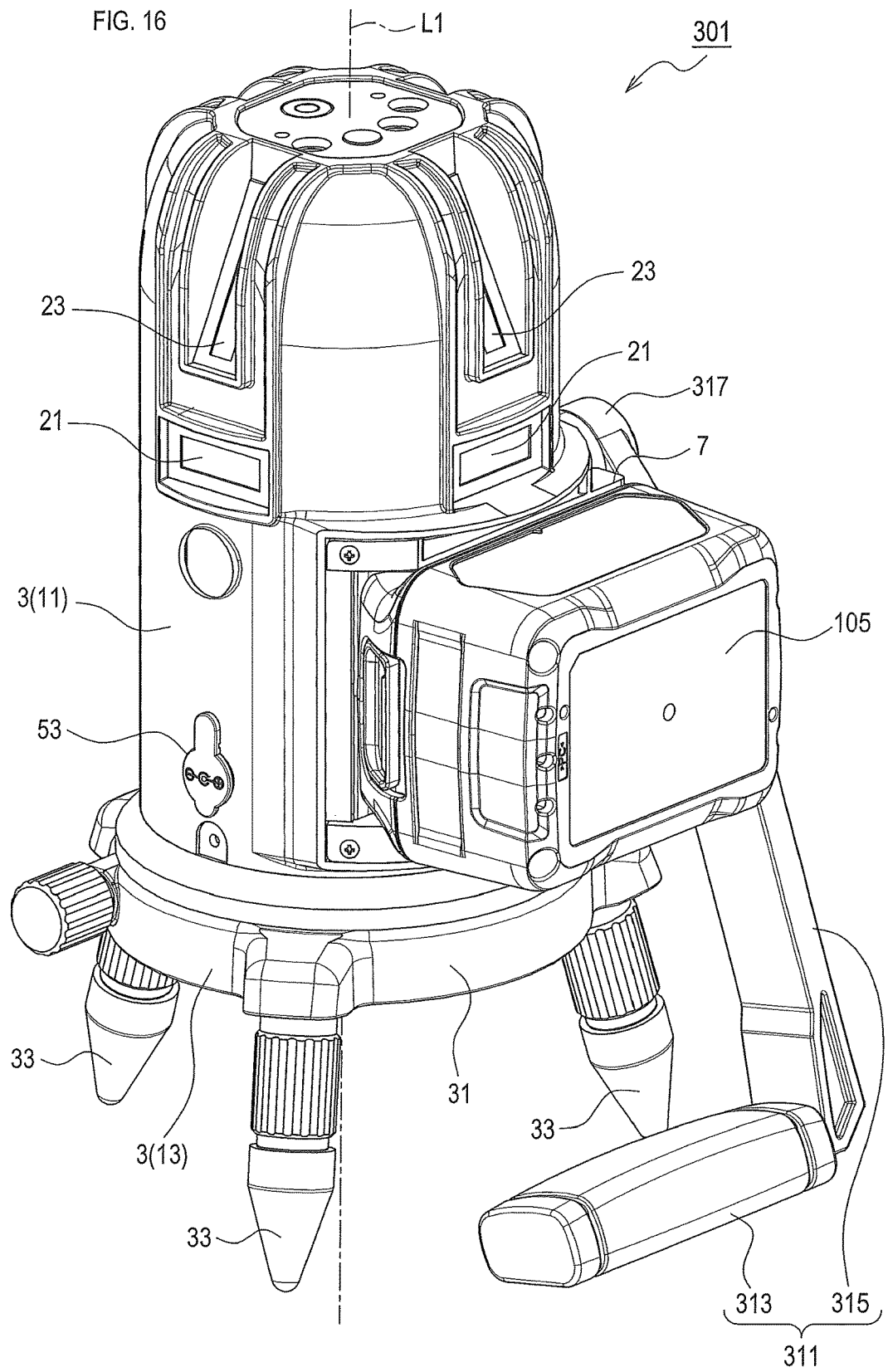
FIG. 16 is a perspective view showing an external appearance of a fourth laser marker with a supplemental support positioned in a support position.

Next, as seen from FIG. 16, a position of the coupling portion 317 in the main body 3 is set so that a region in which the ground contact portion 313 and the extending portion 315 are moved during pivotal movement of the second supplemental support 311 does not overlap a region in which the large-sized battery pack 105 is moved during attachment to and detachment from the pack attachment portion 7.

Moreover, the second supplemental support 311 has a configuration in which the ground contact portion 313 can be used as a handle for the user to hold when the ground contact portion 313 is positioned upper than the main body 3 within the pivotally movable range. That is, the fourth laser marker 301 can be carried by the user utilizing the ground contact portion 313 as the handle.

As described above, the ground contact portion 313 of the second supplemental support 311 is configured to fulfil the function of inhibiting overturning when fixed in the support position, and to fulfil the function as the handle when positioned upper than the main body 3.

4-2. Effects

As explained above, in the fourth laser marker 301 of the fourth embodiment, the second supplemental support 311 is attached to the main body 3 in a pivotally movable manner.

Similarly to the third laser marker 201, in the fourth laser marker 301 having the thus-configured second supplemental support 311, even when the center of gravity is deviated toward the large-sized battery pack 105 by the weight of the large-sized battery pack 105 attached to the pack attachment portion 7 to thereby cause the fourth laser marker 301 to be tilted, the second supplemental support 311 (specifically, the ground contact portion 313) comes in contact with the ground GND and can support the fourth laser marker 301 before it turns over completely.

Further, with the second supplemental support 311, which is pivotally movable, the fourth laser marker 301 can be switched between a state in which the second supplemental support 311 is fixed in the support position and a state in which the second supplemental support 311 is not fixed in the support position depending on a use state of the fourth laser marker 301.

Next, in the fourth laser marker 301, the second supplemental support 311 comprises the ground contact portion 313 that can be utilized as the handle for the user to hold. Such a configuration removes the necessity to separately provide a supplemental support (a member to inhibit overturning) and a handle (a member for the user to hold), to thereby make it possible to inhibit an increase in the number of components constituting the fourth laser marker 301.

Next, in the fourth laser marker 301, the second supplemental support 311 is attached to the side face of the main body 3 via the single coupling portion 317 (the annular portion 317a and the male screw 317b), and is pivotally movable about the coupling portion 317 (the pivotal axis L2).

The position of the coupling portion 317 in the main body 3 is set so that the region in which the ground contact portion 313 and the extending portion 315 are moved during pivotal movement of the second supplemental support 311 does not overlap the region in which the large-sized battery pack 105 is moved during attachment to and detachment from the pack attachment portion 7.

Since the fourth laser marker 301 has the configuration in which the second supplemental support 311 is attached to the side face of the main body 3 via the single coupling portion 317, the region in which the ground contact portion 313 and the extending portion 315 are moved during pivotal movement of the second supplemental support 311 is smaller than in a configuration in which the second supplemental support 311 is attached via two coupling portions. Thus, a degree of freedom of positioning the coupling portion 317 is increased when determining the position of the coupling portion 317 (in other words, a position where a not-shown female screw, into which the male screw 317b is secured, is provided) in the main body 3 so that the region in which the ground contact portion 313 and the extending portion 315 are moved does not overlap the region in which the large-sized battery pack 105 is moved.

The fourth laser marker 301 corresponds to one example of a laser marker of the present disclosure, the second supplemental support 311 corresponds to one example of a supplemental support of the present disclosure, the ground contact portion 313 corresponds to one example of "a ground contact portion and a handle provided as a same member" of the present disclosure, the extending portion 315 corresponds to one example of an extending portion of the present disclosure, and the coupling portion 317 corresponds to one example of a coupling portion of the present disclosure.

5. Fifth Embodiment

5-1. Overall Structure

Next, as a fifth embodiment, a fifth laser marker 401 will be explained that comprises a supplemental support to inhibit overturning of the fifth laser marker 401.

The fifth laser marker 401 has a configuration in which the second supplemental support 311 the above-described fourth laser marker 301 of the fourth embodiment in replaced by a third supplemental support 411. Thus, in the explanation below, differences of the fifth laser marker 401 from the fourth laser marker 301 will be mainly explained. Elements in the fifth embodiment similar to those in the fourth embodiment are assigned with the same reference numerals as in the fourth embodiment, and are not explained here.

Figure 20:
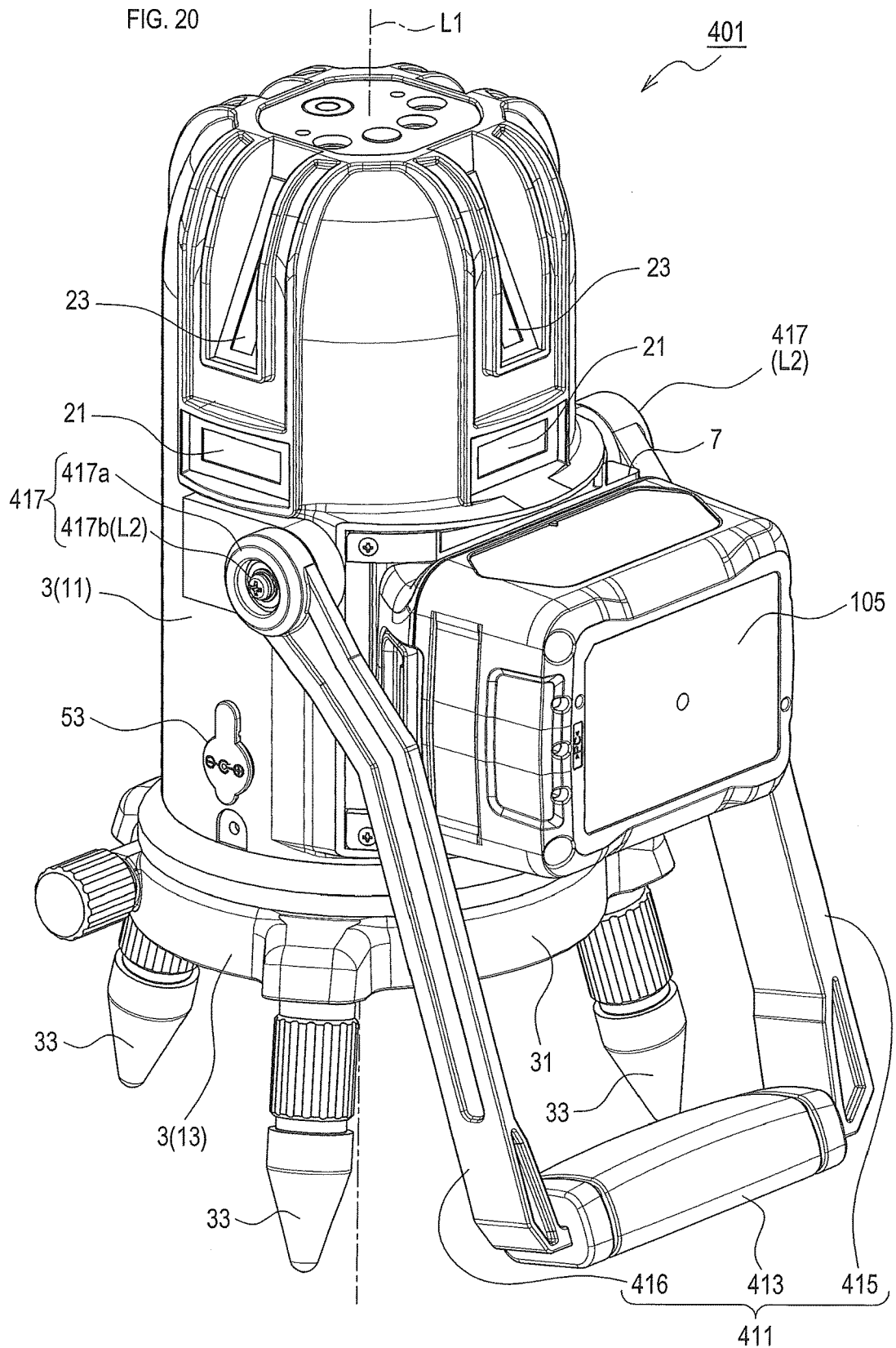
FIG. 20 is a perspective view showing an external appearance of a fifth laser marker with a supplemental support positioned in a support position.
Figure 21:
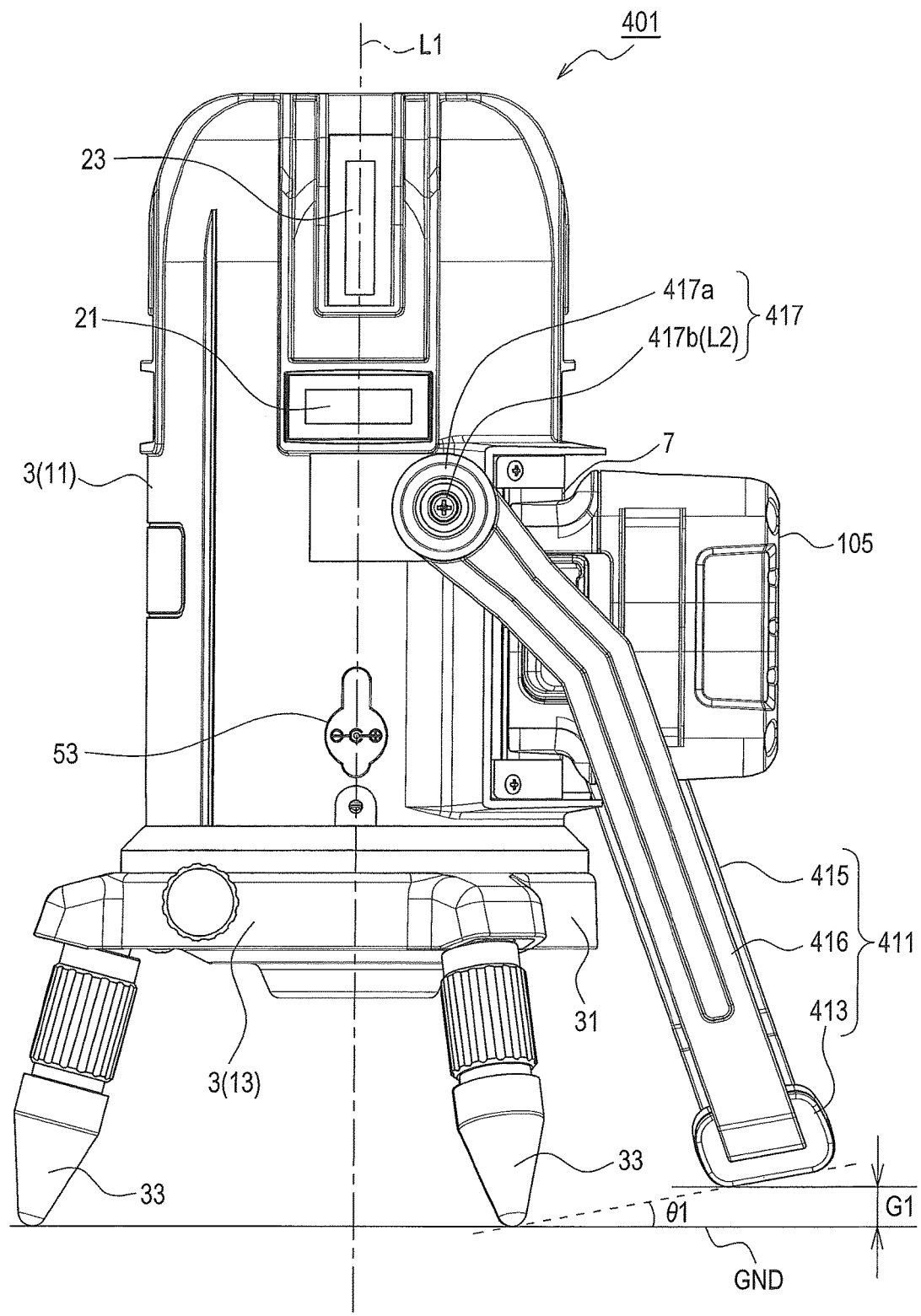
FIG. 21 is a side view showing an external appearance of the fifth laser marker with the supplemental support positioned in the support position.
Figure 22:
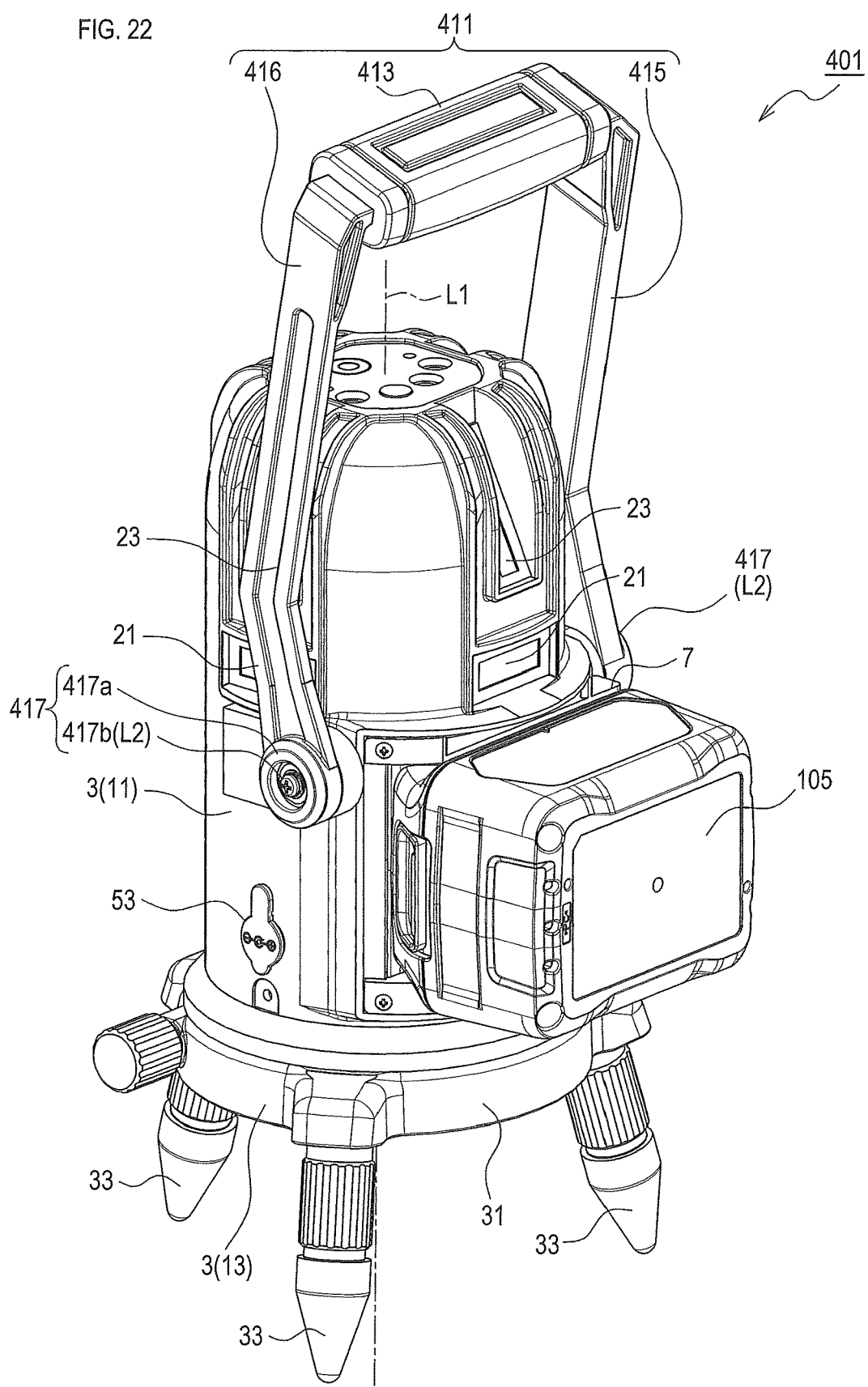
FIG. 22 is a perspective view showing an external appearance of the fifth laser marker with a ground contact portion of the supplemental support positioned higher than a main body.

As shown in FIGS. 20-22, the fifth laser marker 401 comprises the third supplemental support 411.

The third supplemental support 411 is a member having a roughly U shape with angular corners, and comprises a ground contact portion 413 and two extending portions (a hard extending portion 415 and a soft extending portion 416). In other words, the third supplemental support 411 has a configuration in which the soft extending portion 416 is added to the second supplemental support 311. That is, the ground contact portion 413 corresponds to the ground contact portion 313, and the hard extending portion 415 corresponds to the extending portion 315.

The hard extending portion 415 and the soft extending portion 416 are provided so as to extend from the mutually different coupling portions 417, each of which comprises an annular portion 417a and a male screw 417b (the pivotal axis L2), to the ground contact portion 413. The hard extending portion 415 is made of a hard resin material (e.g., ABS resin), which is not elastically deformed, and is rigid enough to bear the weight of the fifth laser marker 401. The soft extending portion 416 is made of a soft material (e.g., rubber), which can be elastically deformed. The soft extending portion 416 has a smaller thickness dimension (see FIGS. 20 and 22) and a smaller width dimension (see FIG. 21) than the hard extending portion 415.

The soft extending portion 416 is positioned such that a movement locus thereof during pivotal movement of the third supplemental support 411 overlaps a region in which the large-sized battery pack 105 is moved during attachment and detachment thereof. The hard extending portion 415 is positioned such that a movement locus thereof during pivotal movement of the third supplemental support 411 does not overlap the region in which the large-sized battery pack 105 is moved during attachment and detachment thereof.

When the third supplemental support 411 is positioned (fixed provisionally) in the support position (the position shown in FIGS. 20 and 21), the ground contact portion 413 is positioned lower than the pack attachment portion 7, and is positioned so as to face the ground GND, which is in contact with the three leg portions 33, leaving the gap G1 therebetween (see FIG. 21).

Moreover, the third supplemental support 411 has a configuration in which the ground contact portion 413 can be used as a handle for the user to hold when the ground contact portion 413 is positioned upper than the main body 3 within the pivotally movable range (see FIG. 22).

5-2. Effects

As explained above, in the fifth laser marker 401 of the fifth embodiment, the third supplemental support 411 is attached to the main body 3 in a pivotally movable manner.

Similarly to the fourth laser marker 301, in the fifth laser marker 401 having the thus-configured third supplemental support 411, even when the center of gravity is deviated toward the large-sized battery pack 105 by the weight of the large-sized battery pack 105 attached to the pack attachment portion 7 to thereby cause the fifth laser marker 401 to be tilted, the third supplemental support 411 (specifically, the ground contact portion 413) comes in contact with the ground GND and can support the fifth laser marker 401 before it turns over completely.

Next, the fifth laser marker 401 comprises the third supplemental support 411 including two extending portions (the hard extending portion 415 and the soft extending portion 416), which are made of mutually different materials.

Further, the soft extending portion 416 is positioned such that the movement locus thereof during pivotal movement of the third supplemental support 411 overlaps the region in which the large-sized battery pack 105 is moved during attachment and detachment thereof, whereas the hard extending portion 415 is positioned such that the movement locus thereof during pivotal movement of the third supplemental support 411 does not overlap the region in which the large-sized battery pack 105 is moved during attachment and detachment thereof.

In the fifth laser marker 401, the soft extending portion 416 can be elastically deformed, and thus, even when the soft extending portion 416 and the large-sized battery pack 105 interfere with each other during attachment and detachment of the large-sized battery pack 105, attachment and detachment of the large-sized battery pack 105 can be continued due to the elastic deformation of the soft extending portion 416.

The fifth laser marker 401 corresponds to one example of a laser marker of the present disclosure, the third supplemental support 411 corresponds to one example of a supplemental support of the present disclosure, the ground contact portion 413 corresponds to one example of "a ground contact portion and a handle provided as a same member" of the present disclosure, the hard extending portion 415 corresponds to one example of a second extending portion of the present disclosure, the soft extending portion 416 corresponds to one example of a first extending portion of the present disclosure, and the coupling portions 417 correspond to one example of coupling portions of the present disclosure.

6. Sixth Embodiment

6-1. Overall Structure

Next, as a sixth embodiment, a sixth laser marker 501 will be explained that comprises a supplemental support to inhibit overturning of the sixth laser marker 501.

The sixth laser marker 501 has a configuration in which a fixed supplemental support 511 is attached to the above-described laser marker 1 of the first embodiment. In addition, the sixth laser marker 501 comprises the large-sized battery pack 105 having a larger rating capacity than that of the battery pack 5 of the first embodiment. Thus, in the explanation below, differences of the sixth laser marker 501 from the laser marker 1 will be mainly explained. Elements in the sixth embodiment similar to those in the first embodiment are assigned with the same reference numerals as in the first embodiment, and are not explained here.

Figure 23:
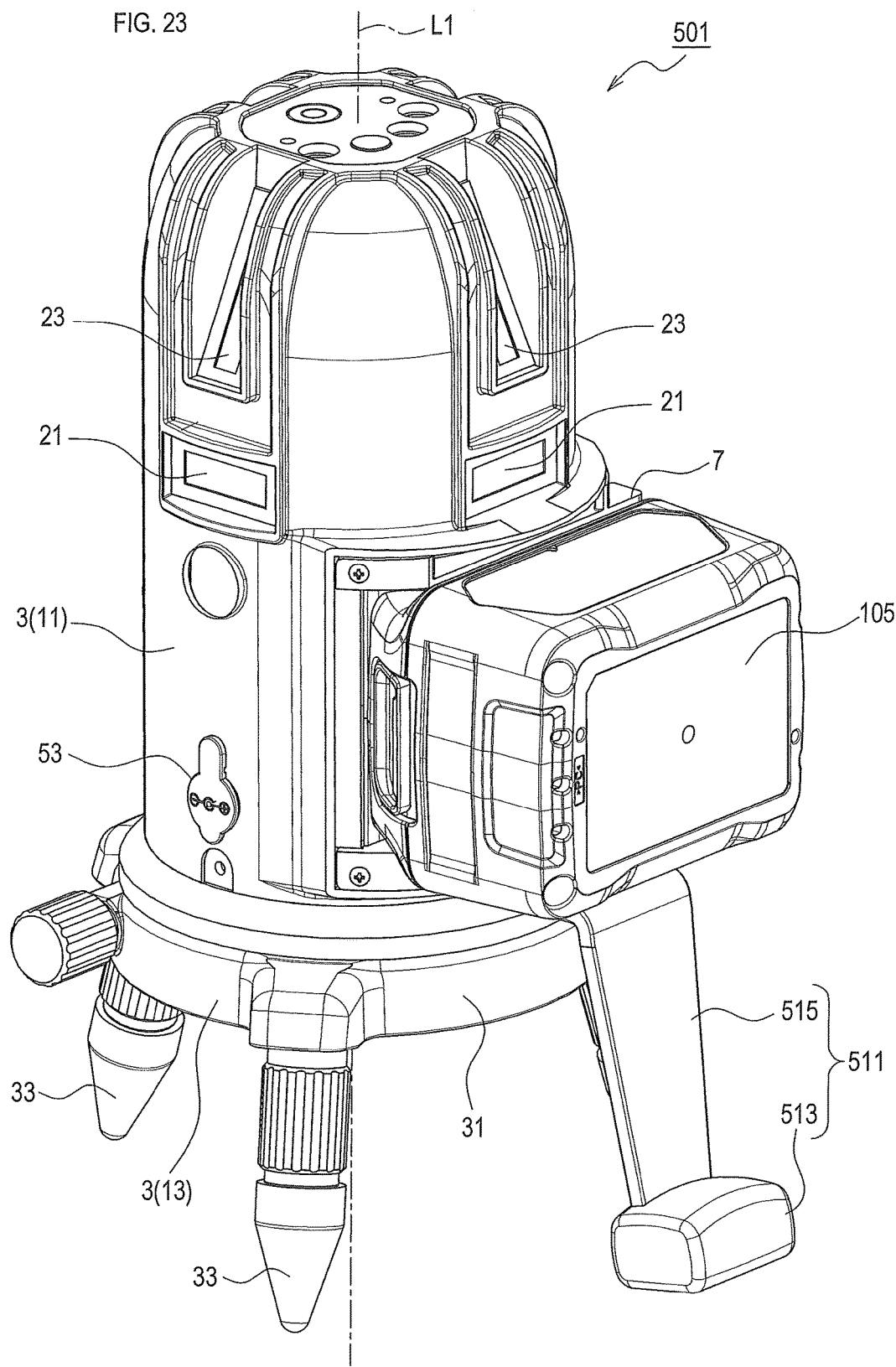
FIG. 23 is a perspective view showing an external appearance of a sixth laser marker including a fixed supplemental support.
Figure 24:
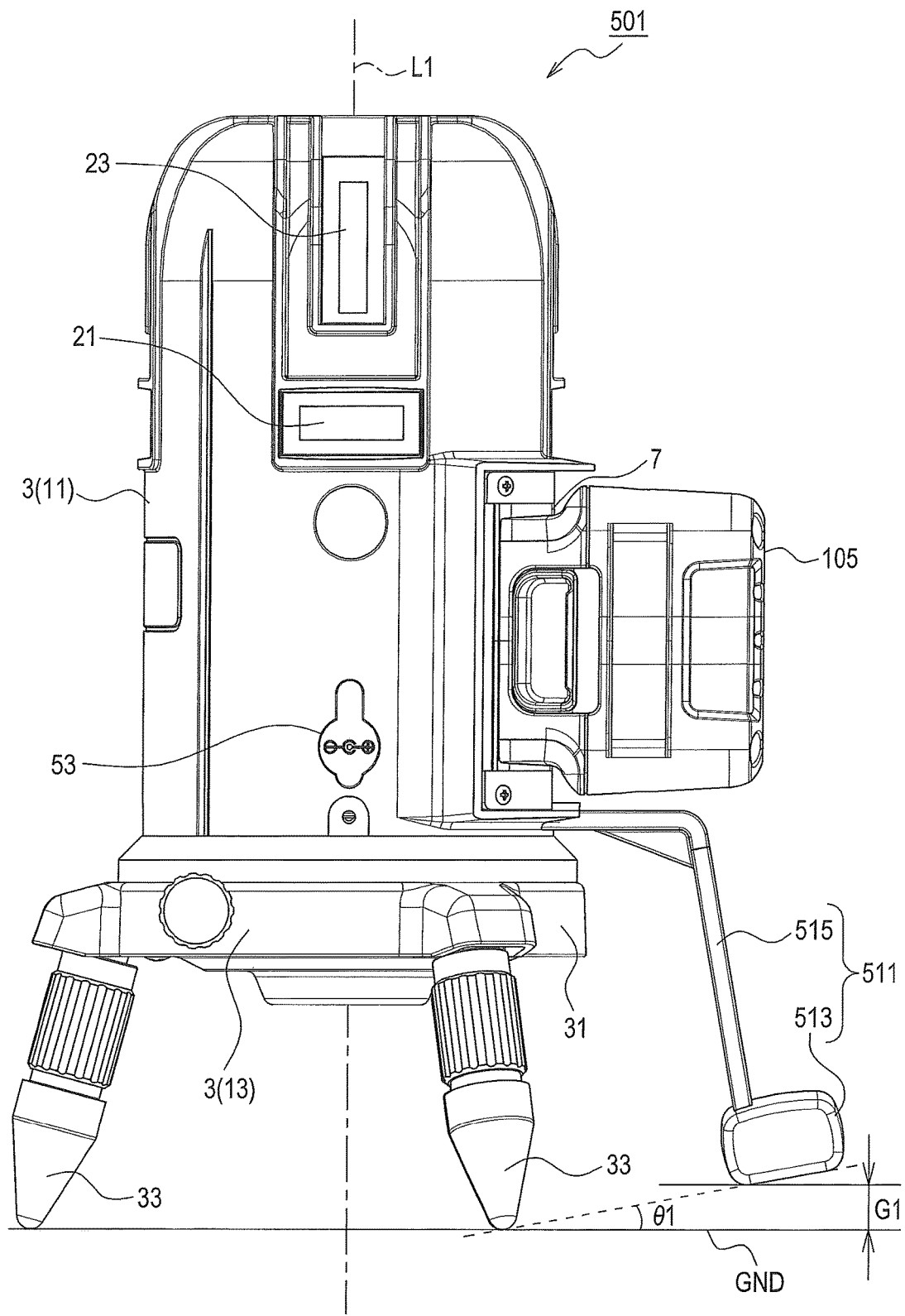
FIG. 24 is a side view showing an external appearance of the sixth laser marker including the fixed supplemental support.
Figure 25:
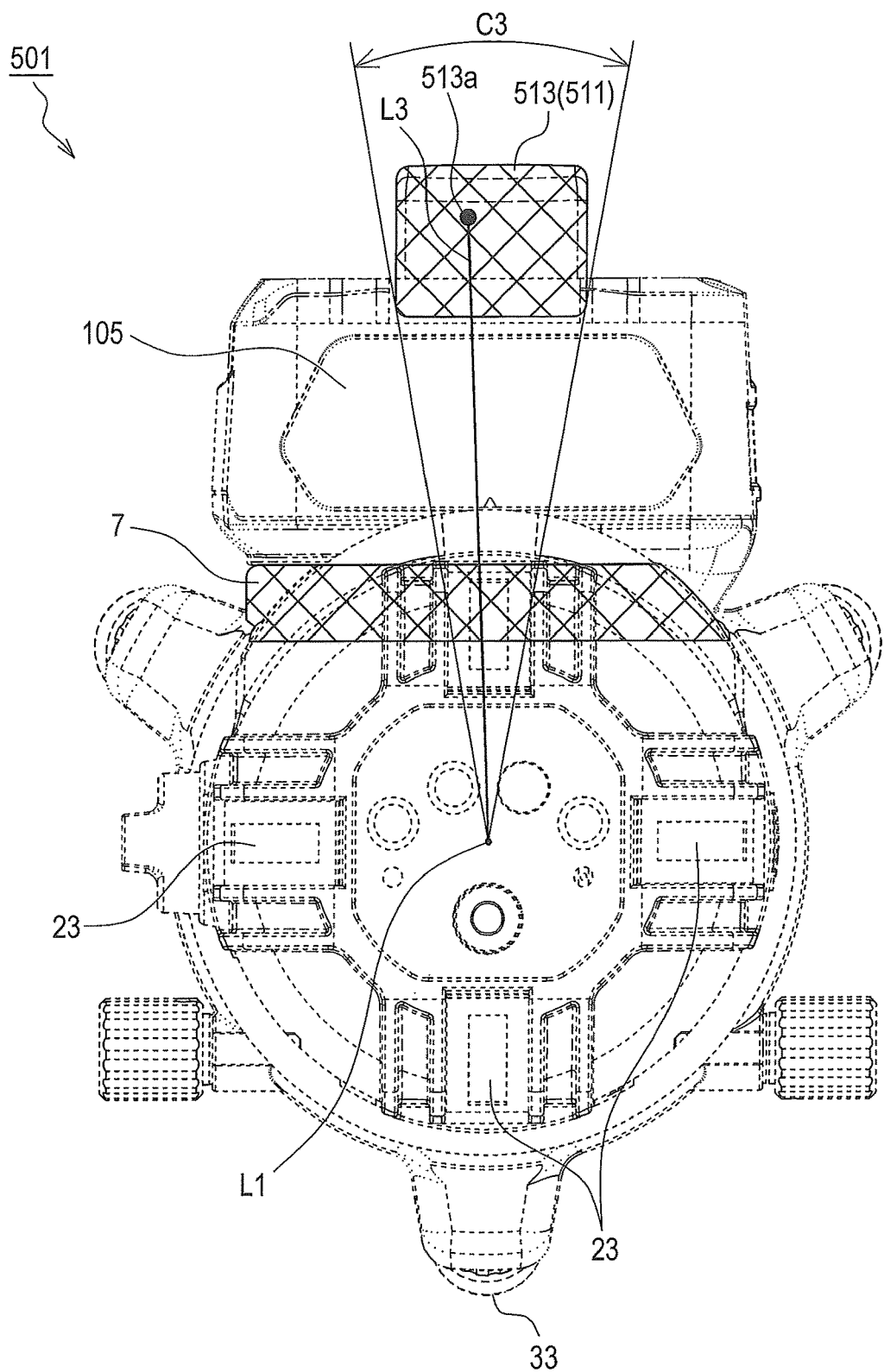
FIG. 25 is an explanatory diagram showing that, when the sixth laser marker is viewed planarly from an upper side of a central axis of a main body, a virtual line segment connecting part of a ground contact portion and the central axis to each other intersects a pack attachment portion.

As shown in FIGS. 23-25, the sixth laser marker 501 comprises the fixed supplemental support 511.

The fixed supplemental support 511 comprises a ground contact portion 513 and an extending portion 515.

The ground contact portion 513 has a shape of a quadrangular prism with its corners chamfered, and is made of an elastic material (e.g., rubber, low-resilience urethane, and low-resilience sponge).

The extending portion 515 has a shape of a longitudinally extending plate member with a bended portion (see FIGS. 23 and 24), and is made of a hard resin material (e.g., ABS resin), which is not elastically deformed. One longitudinal end of the extending portion 515 is fixed below the pack attachment portion 7 in the main body 3, and the other end (leading end) is coupled to the ground contact portion 513.

The fixed supplemental support 511 is configured such that the ground contact portion 513 is positioned lower than the pack attachment portion 7 and such that the ground contact portion 513 is positioned so as to face the ground GND, which is in contact with the three leg portions 33, leaving the gap G1 therebetween (see FIG. 24).

Next, as shown in FIG. 25, the fixed supplemental support 511 has a configuration in which the virtual line segment L3 connecting at least part of the ground contact portion 513 and the central axis L1 to each other intersects the pack attachment portion 7, as viewed planarly from the upper side of the central axis L1 of the main body 3. In FIG. 25, a region in which the ground contact portion 513 is arranged and a region in which the pack attachment portion 7 is provided are each shown in a shaded pattern. In FIG. 25, a line segment connecting a point 513a in the ground contact portion 513 and the central axis L1 to each other is depicted as one example of the virtual line segment L3. The virtual line segment L3 is a virtual line segment that intersects at least part of the ground contact portion 513 and that is supposed to be in any position within the range C3 shown in FIG. 25.

6-2. Effects

As explained above, in the sixth laser marker 501 of the sixth embodiment, the fixed supplemental support 511 is attached to the main body 3.

The fixed supplemental support 511 has a configuration in which the ground contact portion 513 is positioned such that the virtual line segment L3 intersects the pack attachment portion 7 and in which the ground contact portion 513 is positioned so as to face the ground GND (virtual ground), leaving the gap G1 therebetween, in the region lower than the pack attachment portion 7.

In the sixth laser marker 501 having the thus-configured fixed supplemental support 511, even when the center of gravity is deviated toward the large-sized battery pack 105 by the weight of the large-sized battery pack 105 attached to the pack attachment portion 7 to thereby cause the sixth laser marker 501 to be tilted, the fixed supplemental support 511 (specifically, the ground contact portion 513) comes in contact with the ground GND and can support the sixth laser marker 501 before it turns over completely.

Next, in the sixth laser marker 501, the fixed supplemental support 511 is provided lower than the pack attachment portion 7.

The thus-configured fixed supplemental support 511 makes it possible to shorten a length dimension thereof (in other words, a dimension from the ground contact portion 513 to the end coupled to the main body 3, or a total dimension of the ground contact portion 513 and the extending portion 515), compared to other configurations in which at least part of the fixed supplemental support 511 is arranged also in a region upper than the pack attachment portion 7. Thus, material costs of the fixed supplemental support 511 can be reduced, to thereby inhibit increase in manufacturing costs of the sixth laser marker 501.

Furthermore, since the thus-configured fixed supplemental support 511 is not arranged in a region that is level with the pack attachment portion 7 or in the region upper than the pack attachment portion 7, interference with the large-sized battery pack 105 is unlikely to occur during attachment and detachment of the large-sized battery pack 105.

The sixth laser marker 501 corresponds to one example of a laser marker of the present disclosure, the fixed supplemental support 511 corresponds to one example of a supplemental support of the present disclosure, the ground contact portion 513 corresponds to one example of a ground contact portion of the present disclosure, and the extending portion 515 corresponds to one example of an extending portion of the present disclosure.

7. Seventh Embodiment

7-1. Overall Structure

Next, as a seventh embodiment, a seventh laser marker 601 will be explained that comprises a supplemental support to inhibit overturning of the seventh laser marker 601.

The seventh laser marker 601 has a configuration in which a second fixed supplemental support 611 is attached to the above-described second laser marker 101 of the second embodiment. In addition, the seventh laser marker 601 comprises the large-sized battery pack 105 having a larger rating capacity than that of the battery pack 5 of the second embodiment. Thus, in the explanation below, differences of the seventh laser marker 601 from the second laser marker 101 will be mainly explained. Elements in the seventh embodiment similar to those in the second embodiment are assigned with the same reference numerals as in the second embodiment, and are not explained here.

Figure 26:
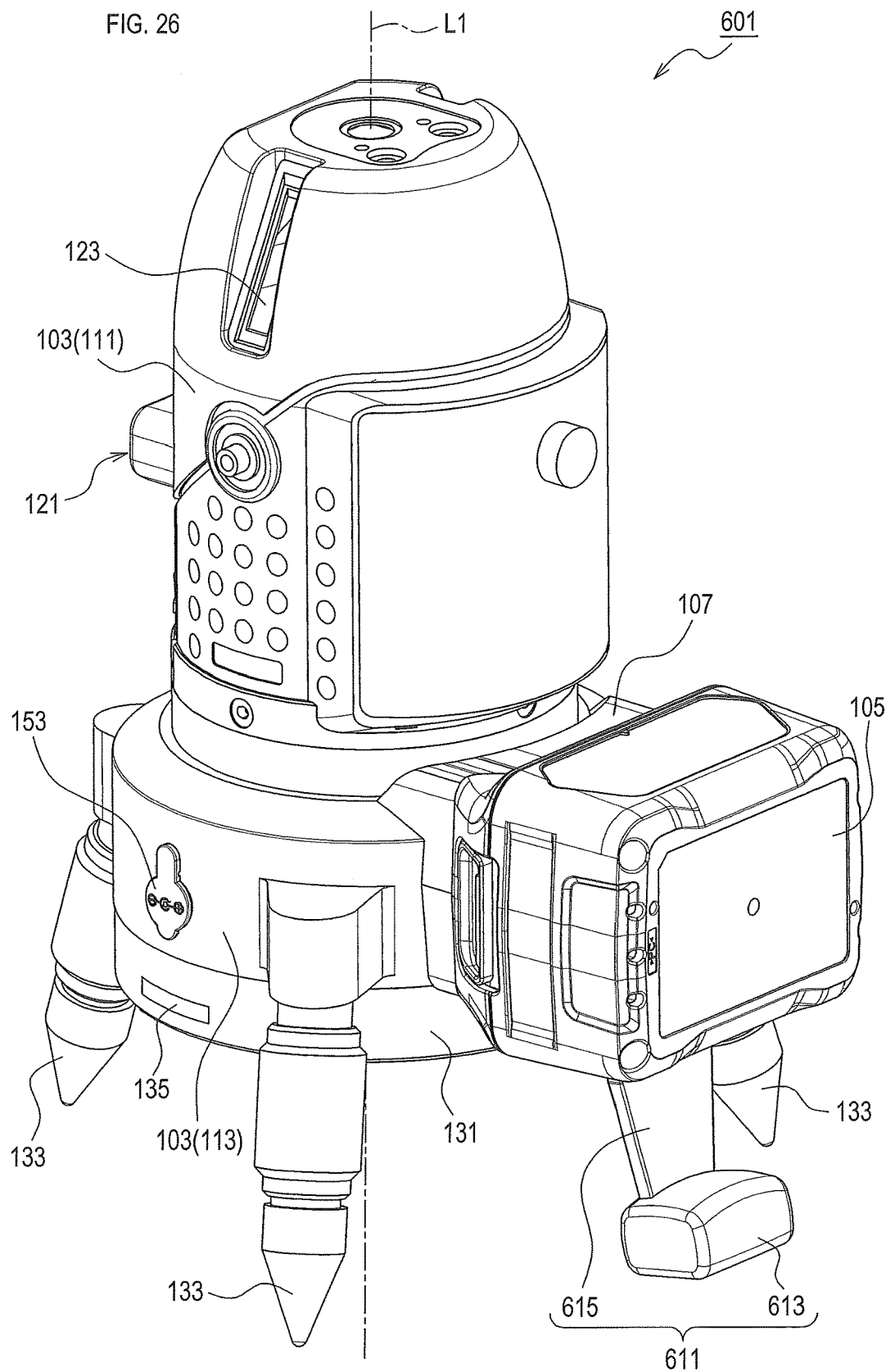
FIG. 26 is a perspective view showing an external appearance of a seventh laser marker including a fixed supplemental support.
Figure 27:
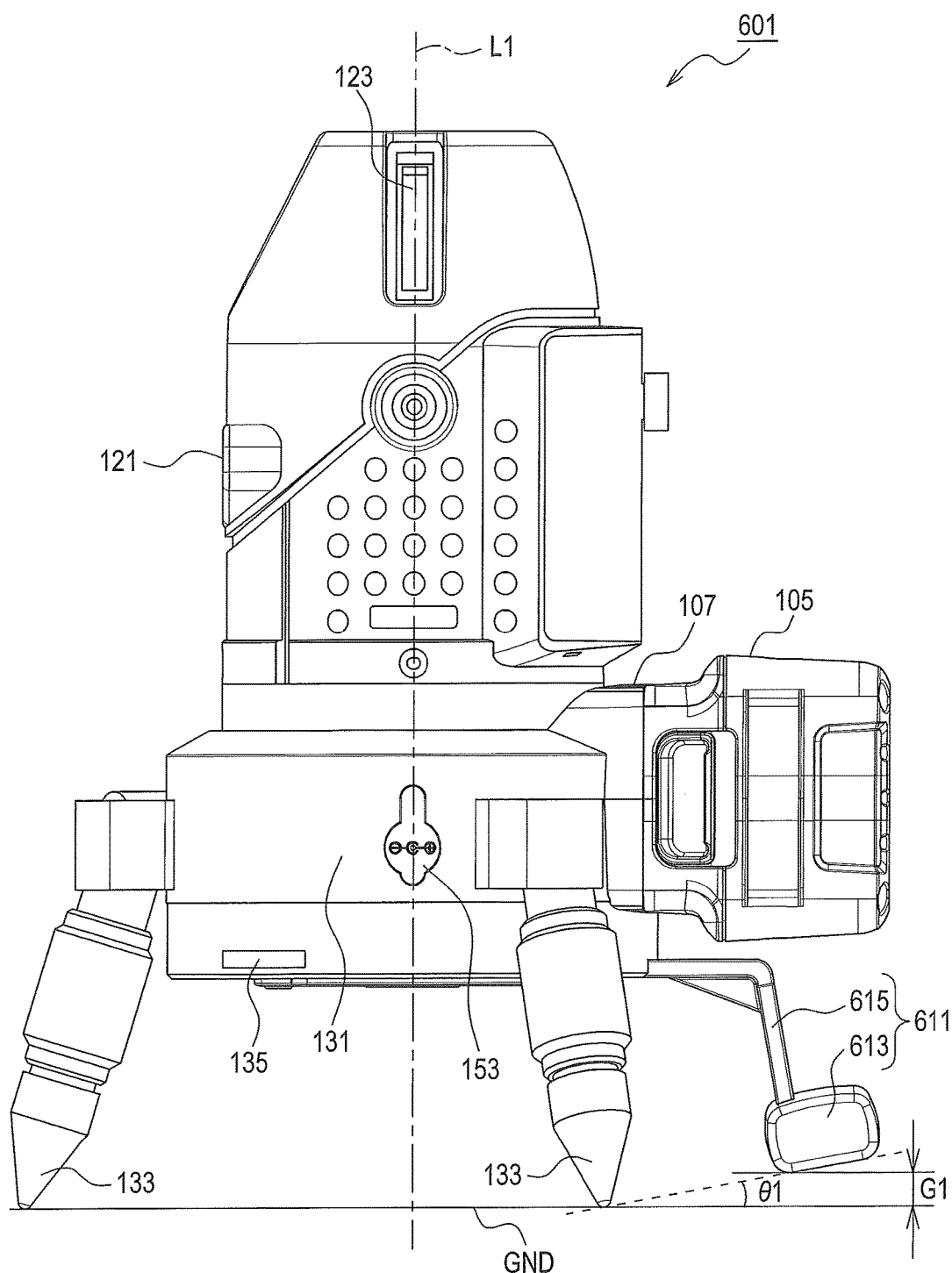
FIG. 27 is a side view showing an external appearance of the seventh laser marker including the fixed supplemental support.

As shown in FIGS. 26 and 27, the seventh laser marker 601 comprises the second fixed supplemental support 611.

The second fixed supplemental support 611 comprises a ground contact portion 613 and an extending portion 615.

The ground contact portion 613 has a shape of a quadrangular prism with its corners chamfered, and is made of an elastic material (e.g., rubber, low-resilience urethane, and low-resilience sponge).

The extending portion 615 has a shape of a longitudinally extending plate member with a bended portion (see FIGS. 26 and 27), and is made of a hard resin material (e.g., ABS resin), which is not elastically deformed. One longitudinal end of the extending portion 615 is fixed below the second pack attachment portion 107 in the second main body 103, and the other end (leading end) is coupled to the ground contact portion 613.

The second fixed supplemental support 611 is configured such that the ground contact portion 613 is positioned lower than the second pack attachment portion 107 and such that the ground contact portion 613 is positioned so as to face the ground GND, which is in contact with the three second leg portions 133, leaving the gap G1 therebetween (see FIG. 27).

Next, the second fixed supplemental support 611 has a configuration in which the virtual line segment L3 connecting at least part of the ground contact portion 613 and the central axis L1 to each other intersects the second pack attachment portion 107, as viewed planarly from the upper side of the central axis L1 of the second main body 103. A drawing showing such a state is not appended hereto, but an arrangement state of the ground contact portion 613 of the second fixed supplemental support 611, the second pack attachment portion 107, the central axis L1, and the virtual line segment L3 is similar to that of the ground contact portion 513 of the fixed supplemental support 511, the pack attachment portion 7, the central axis L1, and the virtual line segment L3 shown in FIG. 25.

7-2. Effects

As explained above, in the seventh laser marker 601 of the seventh embodiment, the second fixed supplemental support 611 is attached to the second main body 103.

The second fixed supplemental support 611 has a configuration in which the ground contact portion 613 is positioned such that the virtual line segment L3 intersects the second pack attachment portion 107 and in which the ground contact portion 613 is positioned so as to face the ground GND (virtual ground), leaving the gap G1 therebetween, in the region lower than the second pack attachment portion 107.

In the seventh laser marker 601 having the thus-configured second fixed supplemental support 611, even when the center of gravity is deviated toward the large-sized battery pack 105 by the weight of the large-sized battery pack 105 attached to the second pack attachment portion 107 to thereby cause the seventh laser marker 601 to be tilted, the second fixed supplemental support 611 (specifically, the ground contact portion 613) comes in contact with the ground GND and can support the seventh laser marker 601 before it turns over completely.

Next, in the seventh laser marker 601, the second fixed supplemental support 611 is provided lower than the second pack attachment portion 107.

The thus-configured second fixed supplemental support 611 makes it possible to shorten a length dimension thereof (in other words, a dimension from the ground contact portion 613 to the end coupled to the second main body 103, or a total dimension of the ground contact portion 613 and the extending portion 615), compared to other configurations in which at least part of the second fixed supplemental support 611 is arranged also in a region upper than the second pack attachment portion 107. Thus, material costs of the second fixed supplemental support 611 can be reduced, to thereby inhibit increase in manufacturing costs of the seventh laser marker 601.

Furthermore, since the thus-configured second fixed supplemental support 611 is not arranged in a region that is level with the second pack attachment portion 107 or in the region upper than the second pack attachment portion 107, interference with the large-sized battery pack 105 is unlikely to occur during attachment and detachment of the large-sized battery pack 105.

The seventh laser marker 601 corresponds to one example of a laser marker of the present disclosure, the second fixed supplemental support 611 corresponds to one example of a supplemental support of the present disclosure, the ground contact portion 613 corresponds to one example of a ground contact portion of the present disclosure, and the extending portion 615 corresponds to one example of an extending portion of the present disclosure.

8. Eighth Embodiment 8-1. Overall Structure

Next, as an eighth embodiment, an eighth laser marker 701 will be explained that comprises a supplemental support to inhibit overturning of the eighth laser marker 701.

The eighth laser marker 701 has a configuration in which a sliding supplemental support 711 is attached to the above-described laser marker 1 of the first embodiment. In addition, the eighth laser marker 701 comprises the large-sized battery pack 105 having a larger rating capacity than that of the battery pack 5 of the first embodiment. Thus, in the explanation below, differences of the eighth laser marker 701 from the laser marker 1 will be mainly explained. Elements in the eighth embodiment similar to those in the first embodiment are assigned with the same reference numerals as in the first embodiment, and are not explained here.

As shown in FIGS. 28-31, the eighth laser marker 701 comprises the sliding supplemental support 711.

Figure 28:
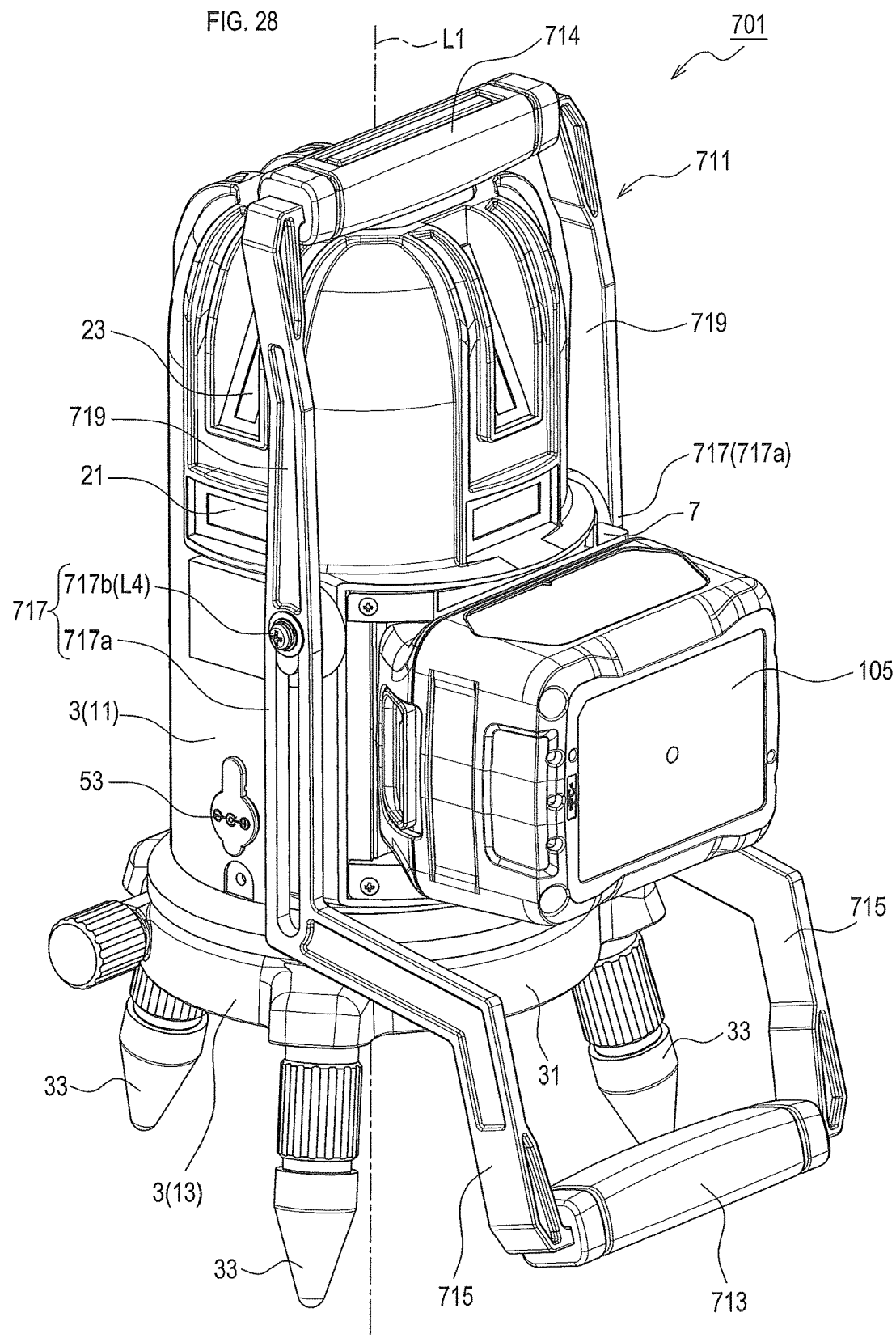
FIG. 28 is a perspective view showing an external appearance of an eighth laser marker including a sliding supplemental support.

As shown in FIG. 28, the sliding supplemental support 711 comprises a ground contact portion 713, a handle 714, two ground contact side extending portions 715, two elongated hole portions 717a, and two handle side extending portions 719.

In the sliding supplemental support 711, a portion including the ground contact portion 713 and the two ground contact side extending portions 715 is a member having a roughly U shape with angular corners. The ground contact portion 713 is a member corresponding to a bottom of the U shape, and the two ground contact side extending portions 715 are members corresponding to two sides of the U shape. Ends of the two ground contact side extending portions 715 on an opposite side from the ground contact portion 713 are coupled to the elongated hole portions 717a.

In the sliding supplemental support 711, a portion including the handle 714 and the two handle side extending portions 719 is a member having a roughly U shape with angular corners. The handle 714 is a member corresponding to a bottom of the U shape, and the two handle side extending portions 719 are members corresponding to two sides of the U shape. Ends of the two handle side extending portions 719 on an opposite side from the handle 714 are coupled to the elongated hole portions 717a.

An explanation of the ground contact portion 713 and the handle 714 is omitted here because they have configurations similar to that of the ground contact portion 213 of the third embodiment.

The two ground contact side extending portions 715 are provided so as to extend from the two elongated hole portions 717a to the ground contact portion 713. The two handle side extending portions 719 are provided so as to extend from the two elongated hole portions 717a to the handle 714. The two ground contact side extending portions 715 and the two handle side extending portions 719 are each made of a hard resin material (e.g., ABS resin), and are rigid enough to bear the weight of the eighth laser marker 701.

The two elongated hole portions 717a each include an elongated hole, and are made of a hard resin material similarly to the ground contact side extending portions 715 and the handle side extending portions 719. The elongated hole portions 717a constitute part of coupling portions 717.

The sliding supplemental support 711 is attached to the main body 3 in a slidingly movable manner via the two coupling portions 717.

The two coupling portions 717 each comprise the elongated hole portion 717a and a male screw 717b. The coupling portion 717 is configured such that the male screw 717b, which is inserted through the elongated hole in the elongated hole portion 717a, is secured into the main body 3 (specifically, into a female screw). In this way, the two coupling portions 717 couple the sliding supplemental support 711 to the main body 3 in a slidingly movable manner.

The ground contact portion 713 is provided lower than the coupling portions 717 (specifically, the elongated hole portions 717a) of the sliding supplemental support 711. The handle 714 is provided higher than the coupling portions 717 (specifically, the elongated hole portions 717a) of the sliding supplemental support 711.

The main body 3 comprises two female screws (not shown), into which the two male screws 717b are secured. The two female screws are provided such that a central axis thereof (hereinafter referred to as an axis L4) is horizontal and parallel to the slide rails 43 of the pack attachment portion 7 (see FIG. 2). Positions of the two coupling portions 717 (in other words, positions where the not-shown female screws, into which the male screws 717b are secured, are provided) in the main body 3 as viewed planarly from the upper side of the central axis L1 are set so that, when the sliding supplemental support 711 is fixed in a position shown in FIG. 28 (hereinafter referred to as a support position), the ground contact portion 713 and the two ground contact side extending portions 715 surround at least a region in which the pack attachment portion 7 is provided on the side face of the main body 3 (see FIG. 30).

Figure 29:
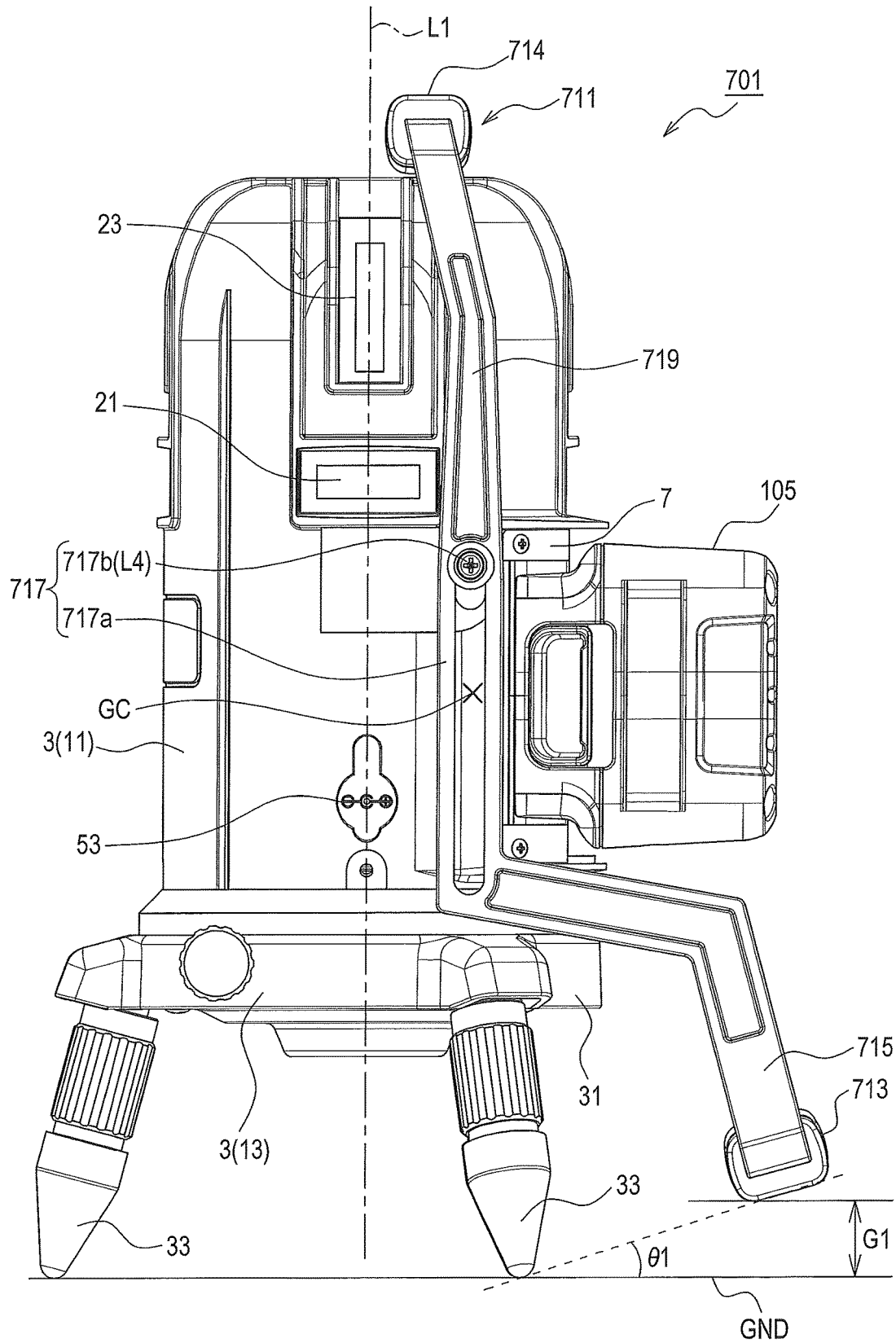
FIG. 29 is a side view showing an external appearance of the eighth laser marker including the sliding supplemental support.
Figure 30:
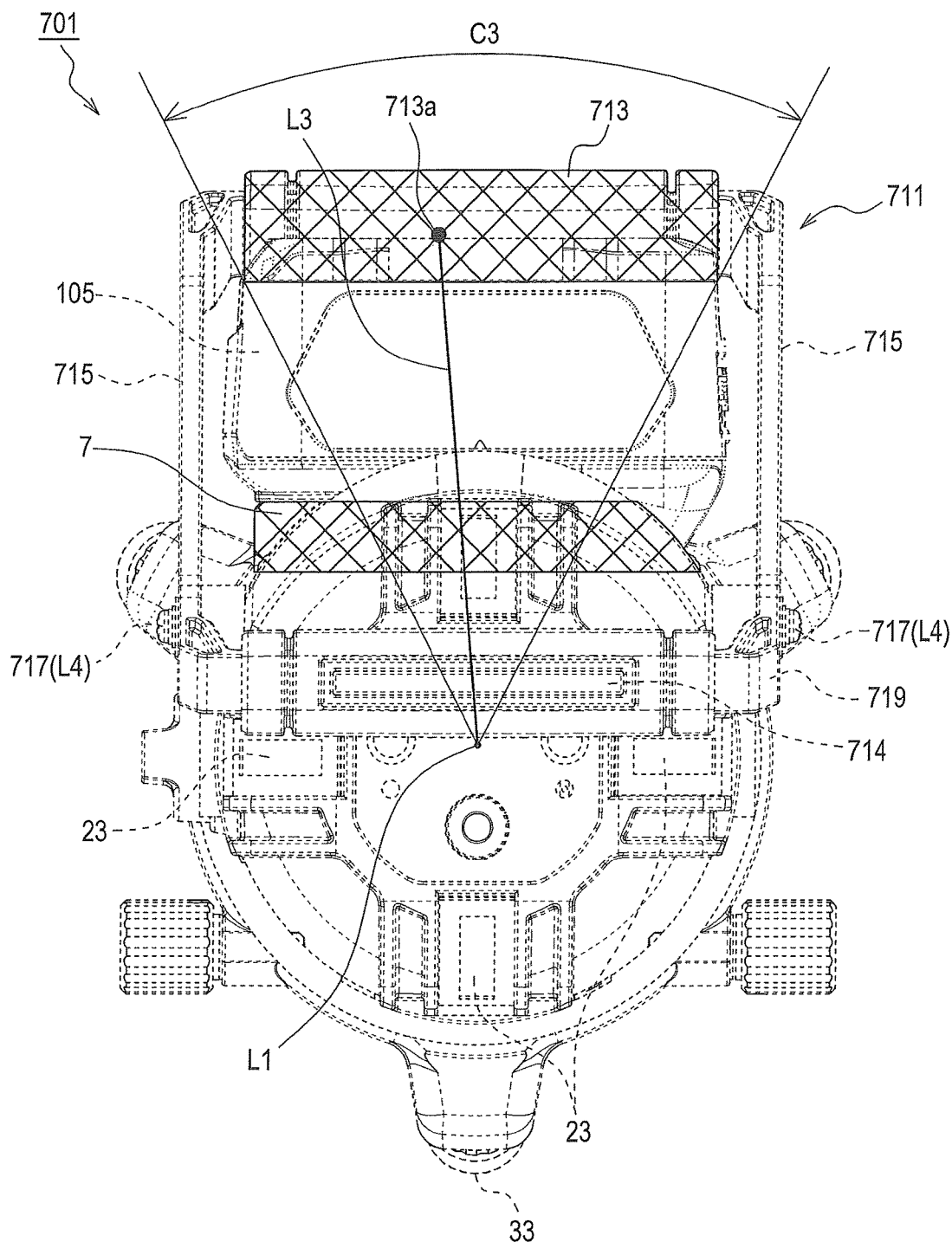
FIG. 30 is an explanatory diagram showing that, when the eighth laser marker is viewed planarly from an upper side of a central axis of a main body, a virtual line segment connecting part of a ground contact portion and the central axis to each other intersects a pack attachment portion.

Positions where the two coupling portions 717 are provided in the main body 3 are determined such that, when viewed planarly from the upper side of the central axis L1 of the main body 3, the axis L4 is positioned in a region closer to the pack attachment portion 7 than to the central axis L1 in the main body 3 (see FIG. 30). Further, positions where the two male screws 717b (in other words, the two female screws) are provided in the main body 3 are determined such that, when viewed from the side, the axis L4 is positioned higher than the center of gravity GC of the eighth laser marker 701 in the main body 3 (see FIG. 29).

Figure 31:
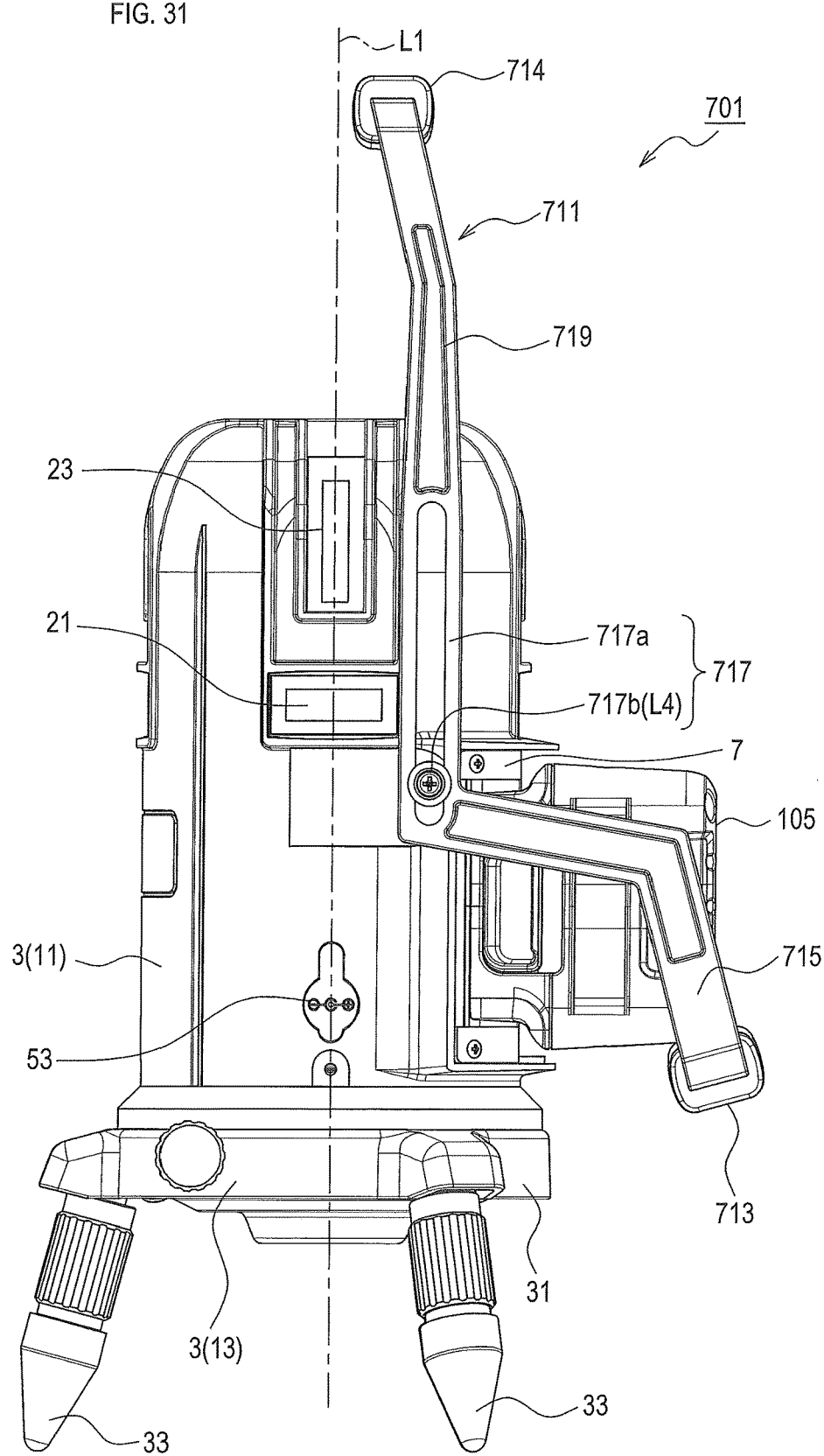
FIG. 31 is a side view showing an external appearance of the eighth laser marker with the sliding supplemental support positioned in an uppermost position.

As shown in FIGS. 29 and 31, the sliding supplemental support 711 is configured such that the entirety thereof including the ground contact portion 713 and the handle 714 can be slidingly moved in a vertical direction by vertical sliding movement of the elongated hole portions 717a on the basis of the male screws 717b (the axis L4) of the coupling portions 717. The sliding supplemental support 711 is movable within a range from a position shown in FIG. 29 (a lowermost position) to a position shown in FIG. 31 (an uppermost position).

The sliding supplemental support 711 is configured to be fixed provisionally (positioned) at least in the support position within the slidingly movable range by means of a positioning portion (not shown) provided in advance. The positioning portion may comprise, for example, a rounded convex portion and a concave portion that can be fitted with the convex portion. One of the convex portion and the concave portion is provided to the sliding supplemental support 711 and the other is provided to the main body 3 at a specified position within the slidingly movable range of the sliding supplemental support 711 in a region in which the sliding supplemental support 711 (specifically, the elongated hole portions 717a) and the main body 3 are in contact with (face) each other. Movement of the sliding supplemental support 711 in a sliding direction with respect to the main body 3 is restricted by the mutual fitting between the convex portion and the concave portion, to thereby enable the sliding supplemental support 711 to be fixed provisionally (positioned) in the support position. The convex portion may have a fixed form in which a projection dimension is fixed, or may have a variable form in which the projection dimension is varied by means of a spring, etc.

When the sliding supplemental support 711 is positioned (fixed provisionally) in the support position, the ground contact portion 713 is positioned lower than the pack attachment portion 7, and is positioned so as to face the ground GND, which is in contact with the three leg portions 33, leaving the gap G1 therebetween (see FIG. 29).

Next, as shown in FIG. 30, the sliding supplemental support 711 has a configuration in which, when the sliding supplemental support 711 is positioned (fixed provisionally) in the support position, the ground contact portion 713 is positioned such that the virtual line segment L3 connecting at least part of the ground contact portion 713 and the central axis L1 to each other intersects the pack attachment portion 7, as viewed planarly from the upper side of the central axis L1 of the main body 3. In FIG. 30, a region in which the ground contact portion 713 is arranged and a region in which the pack attachment portion 7 is provided are each shown in a shaded pattern. In FIG. 30, a line segment connecting a point 713a in the ground contact portion 713 and the central axis L1 to each other is depicted as one example of the virtual line segment L3. The virtual line segment L3 is a virtual line segment that intersects at least part of the ground contact portion 713 and that is supposed to be in any position within the range C3 shown in FIG. 30. As shown in FIG. 30, in the eighth laser marker 701, the sliding supplemental support 711 is configured such that the virtual line segment L3 definitely intersects the region in which the pack attachment portion 7 is provided.

That is, when fixed provisionally in the support position within the slidingly movable range, the sliding supplemental support 711, which is slidingly movable, has a configuration in which the ground contact portion 713 is positioned such that the virtual line segment L3 intersects the pack attachment portion 7 and in which the ground contact portion 713 is positioned so as to face the ground GND (virtual ground), leaving the gap G1 therebetween, in a region lower than the pack attachment portion 7. Further, the sliding supplemental support 711 has a shape in which, when positioned in the support position, the handle 714 and the handle side extending portions 719 do not block a traveling path (optical path) of a laser light.

Moreover, the sliding supplemental support 711 is configured such that, when the sliding supplemental support 711 is positioned in the uppermost position within the slidingly movable range, the handle 714 is positioned away from the main body 3 (in other words, in a position where the user can hold the handle 714 easily). That is, the eighth laser marker 701 can be carried by using the handle 714. In this situation, the ground contact portion 713 comes in contact with the large-sized battery pack 105 and thereby can support the large-sized battery pack 105.

The thus-configured sliding supplemental support 711 is configured such that the ground contact portion 713 fulfils the function of inhibiting overturning when fixed in the support position and such that the handle 714 fulfils the function as the handle when positioned in the uppermost position within the slidingly movable range.

8-2. Effects

As explained above, in the eighth laser marker 701 of the eighth embodiment, the sliding supplemental support 711 is attached to the main body 3 in a slidingly movable manner.

When fixed provisionally (positioned) in the specified support position within the movable range (slidingly movable range), the sliding supplemental support 711 has a configuration in which the ground contact portion 713 is positioned such that the virtual line segment L3 intersects the pack attachment portion 7 and in which the ground contact portion 713 is positioned so as to face the ground GND (virtual ground), leaving the gap G1 therebetween, in the region lower than the pack attachment portion 7.

In the eighth laser marker 701 having the thus-configured sliding supplemental support 711, even when the center of gravity is deviated toward the large-sized battery pack 105 by the weight of the large-sized battery pack 105 attached to the pack attachment portion 7 to thereby cause the eighth laser marker 701 to be tilted, the sliding supplemental support 711 (specifically, the ground contact portion 713) comes in contact with the ground GND and can support the eighth laser marker 701 before it turns over completely.

Thus, with the sliding supplemental support 711, the eighth laser marker 701 can be inhibited from turning over even when the large-sized battery pack 105 having a large weight is attached thereto.

Further, with the sliding supplemental support 711, which is slidingly movable, the eighth laser marker 701 can be switched between a state in which the sliding supplemental support 711 is fixed in the support position and a state in which the sliding supplemental support 711 is not fixed in the support position depending on a use state of the eighth laser marker 701. For example, while being used, the eighth laser marker 701 can be inhibited from turning over by fixing the sliding supplemental support 711 in the support position. Alternatively, while not being used (while being carried), the eighth laser marker 701 can be brought to a state suitable for carriage by allowing the sliding supplemental support 711 to be positioned in the uppermost position.

Next, in the eighth laser marker 701, the sliding supplemental support 711 comprises the ground contact portion 713 and the handle 714. Use of the thus-configured sliding supplemental support 711 removes the necessity to separately provide a supplemental support (a member to inhibit overturning) and a handle (a member for the user to hold), to thereby make it possible to inhibit an increase in the number of components constituting the eighth laser marker 701.

Next, in the eighth laser marker 701, the sliding supplemental support 711 is slidingly moved and has the ground contact portion 713 and the handle 714 provided separately. Such a configuration makes it easier for the eighth laser marker 701 to be switched between the state suitable for inhibiting overturning and the state suitable for carriage because the sliding supplemental support 711 can be moved easily (e.g., from the support position to another position).

Next, in the eighth laser marker 701, the male screws 717b (the axis L4) of the coupling portions 717 are provided higher than the center of gravity GC of the eighth laser marker 701 in the main body 3 (see FIG. 29).

In the thus-configured eighth laser marker 701, when the user lifts the eighth laser marker 701 by holding the handle 714, the center of gravity GC is positioned lower than the male screws 717b of the coupling portions 717, and thus, the eighth laser marker 701 excluding the sliding supplemental support 711 becomes stable. This makes it possible, when the user lifts the eighth laser marker 701 by holding the handle 714, to inhibit the eighth laser marker 701 excluding the sliding supplemental support 711 from pivotally moving to turn over upside down. Thus, the eighth laser marker 701 can be carried around in a stable state.

Next, in the eighth laser marker 701, the ground contact portion 713 and the handle 714 of the sliding supplemental support 711 each have the surface made of the elastic material.

With the thus-configured sliding supplemental support 711, when the eighth laser marker 701 is tilted and the ground contact portion 713 comes in contact with the ground GND, the portion made of the elastic material on the ground contact portion 713 fulfills an antiskid function, to thereby make the eighth laser marker 701 more unlikely to turn over. Additionally, the elastic material on the surface of the handle 714 makes it possible to inhibit the handle 714 from slipping out of the hand to cause the eighth laser marker 701 to fall when the user carries the eighth laser marker 701 by holding the handle 714.

The eighth laser marker 701 corresponds to one example of a laser marker of the present disclosure, the sliding supplemental support 711 corresponds to one example of a supplemental support of the present disclosure, the ground contact portion 713 corresponds to one example of a ground contact portion of the present disclosure, the handle 714 corresponds to one example of a handle of the present disclosure, the ground contact side extending portions 715 correspond to one example of extending portions of the present disclosure, and the coupling portions 717 correspond to one example of coupling portions of the present disclosure.

9. Other Embodiments

Although the embodiments of the present disclosure have been explained as above, the present disclosure is not limited to the above-described embodiments and can be practiced in various forms without departing from the spirit of the present disclosure.

For example, in the above-described embodiments, the configuration has been explained in which the AC adapter is used as an external power supply to be coupled to the external power supply coupling portion. However, the external power supply is not limited to the AC adapter and may be of other types such as a DC adapter.

In the above-described embodiments, the configuration has been explained in which the output voltage of the AC adapter is 4.5-5.5 V. However, the output voltage of the adapter is not limited to such a range. For example, it may be possible to prepare a dedicated adapter, instead of a general-purpose one, and to set its output voltage to be equal to or smaller than a voltage of the battery pack and also to be equal to or greater than a voltage suitable for the laser light generator. In such a case, in the block diagram of FIG. 7, a configuration may be adopted in which the pack side switch portion 51*a* is directly coupled to the contact 65*a* of the selector switch 65, the external power supply side switch portion 51*b* is directly coupled to the contact 65*b* of the selector switch 65, and the pack side transformer circuit 61 is provided between the contact 65*c* of the selector switch 65 and the emission controller 27. This makes it possible to omit the external power supply side transformer circuit 63, to thereby simplify the electrical configuration of the laser marker.

In the above-described embodiments, the configuration has been explained in which the voltage is lowered by the pack side transformer circuit 61, and the voltage is raised by the external power supply side transformer circuit 63. Instead of these, however, a transformer circuit may be used that can raise and lower the voltage. Specifically, in the block diagram of FIG. 7, a configuration may be adopted in which the pack side switch portion 51*a* is directly coupled to the contact 65*a* of the selector switch 65, the external power supply side switch portion 51*b* is directly coupled to the contact 65*b* of the selector switch 65, and the transformer circuit that can raise and lower the voltage is provided between the contact 65*c* of the selector switch 65 and the emission controller 27. Such a transformer circuit is configured to convert (lower or raise) the input voltage into a voltage suitable for driving the laser light generator.

In the above-described embodiments, the configuration including the external power supply coupling portion has been explained. However, a configuration not including the external power supply coupling portion may be adopted.

The color of the laser lights to be emitted is not limited to green, and may be other colors such as red.

An external shape of the main body is not limited to the above-described circularly cylindrical shape, and may be a polygonally cylindrical shape, for example.

In the above-described embodiments, the configuration including the mechanical gimbal system has been explained. However, a configuration including an electronic gimbal system may be adopted.

In the above-described embodiments, the configuration has been explained that includes the mechanism in which the laser light emitter 25 is set to either a fixed state or a swingable state by means of the stopper operated linked with operation of the operation switch 51. Additionally or alternatively to such a mechanism, however, a configuration may be adopted that includes an operation portion that can set the laser light emitter 25 to a fixed state independently of the state of the operation switch 51.

In the above-described embodiments, the configuration has been explained in which a sliding direction of the battery pack 5 during attachment thereof is from the left to the right in FIG. 3. However, the sliding direction of the battery pack 5 during attachment thereof is not limited to such a direction, and a configuration may be adopted in which the battery pack 5 is attached by sliding it inversely, i.e., from the right to the left.

What is claimed is:

1. A laser marker comprising:
a laser light generator configured to generate at least one laser light;
a main body that accommodates therein the laser light generator, the main body comprising:
an outer surface; and
at least one laser light passing portion that allows passage of the at least one laser light from an inside to an outside of the main body; and
a pack attachment portion configured such that a battery pack, which is chargeable and dischargeable and supplies electric power to the laser light generator, is slid along the outer surface of the main body so as to be attached to the pack attachment portion; wherein:
the main body comprises at least one signal receiving portion configured to receive at least one wireless command signal transmitted from outside the main body; and
the pack attachment portion comprises a lowermost portion positioned higher than an uppermost portion of the at least one signal receiving portion.

2. The laser marker according to claim 1,
wherein the pack attachment portion comprises at least one slide rail provided on the outer surface of the main body, and
wherein the at least one slide rail is configured such that the battery pack is attached to the pack attachment portion by sliding the battery pack along the at least one slide rail.

3. The laser marker according to claim 2,
wherein the at least one slide rail comprises a pair of parallel slide rails.

4. The laser marker according to claim 1,
wherein the main body has a columnar shape extending in an axial direction about a central axis extending in a vertical direction.

5. The laser marker according to claim 4,
wherein the outer surface comprises a side face extending in the axial direction, and
wherein the pack attachment portion is provided on the side face.

6. The laser marker according to claim 1,
wherein the battery pack has a shape in which a maximum vertical dimension is smaller than a maximum horizontal dimension in a state where the battery pack is attached to the pack attachment portion.

7. The laser marker according to claim 1,
wherein the pack attachment portion is configured such that the battery pack is attached to the pack attachment portion in such a manner as to be slidable parallel to a horizontal direction.

8. The laser marker according to claim 1,
wherein the main body comprises:
a base unit configured to come in contact with a place in which the laser marker is placed; and
a rotating unit secured on an upper side of the base unit in such a manner as to be rotatable about a central axis extending in a vertical direction.

9. The laser marker according to claim 8,
wherein the pack attachment portion is provided either on the base unit or on the rotating unit.

10. The laser marker according to claim 1,
wherein the laser light generator comprises a laser light emitter and an emission controller,
wherein the laser light emitter is configured to emit the at least one laser light, wherein the emission controller is configured to control an emission state of the at least one laser light in the laser light emitter,
wherein, assuming that the laser marker is divided by a virtual plane that is parallel to a sliding direction of the battery pack and that includes a central axis of the main body extending in a vertical direction, the laser marker comprises a first region and a second region, the first region being a region including the pack attachment portion and the second region being a region not including the pack attachment portion, and
wherein at least part of the emission controller is arranged in the second region.

11. The laser marker according to claim 1, further comprising:
an external power supply coupling portion configured to be coupled to an external power supply that supplies electric power to the laser light generator.

12. The laser marker according to claim 11,
wherein the external power supply is configured to output an output voltage of 4.5-5.5 V, and
wherein the external power supply coupling portion is configured to adapt to the output voltage.

13. The laser marker according to claim 11, further comprising:
a pack voltage converter configured to convert a voltage received from the battery pack into a voltage suitable for the laser light generator; and
an external voltage converter configured to convert a voltage received from the external power supply via the external power supply coupling portion into the voltage suitable for the laser light generator.

14. The laser marker according to claim 1,
wherein the at least one laser light comprises a green laser light.

15. The laser marker according to claim 1,
wherein the main body comprises a bottom portion,
wherein the laser marker further comprises:
a plurality of leg portions provided to the bottom portion and configured to come in contact with a place in which the laser marker is placed; and
a supplemental support provided extending from the main body,
wherein the supplemental support comprises a ground contact portion at a leading end of the supplemental support,
wherein the ground contact portion is positioned such that a virtual line segment connecting at least part of the ground contact portion and the central axis to each other intersects the pack attachment portion, as viewed planarly from an upper side of a central axis of the main body extending in a vertical direction, and
wherein the ground contact portion is further positioned lower than the pack attachment portion, and is positioned so as to face a virtual ground, which is an extension of a ground in contact with the plurality of leg portions, leaving a gap between the ground contact portion and the virtual ground.

16. The laser marker according to claim 1,
wherein the pack attachment portion comprises at least two electrode terminals electrically coupled to the laser light generator, and
wherein the at least two electrode terminals are configured to protrude from the outer surface of the main body in a horizontal direction and configured so as to be electrically coupled to the battery pack attached to the pack attachment portion.

17. A laser marker comprising:
a laser light generator configured to generate at least one laser light;
a main body that accommodates therein the laser light generator, the main body comprising:
an outer surface; and
at least one laser light passing portion that allows passage of the at least one laser light from an inside to an outside of the main body; and
a pack attachment portion configured such that a battery pack, which is chargeable and dischargeable and supplies electric power to the laser light generator, is slidably attached to the pack attachment portion,
wherein the main body comprises at least one signal receiving portion configured to receive at least one wireless command signal transmitted from outside the main body, and
wherein the pack attachment portion comprises a lowermost portion positioned higher than an uppermost portion of the at least one signal receiving portion.

18. A laser marker comprising:
a laser light generator configured to generate at least one laser light;
a main body that accommodates therein the laser light generator, the main body comprising:
an outer surface; and
at least one laser light passing portion that allows passage of the at least one laser light from an inside to an outside of the main body; and
a pack attachment portion configured such that a battery pack, which is chargeable and dischargeable and supplies electric power to the laser light generator, is slidably attached to the pack attachment portion,
wherein the main body comprises a bottom portion,
wherein the laser marker further comprises:
a plurality of leg portions provided to the bottom portion and configured to come in contact with a place in which the laser marker is placed; and
a supplemental support provided extending from the main body,
wherein the supplemental support comprises a ground contact portion at a leading end of the supplemental support,
wherein the ground contact portion is positioned such that a virtual line segment connecting at least part of the ground contact portion and the central axis to each other intersects the pack attachment portion, as viewed planarly from an upper side of a central axis of the main body extending in a vertical direction, and
wherein the ground contact portion is further positioned lower than the pack attachment portion, and is positioned so as to face a virtual ground, which is an extension of a ground in contact with the plurality of leg portions, leaving a gap between the ground contact portion and the virtual ground.

19. The laser marker according to claim 18,
wherein the supplemental support is provided lower than the pack attachment portion.

20. The laser marker according to claim 18,
wherein the supplemental support is attached to the main body via at least one coupling portion in at least either one of a pivotally movable manner or a slidingly movable manner, and
wherein, when the supplemental support is fixed in a specified support position within a movable range of the supplemental support, the ground contact portion is positioned such that the virtual line segment intersects the pack attachment portion, and the ground contact portion is positioned so as to face the virtual ground, leaving the gap between the ground contact portion and the virtual ground, in a region lower than the pack attachment portion.

21. The laser marker according to claim 20, wherein the supplemental support comprises a handle configured to be held by a user of the laser marker.

22. The laser marker according to claim 21, wherein the supplemental support is configured such that the ground contact portion is movable to a region higher than an uppermost end of the main body and such that the ground contact portion and the handle are configured as a same member.

23. The laser marker according to claim 21, wherein the outer surface comprises a side face extending in an axial direction about a central axis extending in a vertical direction,
wherein the supplemental support is attached to the side face of the main body via the pair of coupling portions, and is configured to be slidingly movable,
wherein the ground contact portion is provided lower than the pair of coupling portions in the supplemental support, and
wherein the handle is provided higher than the pair of coupling portions in the supplemental support.

24. The laser marker according to claim 20, wherein the at least one coupling portion comprises a pair of coupling portions,
wherein the supplemental support is attached to a side face of the main body via the pair of coupling portions, and is configured to be pivotally movable about the pair of coupling portions,
wherein the supplemental support comprises a pair of extending portions, each extending from corresponding one of the pair of coupling portions to the ground contact portion, and
wherein positions of the pair of coupling portions in the main body as viewed planarly from the upper side of the central axis of the main body extending in a vertical direction are set so that, when the supplemental support is fixed in the support position, the ground contact portion and the pair of extending portions surround at least a region in which the pack attachment portion is provided on the side face of the main body.

25. The laser marker according to claim 24, wherein the pair of extending portions comprise a first extending portion and a second extending portion, the first extending portion being made of a soft material that is elastically deformable and the second extending portion being made of a hard material that is harder than the soft material and that is not elastically deformed,
wherein the first extending portion is positioned such that a movement locus of the first extending portion during pivotal movement of the supplemental support overlaps a region in which the battery pack is moved during attachment and detachment of the battery pack, and
wherein the second extending portion is positioned such that a movement locus of the second extending portion during pivotal movement of the supplemental support does not overlap the region in which the battery pack is moved during attachment and detachment of the battery pack.

26. The laser marker according to claim 20, wherein the at least one coupling portion comprises one coupling portion,
wherein the supplemental support is attached to a side face of the main body via the one coupling portion, and is configured to be pivotally movable about the one coupling portion,
wherein the supplemental support comprises an extending portion extending from the one coupling portion to the ground contact portion, and
wherein a position of the one coupling portion in the main body is set so that a region in which the ground contact portion and the extending portion are moved during pivotal movement of the supplemental support does not overlap a region in which the battery pack is moved during attachment to and detachment from the pack attachment portion.

27. The laser marker according to claim 20, wherein the at least one coupling portion is provided higher than a center of gravity of the laser marker in the main body.

28. The laser marker according to claim 18, wherein the ground contact portion of the supplemental support comprises a surface made of an elastic material.

29. A laser marker comprising:
a laser light generator configured to generate at least one laser light;
a main body that accommodates therein the laser light generator, the main body comprising:
  an outer surface; and
  at least one laser light passing portion that allows passage of the at least one laser light from an inside to an outside of the main body; and
a pack attachment portion configured such that a battery pack, which is chargeable and dischargeable and supplies electric power to the laser light generator, is slid along the outer surface of the main body so as to be attached to the pack attachment portion; wherein:
the main body comprises a bottom portion;
the laser marker further comprises:
  a plurality of leg portions provided to the bottom portion and configured to come in contact with a place in which the laser marker is placed; and
  a supplemental support provided extending from the main body;
the supplemental support comprises a ground contact portion at a leading end of the supplemental support;
the ground contact portion is positioned such that a virtual line segment connecting at least part of the ground contact portion and the central axis to each other intersects the pack attachment portion, as viewed planarly from an upper side of a central axis of the main body extending in a vertical direction; and
the ground contact portion is further positioned lower than the pack attachment portion, and is positioned so as to face a virtual ground, which is an extension of a ground in contact with the plurality of leg portions, leaving a gap between the ground contact portion and the virtual ground.

* * * * *